US012663580B1

(12) United States Patent
Lazovsky et al.

(10) Patent No.: US 12,663,580 B1
(45) Date of Patent: Jun. 23, 2026

(54) SEMICONDUCTOR DEVICES WITH PHOTONIC INTERCONNECT PLATFORMS

(71) Applicant: Sicily Merger Sub II, Inc., Santa Clara, CA (US)

(72) Inventors: David Lazovsky, Los Gatos, CA (US); Martinus Bos, San Jose, CA (US); Philip Winterbottom, San Jose, CA (US); Subal Sahni, La Jolla, CA (US)

(73) Assignee: Sicily Merger Sub II, Inc., Santa Clara, CA (US)

( * ) Notice: Subject to any disclaimer, the term of this patent is extended or adjusted under 35 U.S.C. 154(b) by 0 days.

(21) Appl. No.: 19/301,869

(22) Filed: Aug. 15, 2025

Related U.S. Application Data

(60) Provisional application No. 63/783,899, filed on Apr. 4, 2025.

(51) Int. Cl.
*G02B 6/122* (2006.01)
*G02B 6/12* (2006.01)

(52) U.S. Cl.
CPC ....... *G02B 6/12004* (2013.01); *G02B 6/1228* (2013.01)

(58) Field of Classification Search
CPC ...... G02B 6/356; G02B 6/1221; G02B 6/125; G02B 6/305; G02B 6/12002
See application file for complete search history.

(56) References Cited

U.S. PATENT DOCUMENTS

| | | | |
|---|---|---|---|
| 7,079,716 B2 * | 7/2006 | McIntyre | G02B 6/12002 385/14 |
| 11,509,397 B2 | 11/2022 | Ma et al. | |
| 11,817,903 B2 | 11/2023 | Pleros et al. | |
| 11,835,777 B2 | 12/2023 | Winterbottom et al. | |
| 12,164,161 B1 | 12/2024 | Winterbottom et al. | |
| 12,189,198 B1 | 1/2025 | Aggarwal et al. | |
| 12,191,257 B2 | 1/2025 | Aggarwal | |
| 12,197,023 B1 | 1/2025 | Aggarwal et al. | |
| 12,216,318 B2 | 2/2025 | Winterbottom et al. | |
| 12,217,056 B2 | 2/2025 | Aggarwal et al. | |

(Continued)

OTHER PUBLICATIONS

Berger et al., "Design tradeoffs in CXL-based memory pools for public cloud platforms," IEEE Micro, 2023, 43:30-38, 10 pages.

(Continued)

*Primary Examiner* — Eric Wong
(74) *Attorney, Agent, or Firm* — Fish & Richardson P.C.

(57) ABSTRACT

A device is disclosed that features a hybrid electro-photonic integrated circuit devices that include an electronic circuit layer mounted on a photonic circuit layer. In one aspect, a device includes a photonic circuit layer including a first surface, a second surface opposite the first surface, and photonic circuit portions tiled together to provide the photonic circuit layer. The photonic circuit layer includes electro-optical transceivers, one or more optical couplers, and waveguides. The waveguides include boundary-crossing waveguides that each extend across a boundary between adjacent photonic circuit portions. Each boundary-crossing waveguide includes an optical connection at the boundary. The optical connection has a width larger than a width of the waveguide away from the boundary. A first photonic circuit layer portion includes first and second electro-optical transceivers and first and second waveguides.

25 Claims, 47 Drawing Sheets

(56) References Cited

U.S. PATENT DOCUMENTS

| | | | |
|---|---|---|---|
| 12,259,575 B2 | 3/2025 | Winterbottom et al. | |
| 12,271,595 B2 | 4/2025 | Lazovsky et al. | |
| 12,298,608 B1 | 5/2025 | Winterbottom et al. | |
| 12,339,492 B2 | 6/2025 | Bos et al. | |
| 12,431,689 B2 | 9/2025 | Yang | |
| 2002/0039464 A1* | 4/2002 | Yoshimura | G02B 6/10 |
| | | | 257/E25.032 |
| 2013/0230274 A1* | 9/2013 | Fish | G02B 6/305 |
| | | | 385/14 |
| 2017/0195064 A1* | 7/2017 | Chang | H04B 10/801 |
| 2019/0033542 A1* | 1/2019 | Epitaux | G02B 6/4226 |
| 2022/0012582 A1 | 1/2022 | Pleros et al. | |
| 2022/0244458 A1* | 8/2022 | Koch | G02B 6/1221 |
| 2022/0404544 A1 | 12/2022 | Winterbottom et al. | |
| 2022/0405056 A1 | 12/2022 | Winterbottom et al. | |
| 2022/0405566 A1 | 12/2022 | Winterbottom et al. | |
| 2023/0104033 A1 | 4/2023 | Pleros et al. | |
| 2023/0296838 A1 | 9/2023 | Lazovsky et al. | |
| 2023/0418010 A1 | 12/2023 | Winterbottom et al. | |
| 2024/0013041 A1 | 1/2024 | Pleros et al. | |
| 2024/0038657 A1 | 2/2024 | Aggarwal et al. | |
| 2024/0038694 A1 | 2/2024 | Aggarwal et al. | |
| 2024/0038695 A1 | 2/2024 | Aggarwal et al. | |
| 2024/0056704 A1* | 2/2024 | Kartawira | G02B 6/356 |
| 2024/0145328 A1 | 5/2024 | Sahni | |
| 2024/0166910 A1* | 5/2024 | Norwood | G02B 6/305 |
| 2024/0176069 A1 | 5/2024 | Li | |
| 2024/0176169 A1 | 5/2024 | Sahni et al. | |
| 2024/0194806 A1 | 6/2024 | Badcock et al. | |
| 2024/0219664 A1 | 7/2024 | Winterbottom et al. | |
| 2024/0272392 A1 | 8/2024 | Winterbottom et al. | |
| 2024/0272393 A1 | 8/2024 | Winterbottom et al. | |
| 2025/0076572 A1 | 3/2025 | Winterbottom et al. | |
| 2025/0102838 A1 | 3/2025 | Thomas et al. | |
| 2025/0155736 A1 | 5/2025 | Scofield | |
| 2025/0190357 A1 | 6/2025 | Maia Da Silva et al. | |
| 2025/0216598 A1 | 7/2025 | Aggarwal et al. | |
| 2025/0216602 A1 | 7/2025 | Ramachandra et al. | |
| 2025/0216627 A1 | 7/2025 | Sahni et al. | |
| 2025/0216705 A1 | 7/2025 | Staffaroni et al. | |
| 2025/0216706 A1 | 7/2025 | Staffaroni et al. | |
| 2025/0216708 A1 | 7/2025 | Ramachandra et al. | |
| 2025/0219034 A1 | 7/2025 | Staffaroni et al. | |
| 2025/0244876 A1 | 7/2025 | Lazovsky et al. | |
| 2025/0370199 A1 | 12/2025 | Aggarwal et al. | |
| 2025/0370205 A1 | 12/2025 | Aggarwal et al. | |
| 2025/0370206 A1 | 12/2025 | Aggarwal et al. | |
| 2025/0372590 A1 | 12/2025 | Oh et al. | |

OTHER PUBLICATIONS

Coenen et al., "Electro-absorption modulator thermo-optical self-heating analysis," J. Light. Technol., Apr. 24, 2023, 41(18):6000-6006.

Daudlin et al., "3D photonics for ultra-low energy, high bandwidth-density chip data links," arXiv preprint, Submitted Oct. 2, 2023, arXiv:2310.01615, 17 pages (With Supplementary Information).

Gholami, "AI and Memory Wall," medium.com, available on or before Mar. 27, 2021, retrieved on Oct. 16, 2023, retrieved from URL <https://medium.com/riselab/ai-and-memory-wall-2cb4265cb0b8>, 15 pages.

Harris, "Introducing envise, idiom and passage—next generation AI compute, compile and interconnect platforms," medium.com, Mar. 10, 2021, retrieved on Oct. 16, 2023, retrieved from URL <https://medium.com/lightmatter/introducing-envise-idiom-and-passage-next-generation-ai-compute-compile-and-interconnect-331878d6cea5>, 6 pages.

Howard, "The First Direct Mesh-to-Mesh Photonic Fabric," in IEEE Hot Chips 35 Symp. (HCS), 2023, Palo Alto, CA, USA, 17 pages.

Lee et al., "Beyond CPO: A motivation and approach for bringing optics onto the silicon interposer," J. Light. Technol., 2023, 41:1152-1162.

Li et al., "Analyzing resource utilization in an HPC system: A case study of NERSC's Perlmutter," High Performance Computing, 2023, Springer Nature Switzerland, 297-316.

Lightelligence, "Hummingbird™ processor," lightelligence.ai, available on or before 2022, retrieved on Oct. 16, 2023, retrieved from URL<https://www.lightelligence.ai/index.php/product/hummingbird.html>, 1 page.

Rahim et al., "Taking silicon photonics modulators to a higher performance level: state-of-the-art and a review of new technologies," Adv. Photonics, Mar.-Apr. 2021, 3:024003, 23 pages.

Sahni et al., "Beyond the Beachfront: Integration of Silicon Photonic I/Os under a High-Power ASIC," Optical Fiber Commun. Conf. and Expo. (OFC), 2024, San Diego, CA, USA, 3 pages.

Sunny et al., "Machine learning accelerators in 2.5D chiplet platforms with silicon photonics," Design, Automation & Test in Europe Conf. & Exhibition, 2023, 6 pages.

Verbist et al., "100 GB/s DAC-less and DSP-free transmitters using GeSi EAMs for short-reach optical interconnects," Optical Fiber Commun. Conf. and Expo. (OFC), 2018, 3 pages.

Wu et al., "Sustainable AI: Environmental implications, challenges and opportunities," Proc. Mach. Learn. Syst., 2022, 4:795-813, 19 pages.

* cited by examiner

FIG. 5-13

SEMICONDUCTOR DEVICES WITH PHOTONIC INTERCONNECT PLATFORMS

CROSS REFERENCE TO RELATED APPLICATIONS

This application claims the benefit under 35 U.S.C. § 119 (e) of U.S. Patent Application No. 63/783,899, filed Apr. 4, 2025, which is incorporated herein by reference in its entirety for all purposes.

BACKGROUND

Demands for artificial intelligence (AI) computing, such as machine learning (ML) and deep learning (DL), are increasing faster than they can be met by increases in available processing capacity. This rising demand and the growing complexity of AI models drive the need to connect many chips into a system where the chips can send data between each other with low latency and at high speed. Performance when processing a workload is limited by memory and interconnect bandwidth. In many conventional systems, data movement leads to significant power consumption, poor performance, and excessive latency. Thus, multi-node computing systems that can process and transmit data between nodes quickly and efficiently may be advantageous for the implementation of ML models.

SUMMARY

Semiconductor devices are disclosed that include memory, processing elements (e.g., one or more processors), and/or a photonic interconnect platform that enables signal routing via photonic channels and electrical links. The devices, which can be included or implemented in circuit packages, can be used to implement network switches that include memory and/or processing elements within the packages. The photonic interconnect platform can include an electronic circuit layer mounted on a photonic circuit layer, e.g., in the form of a hybrid electro-photonic integrated circuit package. In general, the photonic interconnect platform can be used to route data between nodes (e.g., compute nodes and/or memory nodes) or other components on the same chip (inter-chip routing) and between nodes or other components on different chips (intra-chip routing). Both inter-chip and intra-chip routing can include routing data over electrical and/or photonic channels.

A network switch is just one example implementation of a device that includes a photonic interconnect platform as described in this document. Devices and circuit packages having a photonic platform can be used for other purposes, e.g., as multi-node processors, memory, etc.

The electronic circuit layer, photonic circuit layer, and their components can be arranged such that the conversion between optical and electronic signals occur in an inner region (e.g., a central region) of the switch, e.g., in an inner or central region of the two layers. For example, the photonic circuit layer can include optical couplers located along an outer region of the photonic circuit layer, modulators and photodetectors located in the inner region of the photonic circuit layer, and waveguides that connect the optical couplers to the modulators. The optical couplers are configured to couple to an optical interface, e.g., configured to optically attach to fiber array units (FAUs).

The electronic circuit layer can include analog mixed signal (AMS) blocks, which can also be referred to as AMS modules, located in the inner region of the electronic circuit layer and nodes and/or other components located along the outer region of the electronic circuit layer. As described in more detail below, each AMS block includes analog/mixed signal circuits for interfacing with the photonic circuit layer. In some implementations, the AMS blocks are implemented in the photonic circuit layer, e.g., in the inner region of the photonic circuit layer. This arrangement of signal conversion components at the center of the switch significantly reduces the length of the electrical channels between the AMS blocks and the nodes of the electronic circuit layer compared to devices and circuit packages that includes signal conversion components along the outer regions. For example, the longest distance of travel of an electronic signal in the disclosed switch may be about one half the diagonal length of the electronic circuit layer (assuming a straight-line channel). In contrast, if the signal conversion components are located along the outer perimeter of the device (e.g., network switch), the electronic signal may have to travel twice the distance of the package (or longer depending on the arrangement of the electrical channels) to obtain and return data from memory. Thus, the disclosed arrangement of signal conversion components and nodes of the electronic and photonic circuit layers reduce signal loss of electronic signals, reduce noise imposed on the signals, reduce latency in data communications (e.g., for accessing memory or performing computations using a processing element), and reduce the amount of heat generated by the electronic signals as compared to longer electrical channels.

In addition to performing the functions of a network switch, the switch can include processing elements (e.g., in the form of compute nodes) for computer processing at the switch and memory devices (e.g., in the form of memory nodes) for storing data at the switch. For example, the compute nodes can be configured to perform machine learning computations, such as reduce operations and/or other aggregation operation, at the switch to improve data locality of the resulting data for use by the processing elements connected to the switch and the communications overhead associated with sending the data between devices. For example, the network switch no longer has to route data received from other devices to another device for aggregation. Instead, the data is processed and aggregated at the switch, alleviating a significant amount of network traffic and corresponding latency. The memory nodes of the switch further improve data locality for the processing elements, e.g., by storing data used by multiple processing elements near all of the processing elements to reduce the latency in accessing and storing the data.

The electronic circuit layer can include one or more electrical integrated circuits (EICs) and the photonic circuit layer can include one or more photonic integrated circuits (PICs). An example device can include an electronic circuit layer that includes four EICs bonded to a photonic circuit layer that includes a single PIC. That is, the four EICs can be arranged on and bonded to the one PIC.

Another example device can include an electronic circuit layer that includes a single EIC bonded to a photonic circuit layer that includes a single PIC. That is, the one EIC can be bonded to the one PIC.

Yet another example device can include an electronic circuit layer that includes four EICs arranged on and bonded to a photonic circuit layer that includes four PICs. That is, each EIC can be bonded to a corresponding PIC and the PICs can be bonded to each other. In this example, the PICs can be stitched together using optical stitches for inter-chip optical signal routing or not stitched together.

An EIC can include at least one modulator driver and at least one transimpedance amplifier (TIA). A PIC can include at least one modulator and at least one photodetector. The modulators are each in electronic communication with a corresponding modulator driver and the photodetectors are each in electronic communication with a corresponding TIA. A PIC can also include waveguides for guiding optical signals to and from the modulators, to the photodetectors, and to and from optical couplers. The device encodes data from electronic signals into optical signals by modulating the optical signals using the modulators. The device encodes data from optical signals into electronic signals using the photodetectors. In this way, the device can route data to and from integrated circuits (e.g., processing elements or memory) that are in electrical communication with the device using optical signals.

In certain examples, the modulators are electro-absorption modulator (EAM), e.g., EAMs formed in germanium silicon. Such modulators may be relatively insensitive to thermal changes compared to other types of modulators for ranges of operational wavelengths, e.g., modulators using resonant structures such as ring modulators. Such modulators may also be relatively compact compared to other types of modulators, e.g., interference-based modulators, such as Mach-Zehnder interferometers.

The relative thermal stability and compact size can allow circuit designs in which the modulators and/or photodetectors are positioned in close proximity to active electronic elements in the electronic circuit layer, e.g., each modulator can be positioned in close proximity to its corresponding modulator driver and/or each photodetector can be positioned in close proximity to its corresponding TIA. Here, close proximity means that the components in the photonic circuit layer experience substantial thermal loading when the electronic circuit layer is active and can experience significant changes in temperature (e.g., changes of 10° C. or more, 20° C. or more, 30° C. or more) when switching between active and inactive states).

Positioning a modulator close to its corresponding driver and/or positioning a photodetector close to its corresponding TIA can allow for relatively short electrical channels (e.g., electrical interconnects) between the passive element in the photonic circuit layer and the active element in the electronic circuit layer. In some cases, the lines can be sufficiently short that circuitry commonly used to reduce noise associated with longer signal lines can be omitted without unacceptable loss in fidelity of the electronic signals. For example, the electrical interconnects can be 4 mm or less in length (e.g., 2 mm or less, 1 mm or less, 500 µm or less, 200 µm or less, such as low as 50 µm). Here, the length of an electrical interconnect refers to the total length of the passive electrical conduits (e.g., conducting traces, wires, vias, posts, and/or bumps) between the active components of the modulator/TIA and the electrode of the modulator/photodetector.

In some cases, the electronic circuit layer can include other integrated circuits that generate significant thermal loads in the same chip as the drivers and TIAs. For example, the electronic circuit layer can include one or more application specific integrated circuit (ASIC) in the same chip, e.g., circuits for performing processing of machine learning models.

In general, in a first aspect, the disclosure features a switch that includes a photonic circuit layer implemented in one or more first semiconductor chips. The photonic circuit layer includes a first inner region of the photonic circuit layer and a first outer region. The photonic circuit layer includes waveguides and one or more optical couplers in the first outer region. At least one waveguide is connected at one end to each of the one or more optical couplers. The switch includes an electronic circuit layer implemented in one or more second semiconductor chips coupled to the one or more first semiconductor chips. The electronic circuit layer includes a second inner region adjacent to the first inner region of the photonic circuit layer and a second outer region. The switch includes a plurality of electro-optical transceivers arranged in the first inner region of the photonic circuit layer and the second inner region of the electronic circuit layer. Each electro-optical transceiver includes an optical portion in the photonic circuit layer and a corresponding electrical portion in the electronic circuit layer. Each optical portion is connected to its corresponding electrical portion by electrical interconnects. At least one waveguide is connected at one end to the optical portion of each electro-optical transceiver.

In another aspect, the disclosure features a device that includes a photonic circuit layer comprising a first surface, a second surface opposite the first surface, and a plurality of photonic circuit portions tiled together to provide the photonic circuit layer. The photonic circuit layer includes a plurality of electro-optical transceivers, one or more optical couplers, and a plurality of waveguides. The waveguides include boundary-crossing waveguides that each extend across a boundary between adjacent photonic circuit portions. Each boundary-crossing waveguide includes an optical connection at the boundary. The optical connection has a width larger than a width of the waveguide away from the boundary. A first photonic circuit layer portion includes first and second electro-optical transceivers and first and second waveguides. The first waveguide connects the first electro-optical transceiver to an optical coupler of the one or more optical couplers and the second waveguide is a boundary-crossing waveguide that connects the second electro-optical transceiver to a corresponding electro-optical transceiver of a second photonic circuit layer portion different from the first photonic circuit layer portion. The device includes an electronic circuit layer coupled to the first surface of the photonic circuit layer. The electronic circuit layer includes electrical integrated circuits (EICs). Each EIC includes an electrical portion of at least one of the electro-optical transceivers such that, when the EIC is coupled to the first surface of the photonic circuit layer, the electrical portion and a corresponding optical portion of the at least one electro-optical transceiver of the photonic circuit layer are interconnected by electrical connections.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific examples thereof which are illustrated in the appended drawings. For better understanding, the like elements have been designated by like reference numbers throughout the various accompanying figures. Understanding that the drawings depict some example examples, the examples will be described and explained with additional specificity and detail through the use of the accompanying drawings in which:

FIG. 1-2 is a block diagram illustrating various components of the example of the computing node of FIG. 1-1.

FIG. 1-3 is a block diagram illustrating various components of the example computing node of FIG. 1-1.

FIG. 1-4 is a diagram illustrating a side view of an example structural implementation of the circuit package of FIG. 1-1.

FIG. 2-1 illustrates an example of a circuit package implementing an intra-chip bidirectional photonic channel between a first compute node and a second compute node.

FIG. 2-2 illustrates an example circuit package implementing an inter-chip bidirectional photonic channel between a compute node and an additional compute node located on an additional circuit package.

FIG. 3-1 is a diagram illustrating an example of a circuit package implementing multiple compute nodes.

FIG. 3-2 is a diagram illustrating an example of the circuit package of FIG. 3-1.

FIG. 3-3 is a diagram illustrating an example of the circuit package of FIG. 3-1.

FIG. 3-4 is a diagram illustrating an example of the circuit package of FIG. 3-1.

FIG. 3-5 is a diagram illustrating an example of the circuit package of FIG. 3-1.

FIG. 4 is a diagram illustrating an example implementation of four of the circuit packages of FIG. 2-1 being interconnected.

FIG. 5-1 is a diagram illustrating an example of a device that includes an electronic circuit layer and a photonic circuit layer.

FIG. 5-2 is a diagram illustrating an example of the photonic circuit layer of FIG. 5-1.

FIG. 5-3 is a diagram illustrating an example of a device that includes an electronic circuit layer and a photonic circuit layer.

FIG. 5-4 is a diagram illustrating an example of a photonic circuit layer.

FIG. 5-5 is a diagram illustrating an example of a photonic circuit layer.

FIG. 5-6 is a diagram illustrating an example of a photonic circuit layer.

FIG. 5-7 is a diagram illustrating an example of the electronic circuit layer of FIG. 5-3.

FIG. 5-8 is a diagram illustrating an example portion of an electronic circuit layer and a portion of a photonic circuit layer with an electro-optical transceiver.

FIG. 5-9 is a diagram illustrating another example portion of an electronic circuit layer and a portion of a photonic circuit layer with an electro-optical transceiver.

FIG. 5-10 is a diagram illustrating another example switch that includes an electronic circuit layer with sixteen EICs and a photonic circuit layer.

FIG. 5-11 is a diagram illustrating the photonic circuit layer of the switch of FIG. 5-10.

FIG. 5-12 is a diagram illustrating another example switch that includes an electronic circuit layer with sixteen EICs and a photonic circuit layer.

FIG. 5-13 is a diagram illustrating the photonic circuit layer of the switch of FIG. 5-12.

FIG. 5-14 is a diagram illustrating another example switch that includes an electronic circuit layer with sixteen EICs and a photonic circuit layer.

FIG. 5-15 is a diagram illustrating the photonic circuit layer of the switch of FIG. 5-14.

FIG. 5-16 is a diagram illustrating another example switch that includes an electronic circuit layer with sixteen EICs and a photonic circuit layer.

FIG. 5-17 is a diagram illustrating the photonic circuit layer of the switch of FIG. 5-16.

FIG. 5-18 is a diagram illustrating another example switch that includes an electronic circuit layer with sixteen EICs and a photonic circuit layer.

FIG. 5-19 is a diagram illustrating the photonic circuit layer of the switch of FIG. 5-18.

FIG. 5-20 is a diagram illustrating an example photonic circuit layer that includes sixteen PICs.

FIG. 5-21 is a diagram illustrating a photonic circuit layer that includes two PICs optically coupled using optical stitches.

FIG. 5-22 is a diagram illustrating portions of two EICs and two PICs.

FIG. 5-23 is a diagram illustrating a device that includes two PICs and four EICs.

FIG. 5-24 is a diagram illustrating the PICS of FIG. 5-23.

FIG. 5-25 is a diagram illustrating a device that includes a substrate, multiple PICs, and multiple EICs.

FIG. 5-26 is a diagram illustrating the electrical circuit layer of the device of FIG. 5-25.

FIG. 5-27 is a diagram illustrating photonic circuit layer of the device of FIG. 5-25.

FIG. 5-28 is a diagram illustrating electronic signal routing distances.

FIG. 5-29 is a diagram illustrating an example circuit board that includes a network switch and memory modules.

FIG. 5-30 is a diagram illustrating an example system in which machine learning computations are performed by a network switch.

FIG. 6-1 is a diagram illustrating an electronic circuit layer with a switching device.

FIG. 6-2 is a diagram illustrating an example portion of electronic circuit layer, a portion of a photonic circuit layer, and a portion of a substrate.

FIG. 6-3 is a diagram illustrating an example portion of electronic circuit layer, a portion of a photonic circuit layer, and a portion of a substrate.

FIG. 7-1 is a diagram illustrating example reticle masks for creating an optical connection and the resulting optical connection.

FIG. 7-2 is a diagram illustrating example reticle masks for creating an optical connection and the resulting optical connection.

FIG. 8 illustrates a flow diagram for a method for accessing memory of a switch.

FIG. 9 illustrates certain components that may be included within a computer system.

DETAILED DESCRIPTION

Figure 1:
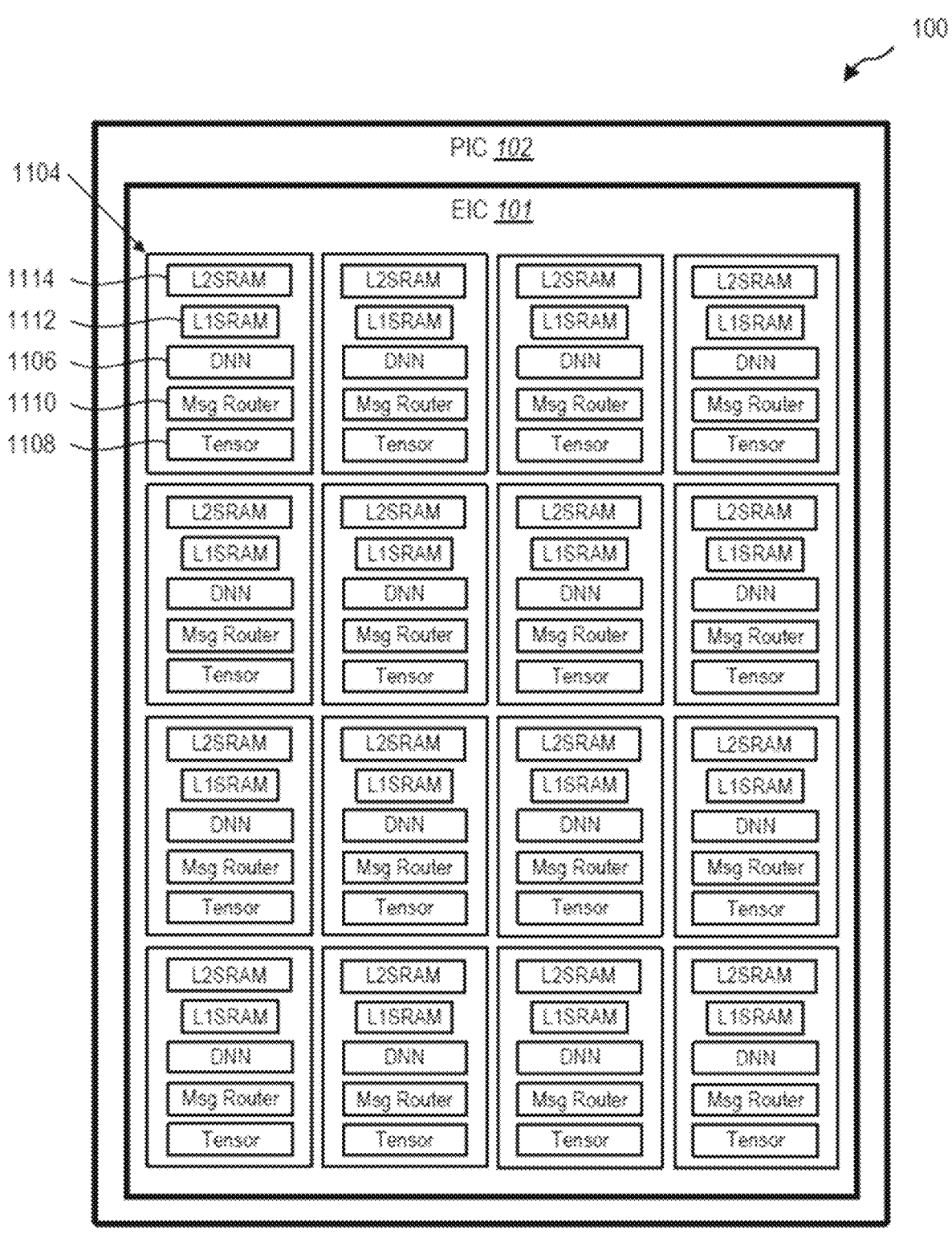
FIG. 1-1 is a diagram schematically illustrating components of an example system-in-package (SIP).

This document describes computing systems, implemented by one or more semiconductor devices that can be implemented in circuit packages (e.g., SIPs), that achieve reduced power consumption and/or increased processing speed. In accordance with various examples, power consumed for, in particular, data movement is reduced by increasing data locality in each device and reducing energy losses when data movement is needed compared to conventional computer systems. Power-efficient data movement, in turn, can be accomplished by moving data over small distances in the electronic domain, while leveraging photonic channels for data movement in scenarios where the resistance in the electronic domain and/or the speed at which the data can move in the electronic domain leads to band-width limitations that cannot be overcome using existing electronic technology. Thus, in some examples, each device includes an electronic integrated circuit (EIC) comprising multiple circuit blocks (hereinafter "processing elements" or "compute nodes") that are connected by bidirectional pho-tonic channels (e.g., implemented in a PIC in a separate layer or chip of the package) into a hybrid, electronic-photonic (or electro-photonic) network-on-chip (NoC). Multiple such NoCs may be connected, by inter-chip bidi-rectional photonic channels between respective circuit pack-ages (e.g., implemented by optical fiber), into a larger electro-photonic network, to scale the computing system to arbitrary size without incurring significant power or speed losses.

This document describes network switches that include memory, processing elements and a photonic interconnect platform that includes an electrical layer and a photonic layer for signal routing via photonic channels and electrical channels. The components of the electrical and photonic layers are arranged to minimize or at least reduce the length of the electrical channels to reduce noise, improve signal quality, reduce latency in data communications, and reduce the amount of heat associated with electronic signals on the electrical channels. For example, the components of the electrical and photonic layers can be arranged such that the conversion between optical and electronic signals occur in an inner region (e.g., central region) of the layers, thereby reducing the distance of the electrical channels between the conversion components and the computing components of the electrical layer.

While some of the described computing systems and their various novel aspects are generally applicable to a wide range of processing tasks, they are particularly suited to implementing machine learning (ML) models, e.g., artificial neural networks (ANNs), and network switches. As applied to ANNs, a circuit package and system of interconnected circuit packages as described herein are also referred to as an "ML processor" and "ML accelerator," respectively. Neural networks generally include one or more layers of artificial neurons that compute neuron output activations from weighted sums (corresponding to MAC operations) of a set of input activations. For a given neural network, the flow of activations between nodes and layers is fixed. Further, once training of the neural network is complete, the neuron weights in the weighted summation, and any other param-eters associated with computing the activations, are likewise fixed. Thus, a NoC as described herein lends itself to implementing a neural network by assigning neural nodes to compute nodes (processing element), pre-loading the fixed weights associated with the nodes into memory of the respective compute nodes, and configuring data routing between the compute nodes based on the predetermined flow of activations. The weighted summation can be efficiently performed using a disclosed dot product engine, herein also called a "digital neural network (DNN)" due to its applica-bility to ANNs.

The foregoing high-level summary of various beneficial aspect and features of the disclosed computing systems and underlying concepts will become clearer from the following description of example examples.

FIG. 1-1 is a diagram schematically illustrating compo-nents of an example circuit package 100 (e.g., SIP). The circuit package 100 may serve, for example, as an ML processor. The circuit package 100 includes an electronic integrated circuit 101 (EIC), such as, for example, a digital and mixed-signal application-specific integrated circuit (ASIC), and a photonic integrated circuit 102 (PIC). The EIC 101 and PIC 102 are formed in different layers of the circuit package 100 (herein the "electronic circuit layer" and "photonic circuit layer," respectively), one stacked above the other, for example, using copper pillars, bump attach-ments, or other means to create an electrical interconnect to transmit and receive messages, packets, and/or data between the EIC and the PIC, as illustrated further below with reference to FIG. 1-4. The PIC or PICs 102 receive light from one or more laser light sources that may be integrated into the PIC 102 itself, or implemented separately from the PIC 102 either within or externally to the circuit package 100 and coupled into to the PIC 102 via suitable optical couplers. The optical couplers and laser sources are omitted from FIG. 1-1, but shown, for example, in FIG. 1-4. Gen-erally, the laser sources and optical couplers are selected to provide optical signals within a band of wavelengths for which the PIC 102 and other optical components in the system is intended to operate. In some examples, the opera-tional wavelengths are in a range from 1,500 nm to 1,600 nm (e.g., in the band of the spectrum referred to as the C-band and/or L-band).

This example EIC 101 includes multiple processing ele-ments or compute nodes 1104. As will be discussed herein in detail, the compute nodes 1104 can communicate with each other via one or more intra-chip bidirectional channels. The intra-chip bidirectional channels can include one or more bidirectional photonic channels (e.g., implemented with optical waveguides in the PIC 102) and/or one or more electronic channels (e.g., implemented in the circuitry of the EIC 101). The compute nodes 1104 can (although they need not in all examples) be electronic circuits identical (or at least substantially similar) in design, and as shown, can form "tiles" of the same size arranged in an array, matrix, grid, or any other arrangement suitable for performing the tech-niques described herein. Hereinafter, the words "processing element" and "compute node," are used synonymously.

In the present example, the EIC 101 has sixteen compute nodes 1104, or tiles, arranged in a four-by-four array, but the number and arrangement of tiles can generally vary. More generally, neither the shape of the tiles nor the grid in which they are arranged need necessarily be rectangular; for example, oblique quadrilateral, triangular, or hexagonal shapes and grids, as well as topologies with three or more dimensions can also be used. Further, although tiling may provide for efficient use of the available on-chip real-estate, the compute nodes 104 need not be equally sized and regularly arranged in all examples. As shown in FIG. 1-1, in some examples, the compute nodes 104 are arranged in a rectilinear array, such as a square (e.g., conceptually) array.

Each compute node 1104 in the EIC 101 may include one or more circuit blocks serving as processing engines. For example, in the implementation shown in FIG. 1-1, each compute node 1104 includes a dot product engine, or DNN, 1106 and a tensor engine 1108. The DNN 1106 can perform rapid MAC operations at reduced energy per MAC to execute either a convolution function or a dot product function, e.g., as routinely used in neural networks. The tensor engine 108 may be used to perform other, non-MAC operations, e.g., implementing non-linear activation func-tions as applied to the weighted sums in a neural network. In other examples, the compute node 1104 can have any combination of processing elements such as central process-ing units (CPUs), graphics processing units (GPUs), tensor processing units (TPUs), neural processing units (NPUs), and the like, and the DNN 1106 and tensor engine 1108 can also be included or omitted depending on the application.

Each compute node 1104 includes a message router 1110. The message routers 1110 interface with channels (e.g., electronic and/or photonic channels as described below in connection with FIG. 1-2) to facilitate data flow to and from the compute nodes 1104. Further, the compute nodes 1104 each have a memory system, e.g., including level-one static random-access memory (L1SRAM) 1112 and level-two static random-access memory (L2SRAM) 1114. L1SRAM 1112 is optional and, if included, can serve as scratchpad memory for each compute node 1104. L2SRAM 1114 can function as the primary memory for each compute nodes 1104 and may store certain fixed operands used by the DNN 1106 and tensor engine 1108, such as the weights of a machine learning model, in close physical proximity to the DNN 1106 and tensor engine 1108. L2SRAM 1114 can also store any intermediate results used in executing the machine learning model or other computation.

Figures 1, 2:
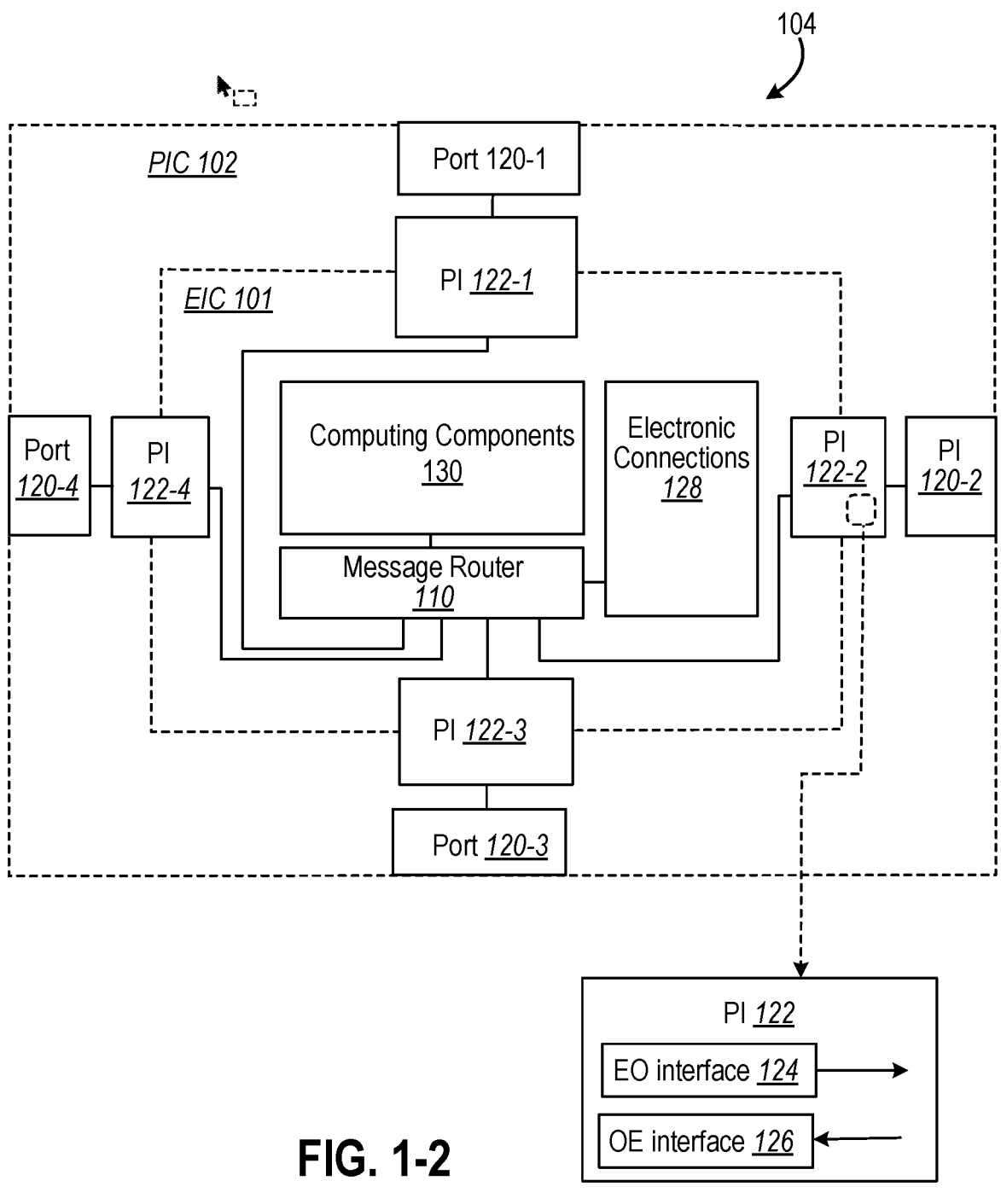

FIG. 1-2 is a block diagram illustrating various components of an example of the compute node 1104 of FIG. 1-1. Here, a compute node 104 includes various computing components 130, which may include the DNN 1106, the tensor engine 1108, interface controllers, routing controllers, the L1SRAM 1112 and/or the L2SRAM 1114 of FIG. 1-1, among other components. In some examples, the computing components 130 include memory components (e.g., a memory controller, vertically stacked high-bandwidth memory, etc.) such that the compute node 104 may be a memory node as will be described herein. The computing components 130 are implemented on an EIC 101-1 of the compute node 104 and are in communication with the message router 110. For example, the message router 110 can receive messages from another computing component via one of optical ports or electronic connections 128, and additionally can send messages generated by the respective compute node 104 of the message router 110 via one of the optical ports or the electrical connects 128. The message router is implemented on the EIC 101-1 and can be implemented through hardware, software, or a combination of hardware and software. The message router 110 is shown as a single block but can also include a message router associated with each photonic interface. The PIC 102 and EIC 101 as shown in FIG. 1-2 may be a portion of the PIC 102 and/or EIC 101 of FIG. 1-1, and may include various other computing componentry.

In some examples, the compute node 104 connects to one or more computing components through electronic channels (e.g., intra-chip electronic channels). For example, (as will be discussed below in detail) the various compute nodes 104 in FIG. 1-1 can each connect to adjacent nodes via the electronic channels. The compute node 104 can connect to any other computing component through one or more electronic channels. In some examples, the compute node 104 is configured to connect to up to four adjacent compute nodes 104 through electronic channels. In some examples, the compute nodes 104 are configured to connect to additional componentry and/or nodes through electronic connections, such as other on-chip components, or can process data in the electrical domain within the compute node 104, using an electrical port (not shown) which is included in block 128. The electronic channels connected to the compute node 104 can each connect to the message router 110, represented by electronic connections 128. The electronic connections 128 may be implemented in the EIC 101 of the compute node 104. Messages or packets sent through the electronic connections 128 may therefore pass to and be acted on by the message router 110 to forward those messages on to additional computing components, or to pass the messages internally to the computing components 130 of the computing node 104. In this way, the computing node 104 (and more specifically the message router 110) may be configured to connect to and communicate with one or more computing components through the electronic connections 128.

In some examples, the compute node 104 is configured to connect to one or more optical connections or photonic channels. For example, as shown in FIG. 1-2, the compute node 104 includes four photonic ports 120-1, 120-2, 120-3, and 120-4 (collectively, photonic ports 120). The four photonic ports 120-1 to 120-4 connect to four photonic channels. The photonic ports 120 facilitate connecting a photonic connection to the compute nodes 104. For example, the photonic ports 120 can include and/or can connect to one or more waveguides to direct an optical signal to and/or from the compute node 104. The photonic ports 120 are implemented in the PIC 102-1. In some examples, the photonic channels are bidirectional photonic channels to facilitate both sending and receiving communications through the photonic ports 120. For example, each bidirectional photonic channel can include two or more unidirectional links (e.g., one or more sending links and one or more receiving links). The unidirectional links may be associated with and may connect to respective sending and receiving components of the photonic interfaces 122, as discussed below. In this way, the photonic ports 120 facilitate connecting the compute node 104 to one or more bidirectional photonic channels to communicate photonically with other computing devices.

Each of the photonic ports 120 is associated with and connected to a corresponding photonic interface 122 (PI) (photonic port 120-1 is connected to photonic interface 122-1, etc.). The photonic interfaces 122 facilitate converting a message or a signal between the electronic domain and the photonic domain. In particular, each photonic interface (e.g., as illustrated for photonic interface 122-2) includes an electrical-to-optical (EO) interface 124 for converting electronic signals to optical (e.g., photonic) signals, and include an optical-to-electrical (OE) interface 126 for converting signals to electronic signals. While FIG. 1-2 only shows PI 122-2 as having the EO interface 124 and OE interface 126, it should be understood that each of the PIs 122 may include one or both of these interfaces and typically includes multiple each to support multiple unidirectional photonic links in both directions connecting to the port, for example, to support wavelength division multiplexing (WDM) or other scheme.

Figures 1, 2, 3:
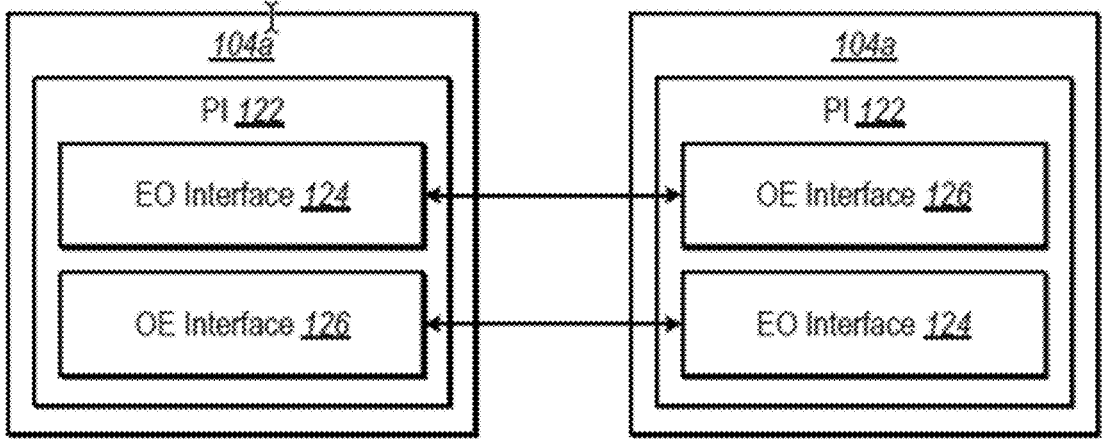

As discussed above, each bidirectional photonic channel can include two or more unidirectional photonic links. Each unidirectional photonic link can include or can be associated with both an EO interface 124 and an OE interface 126. For example, as shown in FIG. 1-3, an EO interface 124 of a compute node 104a connects (e.g., via photonic ports 120 and waveguides, etc.) to an OE interface 126 of another computing device 104b (e.g., another instance of the compute node) to form a unidirectional photonic link for sending packets from the compute node 104a to the other computing device 104b. Similarly, an EO interface 124 of the other computing device 104b connects to an OE interface 126 of the compute node 104a to form a unidirectional link for receiving packets to the compute node 104a from the other computing device 104b. In this way, the PIs 122 can facilitate bidirectional communication over the bidirectional photonic channels connected to the photonic ports 120. The combination of the EO interface 124 and the OE interface 126 can be referred to as an electro-optical transceiver.

In some examples, the PIs 122 each include various optical and electronic components. For example, the EO interface 124 can include an optical modulator and an optical modulator driver. The optical modulator generally operates on an optical (e.g., laser light) carrier signal to encode information into the optical carrier signal and thereby transmit information optically/photonically. The optical modulator can be controlled or driven by the optical modulator driver. The optical modulator driver can receive an electronic signal (e.g., packet encoded into an electronic signal) from the message router 110 and can control a modulation of the modulator to convert or encode the electronic signal into the optical signal. In this way the optical modulator and driver may make up the EO interface 124 to facilitate optically transmitting messages from the compute node 104.

The modulator can be an electro-absorption modulator (EAM) which is a semiconductor device that modulates the intensity of an optical signal by varying absorption of the optical signal as it traverses the modulator based on an applied electric voltage to the EAM. Generally, the principle of operation of an EAM is based on the Franz-Keldysh effect, i.e., a change in the absorption spectrum caused by an applied electric field, which changes the bandgap energy (thus the photon energy of an absorption edge) but usually does not involve the excitation of carriers by the electric field.

In examples, EAMs are made in the form of a waveguide with electrodes for applying an electric field in a direction perpendicular to the modulated optical signal. In some examples, the EAM is implemented in a layer of Germanium Silicon, e.g., an epitaxially-grown layer of GeSi. Germanium can stoichiometrically constitute 90% or more of the GeSi material (e.g., 95% or more, 96% or more, 97% or more, 98% or more, 99% or more).

In some examples, the OE interface 126 includes a photodetector (e.g., photodiode) and a transimpedance amplifier (TIA). The photodetector receives an optical signal (e.g., from another computing device) through a unidirectional link of the bidirectional photonic channel and converts the optical signal into an electronic signal. The photodetector can be connected to the TIA which can include componentry and/or circuitry for gain control and normalizing the signal level to extract and communicate a bit stream to the message router 110. In this way, the OE interface 126 can include the photodetector and the TIA to facilitate optically receiving messages to the compute node 104.

In some examples, the PIs 122 are partially implemented in the PIC 102-1 and partially implemented in the EIC 101-1. For example, the optical modulator can be implemented in the PIC 102-1 and can be electrically coupled to the optical modulator driver implemented in the EIC 101-1. For example, the EIC 101-1 and the PIC 102-1 can be horizontally stacked and the optical modulator and the optical modulator driver can be coupled through an electronic interconnect of the two components such as a copper pillar and/or bump attachment of various sizes. Similarly, the photodetector can be implemented in the PIC 102-1 and the TIA may be implemented in the EIC 101-1. The photodetector and the TIA can be coupled through an electronic interconnect of the two components. Other example arrangements of optical modulators, drivers, photodetectors, and TIAs are described below.

As shown in FIG. 1-2, each PI 122 is in communication with the message router 110. The PIs 122 are connected to the message router 110 through electronic interconnects in the EIC 101-1. The PIs 122 communicate with the message router 110 to transmit signals to and/or receive signals to or from the message router 110. In some examples, the message router 110 includes electronic circuitry and/or logic to facilitate converting a data packet into an electronic signal and then an optical signal in conjunction with the EO interface 124. Similarly, the message router 110 can include electronic circuitry and/or logic to facilitate converting an optical signal into an electronic signal and then into a data packet in conjunction with the OE interface 124. In this way the message router 110 can facilitate converting and/or operating on data between the electronic domain and the optical domain.

The message router 110 can facilitate routing information and/or data packets to and/or from the compute node 104. For example, the message router 110 can examine an address contained in the message and determine that the message is destined for the compute node 104. The message router 110 can accordingly forward or transmit some or all of the message internally to the various computing components 130 of the compute node 104 (e.g., via an electronic connection). In another example, the message router 110 can determine that a message is destined for another computing device (e.g., the message either being generated by the compute node 104 or received from one computing device for transmission to another computing device). The message router 110 can accordingly forward or transmit some or all of the message through one or more of the channels (e.g., electronic or photonic) of the compute node 104 to another computing device. In this way, the message router 110 in connection with the electronic connections 128 and the bidirectional photonic channels connected to the photonic ports 120 can facilitate implementing the compute node 104 in a network of computing devices for generating, transmitting, receiving, and forwarding messages between various computing devices. In some examples, the compute node 104 is implemented in a network of multiple compute nodes 104 such as that shown in FIG. 1-1.

The PIC 102-1 includes one or more waveguides. A waveguide is a structure that guides and/or confines light waves to facilitate the propagation of the light along a desired path and to a desired location. For example, a waveguide can be an optical fiber, a planar waveguide, a glass-etched waveguide, a photonic crystal waveguide, a free-space waveguide, any other suitable structure for directing optical signals, and combinations thereof. In some examples, one or more internal waveguides are formed in the PIC 102-1. In certain examples, one or more external waveguides are implemented external to the PIC 102-1, such as an optical fiber or a ribbon comprising multiple optical fibers.

The PIC 102-1 can include one or more waveguides in connection with the photonic ports 120. For example, as will be discussed below in more detail, one or more of the photonic ports 120 can be connected to another port of another computing node included in the circuit package 100 (e.g., on a same chip) as the computing node 104. Such connections may be intra-chip connections. In some examples, an internal waveguide is implemented (e.g., formed) in the PIC 102-1 to connect these photonic ports internally to the chip. In another example, one or more photonic ports 120 can be connected to a photonic port of another computing device located in a separate circuit package or separate chip to form inter-chip connections. In some examples, an external waveguide is used to connect these photonic ports across the multiple chips. For example, the photonic ports 120 can be connected via optical fiber across the multiple chips. In some examples, an external waveguide (e.g., optical fiber) connect directly to the photonic ports 120 of the respective computing devices across the multiple chips. In some examples, an external waveguide is implemented in connection with one or more internal waveguides formed in the PICs 102 of one or more of the chips. For example, one or more internal waveguides can internally connect the one or more of the photonic ports 120 to one or more additional optical components located at another portion of the circuit package (e.g., another portion of the PIC 102) to facilitate coupling of optical signals to and/or from the external waveguides. For example, the internal waveguides can connect to one or more optical coupling structures (optical couplers) including fiber array units (FAUs) located over grating couplers, or edge couplers. In some examples, one or more FAUs are implemented to facilitate coupling the external waveguides to the internal waveguides to facilitate chip-to-chip interconnection to another circuit package to both transmit and receive. For example, one or more FAUs can be used to supply optical power from an external laser light source to the PIC 102-1 to drive the photonics (e.g., provide one or more carrier signals) in the PIC 102-1.

FIG. 1-4 is a diagram illustrating a side view of an example structural implementation 1400 of the circuit package 100 of FIG. 1-1. In this example, an EIC 1401 and a PIC 1402 are formed in separate semiconductor chips (typically silicon chips, although the use of other semiconductor materials is conceivable). PIC 1402 is disposed directly on a substrate 1440, shown with solder bumps for subsequent mounting to a printed circuit board (PCB). The EIC 1401 and FAUs 1432 that connect the PIC 1402 to external waveguides 1433 (e.g., optical fibers) are disposed on top of and optically connected to the PIC 1402. Optionally, the circuit package 1400 can further include, as shown, an on-chip memory 1442 positioned on top of the PIC 1402 adjacent to the EIC 1401.

As will be appreciated by those of ordinary skill in the art, the depicted structure of the circuit package 1400 is merely one of several possible ways to assemble and package the various components. In some examples, some or all of the EIC 1401 is disposed on the substrate. In some examples, some or all of the PIC 1402 is placed on top of the EIC 1401. In some examples, it is also possible to create the EIC 1401 and PIC 1402 in different layers of a single semiconductor chip. In some examples, the photonic circuit layer includes or is made of multiple PICs 1402 in one or multiple sub-layers. Multiple layers of PICs 1402, or a multi-layer PIC 1402 may help to reduce waveguide crossings. Moreover, the structure depicted in FIG. 1-4 may be modified to included multiple EICs 1401 connected to a single PIC 1402 or multiple EICs 1401 connected to multiple PICs 1402. For example, the multiple EICs 1401 may be connected to each other via photonic channels in the PIC 1402.

In general, the EICs and PICs described herein can be manufactured using standard wafer fabrication processes, including, e.g., photolithographic patterning, etching, ion implantation, etc. Further, in some examples, heterogeneous material platforms and integration processes are used. For example, various active photonic components, such as the laser light sources and/or optical modulators and photodetectors used in the photonic channels, may be implemented using group III-V semiconductor components.

The laser light source(s) can be implemented either in the circuit package 1400 or externally. When implemented externally, a connection to the circuit package 1400 can be made optically using a grating coupler in the PIC 1402 underneath an FAU 1432 as shown and/or using an edge coupler. In some examples, lasers are implemented in the circuit package 1400 by using an interposer containing several lasers that can be co-packaged and edge-coupled with the PIC 1402. In some examples, the lasers are integrated directly into the PIC 1402 using heterogenous or homogenous integration. Homogenous integration allows lasers to be directly implemented in the silicon substrate in which the waveguides of the PIC 1402 are formed, and allows for lasers of different materials, such as indium phosphide (InP), and architectures such as, quantum dot lasers. Heterogenous assembly of lasers on the PIC 1402 allows for group III-V semiconductors or other materials to be precision-attached onto the PIC 1402 and optically coupled to a waveguide implemented on the PIC 1402.

Multiple circuit packages 1400, can be interconnected to result in a single system providing a large electro-photonic network (e.g., by connecting several chip-level electro-photonic networks as described below). Multiple circuit packages configured as ML processors can be interconnected to form a larger ML accelerator, e.g., including circuit packages configured as network switches as described below. For example, the photonic channels within the several circuit packages or ML processors, the optical connections, the laser light sources, the passive optical components, and the external optical fibers on the PCB, may be utilized in various combinations and configurations along with other photonic elements to form the photonic fabric of a multi-package system or multi-ML-processor accelerator.

FIG. 2-1 illustrates an example of a circuit package 200 implementing an intra-chip bidirectional photonic channel between a first compute node 304-1 and a second compute node 304-2. The circuit package 200 includes various electronic and optical components implemented across an EIC 301 and a PIC 302. The circuit package 200 includes two compute nodes 304-1 and 304-2 (collectively, compute nodes 204) which each include a respective compute block 358-1 and 358-2 which may include various processing, storage, and/or communication functions. The compute nodes 304 each include an AMS block 360-1 and 360-2 (collectively, AMS blocks 360) that includes analog/mixed signal circuits for interfacing with the PIC 302. The compute blocks 358 each include an interface 292-1 and 292-2 (collectively, interfaces 292) for communicating with the AMS blocks 360, or more specifically, with the componentry of the AMS blocks 360. The AMS blocks 360 each include a modulator driver 362-1 and 362-2 (collectively, drivers 362) and each include a transimpedance amplifier 364-1 and 364-2 (collectively, TIAs 264).

The PIC 302 includes a pair of modulators 356-1 and 356-2 and a pair of photodetectors 366-1 and 366-2. The PIC 302 also includes a grating coupler 354 (or any other optical coupler (OC) configured to receive and pass on light to one or more components) and a splitter 368.

A light engine 350 provides an optical carrier signal for communication between the first compute node 304-1 and second compute node 304-2. The light engine 350 provides the carrier signal to a FAU 332 of the circuit package 300, such as through an optical fiber. The FAU 332 is optically coupled to the grating coupler 354 which directs the optical carrier signal on to other components of the electronics package 200. A splitter 368 receives the optical carrier signal from the grating coupler 354 and splits the optical signal along two optical paths 370 and 372. More generally, the splitter 368 can distribute the optical carrier signal over any number of photonic paths consistent with that described herein. The optical paths 270 and 272 can be implemented as any suitable optical transmission medium, and can include a mixture of waveguides and optical fibers, or any other transmission medium consistent with that described herein. In the present example, the optical paths 270 and 272 are implemented as waveguides in the PIC 302.

The optical paths 370 and 372 pass from the splitter 368 to the optical modulators 356-1 and 356-2, respectively. Each optical modulator 356 modulates the optical carrier signal it receives from the splitter 368 based on information from its respective optical driver 362-1 and 362-2 and transmits the modulated signal along the respective optical path. A first photodetector 266-1 receives the modulated signal from the optical path (e.g., from the associated modulator 256). As depicted, the optical path from modulator 356-1 connects to photodetector 266-2 and the optical path from modulator 356-2 connects to photodetector 266-1. The photodetectors convert the received modulated signals into respective electronic signals and pass the electronic signals to a transimpedance amplifiers 264 which facilitate the compute nodes 304-1 and 304-2 receiving the information encoded in the signals. In this way, communication occurs between the compute nodes through the various components just described. The PIC 302 described here includes an example of an intra-chip bidirectional photonic channel, including two unidirectional photonic links for facilitating communications both to and from each compute node. Here, the first unidirectional photonic link is defined by the modulator driver 362-1, the optical modulator 356-1, the optical path 370, the photodiode 366-2, and the transimpedance amplifier 364-2. Similarly, the second unidirectional link is defined by the modulator driver 362-2, the optical modulator 356-2, the optical path 370, the photodiode 366-1, and the transimpedance amplifier 364-1. The first and second unidirectional links operate in opposite directions. Additionally, one or more of the compute nodes 304 can include one or more serializers and/or a deserializers for further facilitating communications of signals between the compute nodes 304. In this way, the two unidirectional photonic links form the intra-chip bidirectional photonic channel 342.

FIG. 2-2 illustrates an example circuit package 210 implementing an inter-chip bidirectional photonic channel between the compute node 304 and an additional compute node 254 located on an additional circuit package 290, such as a memory node on a memory circuit package. The compute node 304 and/or the electronics package 210 can include the EIC 301 and the PIC 302 including the components discussed above in connection with FIG. 2-1. Further, PIC 302 includes a demultiplexer 380 and a multiplexer 390. In general, a demultiplexer and multiplexer can be used in a PIC for wavelength division multiplexing of optical signals.

In the inter-chip configuration shown in FIG. 2-2, the optical modulator 356 transmits a modulated signal along an optical path 374 to the grating coupler 354. The modulated signal is passed through the multiplexor 390 prior to passing to the grating coupler 354. From the grating coupler 354, the modulated signal travels through the FAU 332 and along an optical fiber to another grating coupler of the additional circuit package 290, where the receiving componentry of the additional circuit package 290 receives and processes the incoming signal. The receiving componentry can be the same as or similar to the receiving componentry of the circuit package 300 discussed above, or can include any other means for receiving and processing the incoming signal.

Similarly, the additional circuit package 290 generates and transmit a signal to the compute node 304. The additional circuit package 290 can generate and transmit the signal using transmitting componentry that may include transmitting componentry similar to or the same as that of the circuit package 210 discussed above, or any other means. The additional circuit package 290 transmits a signal, for example, along an optical fiber to the FAU 332 and grating coupler 354 of the compute node 304. The signal travels along an optical path 276 to the photodetector 366 which converts the optical signal to an electronic signal as discussed herein. The received signal passes through the demultiplexer 280 prior to passing to the photodetector 266. In this way, an inter-chip bidirectional photonic channel is defined by two unidirectional photonic links. Here, the first unidirectional photonic link is defined by the modulator driver 362, the optical modulator 356, the optical path 374, the multiplexor 378, the grating coupler 354, the FAU 332, an optical fiber, and receiving componentry of the additional circuit package. Similarly, the second unidirectional photonic link is defined by the transmitting components of the additional circuit package 290, the optical fiber, the FAU 332, the grating coupler 354, the demultiplexer 380, the optical path 376, the photodetector 366, and the transimpedance amplifier 364. The first and second unidirectional photonic links operate in opposite directions. In this way the two unidirectional photonic links forms the inter-chip bidirectional photonic channel.

FIG. 3-1 is a diagram illustrating an example of a circuit package 300 implementing multiple compute nodes 304. Each compute node 304 (and more specifically, a message router in each compute node 304) connects to one or more electronic channels 3040. The compute nodes 3004 (e.g., via the message routers) direct messages transmitted over the electronic channels 340, such as that described herein in connection with FIG. 1-2. Additionally, the circuit package 300 includes an EIC 301 and a PIC 302, with the compute nodes 304, routers, and electronic channels 340 being implemented on the EIC 301 as described herein. The circuit package 300 can include additional circuitry and/or componentry in addition to that shown in FIG. 3-1.

The sixteen compute nodes 304 are arranged in a four-by-four array are indexed, for case of reference, according to the cartesian coordinates [0,0] through [3,3] as shown. The array of the compute nodes 304 includes four corner nodes, eight non-corner edge nodes (hereinafter "edge nodes"), and four interior nodes. More generally, circuit packages can include any number of compute nodes, and the compute nodes can be arranged in any array, configuration, or arrangement consistent with the techniques described herein.

The compute nodes 304 are intra-connected through multiple electrical channels 340. In particular, each compute node 304 is connected to each adjacent compute node 304 via one of the electrical channels 340. In this way, the corner nodes are each connected to two adjacent nodes through two electrical channels, the edge nodes are each connected to three adjacent nodes through three electrical channels, and the interior nodes are connected to four adjacent nodes through four electrical channels. In this way, the compute nodes 304 form an electronic network 341 for communicating and/or transmitting messages between the compute nodes 304 via the electronic channels 340. Each of the compute nodes 304 is connected either directly (e.g., to adjacent nodes) or indirectly (through one or more other nodes) to all other compute nodes 3004. The connecting of all adjacent compute nodes 304 via the electrical channels 340 in this way represents a maximum adjacency configuration for the electronic network 341 in that all adjacent nodes are connected. This can facilitate a more complete, faster, and/or more robust electronic network providing a maximum amount of transmission paths between nodes and/or through the network, as will be described herein in further detail. In this way, the electronic network 341 may be configured in a rectangular mesh topology.

More generally, electronic networks connecting compute nodes can be configured according to other topologies. For example, one or more nodes may not be connected to all adjacent nodes (e.g., one or more of the electronic channels 340 of the rectangular mesh topology may be omitted). For example, every node may be connected to at least one other node (and may accordingly be intra-connected to all other nodes) but may not necessarily be connected to each adjacent node. In a non-limiting example, each interior node may be connected to only one edge node and no other nodes. Any number of topologies for electronically intra-connecting all compute nodes 304 without connecting all adjacent nodes will be appreciated by one of ordinary skill in the art, and such configurations are contemplated by this disclosure. The connecting of all nodes with a less-than-maximum adjacency configuration in this way may represent an intermediate adjacency configuration (e.g., less than all adjacent nodes connected) or even a minimum adjacency configuration (e.g., minimum amount of adjacent connections to maintain connectivity of all nodes). Intra-connecting the compute nodes 304 in a less-than-maximum adjacency configuration in this way may simplify the design, production, and/or implementation of an electronic network and/or a circuit package. For example, such a configuration can simplify determining transmission paths through the network to facilitate simpler routing of messages.

In some examples, one or more electrical channels 340 connect non-adjacent nodes. This may be in connection with either of the maximum adjacency or less-than-maximum adjacency configurations just discussed. Such a configuration may increase or even maximize use of configurable electronic connections for each compute node 304 to increase the robustness and speed of the electronic network 341.

The intra-connection of the compute nodes 304 in this way may facilitate transfer of messages through the electronic network 341. For example, messages may be directly transferred between routers of any two compute nodes 304 that are directly connected (e.g., adjacent). Message transfer between any two compute nodes 304 that are not directly connected may also be accomplished by passing the message through one or more intervening compute nodes 304. For example, for a message originating at node [0,3] and destined for transmittal to node [1,2], the router for node [0,3] may transmit the message to the router for node [0,2] which may then ultimately forward or transmit the message to the router for node [1,2]. Similarly, transmittal of the message could be implemented through the path [0,3]-[1,3]-[1,2]. In this way, messages may be transmitted between any two indirectly connected (e.g., non-adjacent) nodes by one or more "hops" along a path through one or more intervening compute nodes 3004 within the electronic network 341.

As described herein, each of the compute nodes 304 can be configured to connect to one or more (e.g., up to four) bidirectional photonic channels for two-way data transmission between nodes. As will be appreciated by one of ordinary skill in the art, photonic channels are typically faster and more energy efficient than electronic channels as distance or resistance increases. As will be discussed in connection with the various configurations below, in some examples, various compute nodes 304 are connected through bidirectional photonic channels to leverage the speed and energy efficiency of the photonic channels for an improved network. In some examples, however, adjacent compute nodes 304 are not intra-connected with bidirectional photonic channels, but rather are still connected through the electronic network 341 shown and described in connection with FIG. 3-1. Implementing the electronic network 341 in this way for adjacent connections may allow the photonic ports of each compute node 304 to be utilized for (e.g., up to four) bidirectional photonic connections with non-adjacent nodes, and nodes included in other circuit packages as described herein. This can help to increase speed, robustness, and completeness of the network of compute nodes 304 despite employing the slower, less-efficient electronic connections for adjacent nodes. For example, transmittal speed and energy efficiency for electronic channels typically diminishes with distance, while photonic channels can maintain a high speed and energy efficiency over longer distances. Accordingly, utilizing the electronic channels 340 for short interconnects between (e.g., closely) adjacent nodes while implementing the faster, more energy efficient photonic connections for connections between more distant nodes can increase the overall (and/or average) speed of the network as well as reduce the energy consumption. In this way, implementing the electronic network 341 may facilitate improved network performance by enabling the various configurations of the photonic channels and network topologies described below. The foregoing hardware configuration can allow for flexibility when code is executed because software schemes, compilers, schedulers, and the like, can take advantage of and/or route packets through electronic or photonic channels in a manner most advantageous for the needs off the algorithm that is being executed.

As is evident in the example network of FIG. 3-1, the further the separation between two nodes, the greater the number of hops and the greater the amount of possible transmission paths between the two nodes. For example, to transmit a message from node [0,1] to node [3,2] at least four hops are needed. In a more extreme case, a message transmitted between node [0,0] and node [3,3], can be accomplished in no less than six hops. In some examples, one or more non-adjacent compute nodes 304 are connected to facilitate reducing a number of hops for one or more transmission paths between the compute nodes 3004.

FIGS. 3-2 and 3-3 are each diagrams illustrating an example of the circuit package 300 of FIG. 3-1 with multiple connections between non-adjacent compute nodes 304. The multiple non-adjacent connections can be implemented either separately or in connection with the adjacent connections discussed above in connection with FIG. 3-1.

In some examples, the circuit package 300 includes one or more intra-chip bidirectional photonic channels 342. The intra-chip bidirectional photonic channels 342 are implemented in the PIC 302. In some examples, the intra-chip bidirectional photonic channels connect one or more pairs of non-adjacent compute nodes 304. For example, one or more of the compute nodes 304 positioned along a periphery of the array (e.g., corner and edge nodes or "peripheral nodes") may be connected to another peripheral node through an intra-chip bidirectional photonic channel 342. In some examples, all of the peripheral nodes are connected to another peripheral node through an intra-chip bidirectional photonic channel 342. In some examples, each peripheral node is connected to a peripheral node at an opposite end of the array. For example, each corner node is connected to the two corner nodes on adjacent sides of the array, such as node [0,3] being connected to node [3,3] and node [0,0]. Additionally, each edge node is connected to the (one) edge node positioned on the opposite side of the array (e.g., in a same position on the opposite side of the array). For example, edge node [2,0] is connected to edge node [2,3], and edge node [0,1] to edge node [3,1]. None of the interior nodes are connected to the intra-chip bidirectional photonic channels 342. In this way, each side of the array may be wrapped, or connected to the opposite side of the array through the connections of the peripheral nodes by the intra-chip bidirectional photonic channels 342.

The intra-chip bidirectional photonic channels 342 are implemented in the PIC 302. For example, as described above, each compute node 304 may include one or more photonic ports in a PIC layer of the compute node 304, and a waveguide may connect photonic ports of a pair of compute nodes 304. In some examples, the waveguide is an internal waveguide implemented or formed in the PIC 302. In this way the PIC 302 can be manufactured with the waveguides included for implementing the intra-chip bidirectional photonic channels 342. In some examples, the waveguides include an external waveguide such as an optical fiber for implementing the intra-chip bidirectional photonic channels 342.

The intra-chip bidirectional photonic channels 342 may be implemented in addition to the electrical channels 340 connecting the compute nodes 304 into the electronic network 341. For clarity and for ease of discussion, the electronic channels 340 are not shown in FIG. 3-2, but can be seen implemented in conjunction with the intra-chip bidirectional photonic channels 342 in FIG. 3-3. The combination of the compute nodes 304 being connected through the electronic channels 340 and the intra-chip bidirectional photonic channels 342 in this way may form an electro-photonic network 343 (e.g., an intra-chip electro-photonic network). The electro-photonic network 343 can be an intra-chip network of the compute nodes 304, and can configure the compute nodes as a two-dimensional torus interconnect. In this way, the electro-photonic network 343 can have a toroidal mesh topology. For example, while the compute nodes 304 may be physically implemented in a two-dimensional planar array, each side of the plane may "wrap" around to an opposite side (e.g., left-right and top-bottom) such that the array may conceptually take the shape of a torus. In this way, adjacent nodes are directly connected, and peripheral nodes are conceptually "adjacent" and directly connected to the peripheral nodes on the opposite side of the array through the intra-chip bidirectional photonic channels 342.

The toroidal mesh topology of the electro-photonic network 303 in this way helps to reduce an average number of hops between pairs of compute nodes 304 in the network. In the example given above, the transmission path between node [0,1] and node [3,2] required a minimum of four hops through the electronic network 341. By implementing the electro-photonic network 343 including the intra-chip bidirectional photonic channels 342, the transmission of a message from node [0,1] to node [3,2] can be accomplished in just two hops (e.g., [0,1]-[3,1]-[3,2]). Similarly, the transmission path from node [0,0] to [3,3] is reduced from six hops in the electronic network 341 down to two hops in the electro-photonic network 343. In this way, implementing the electro-photonic network 343 may increase the speed, reliability, and robustness of the network of compute nodes 304 by enabling delivery of messages through less hops. Additionally, the electro-photonic network 343 may accordingly reduce an overall amount of traffic that individual routers process as a message traverses the network.

Figures 1, 2, 3, 4:
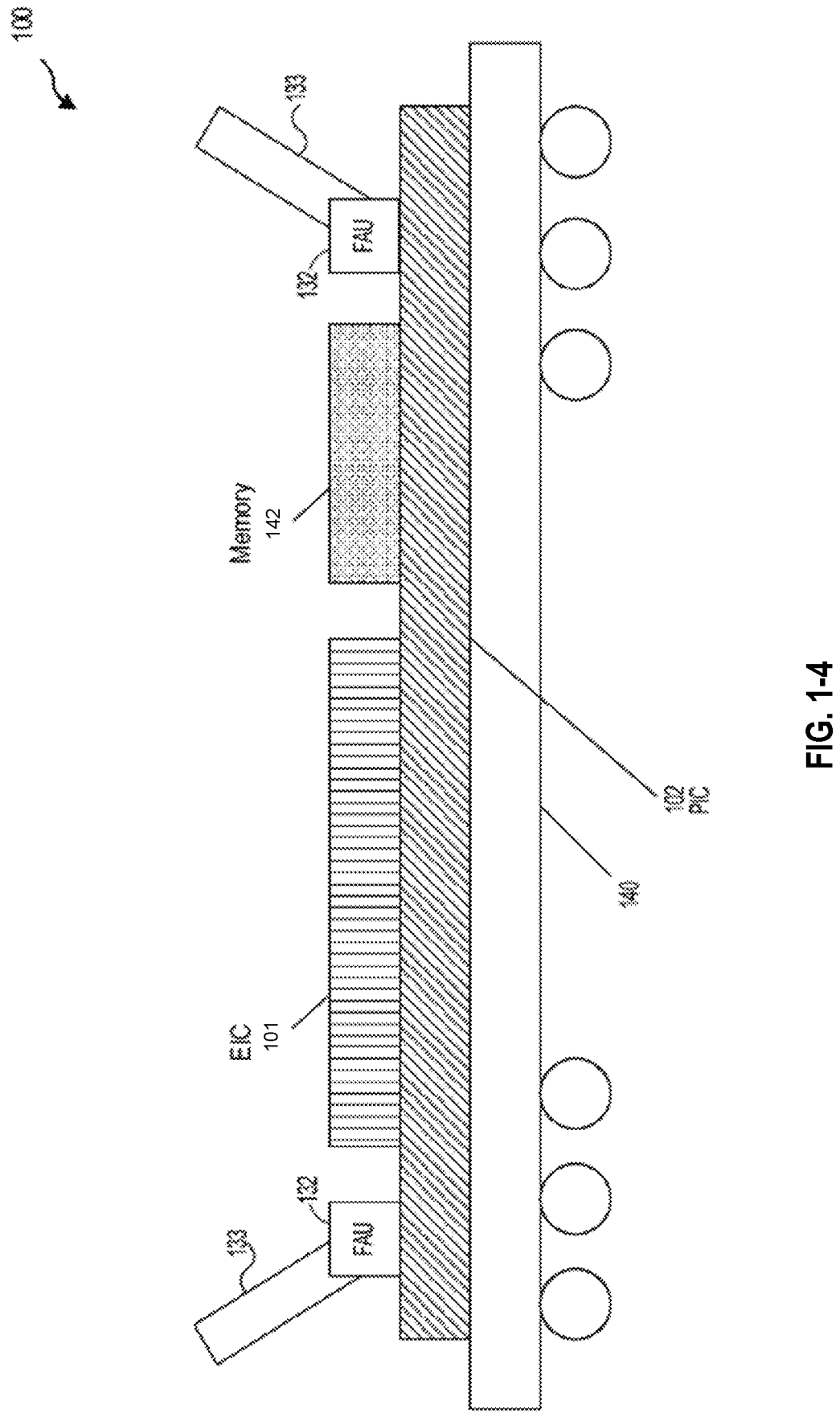
Figure 2:
Figure 1:
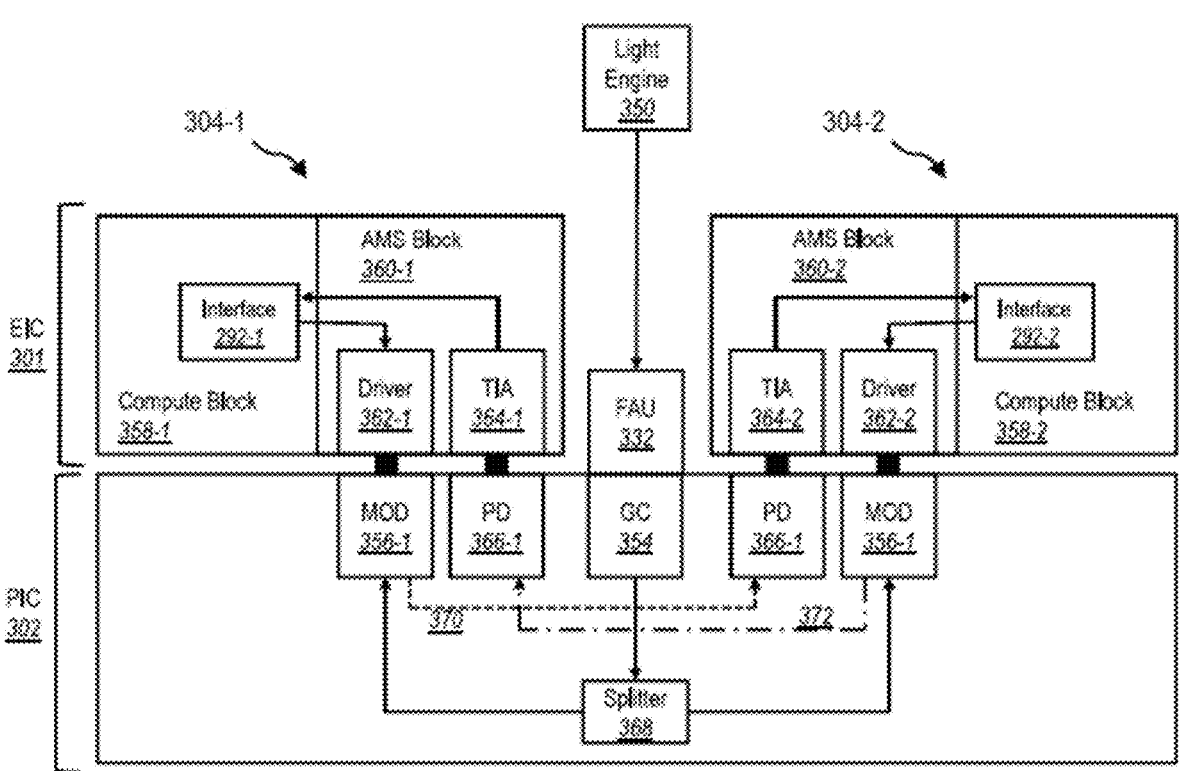
Figure 2:
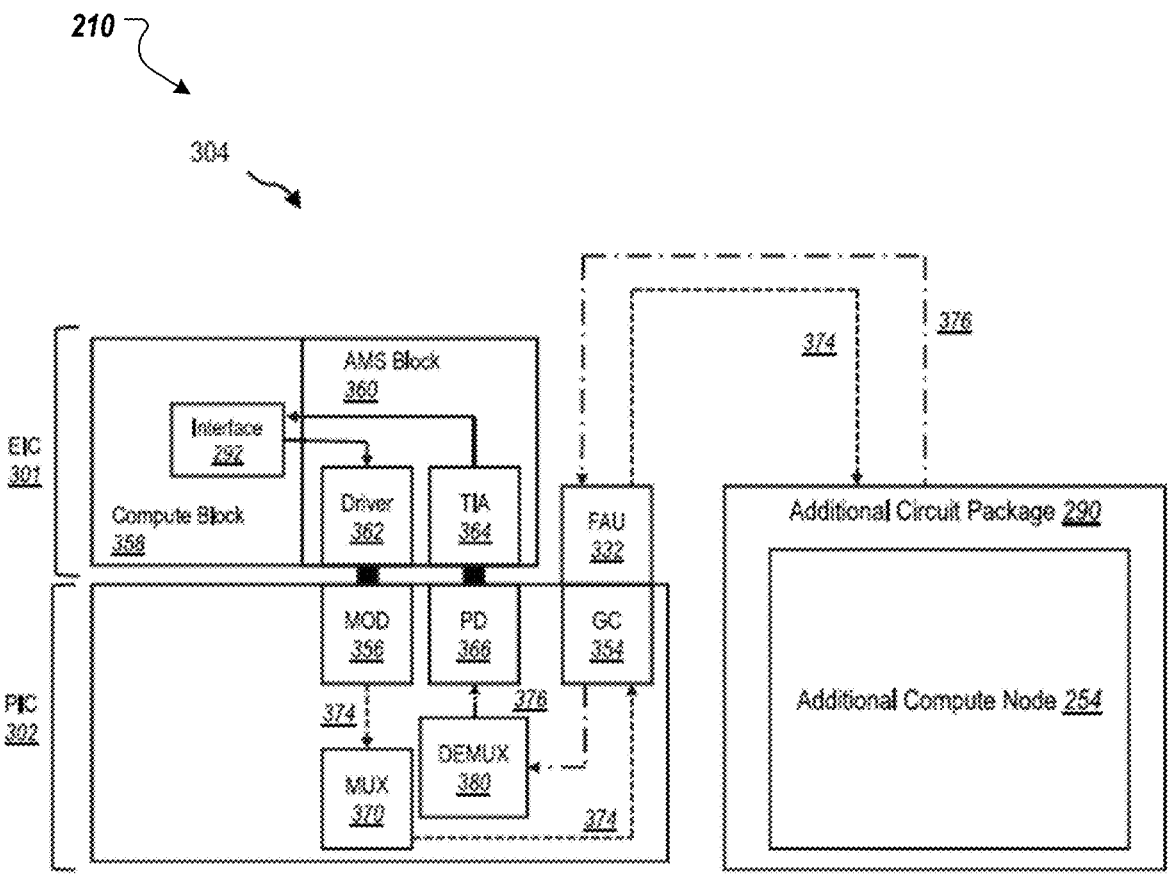

FIG. 3-4 is a diagram illustrating an example of the circuit package 300 of FIG. 3-1 implementing multiple connections to one or more additional circuit packages. The circuit package 300 can include one or more inter-chip bidirectional photonic channels 344 to connect one or more of the compute nodes 304 to one or more additional computing devices of other circuit package(s). The inter-chip bidirectional photonic channels 344 can be implemented either separately or in connection with the electronic channels 340 discussed above in connection with FIG. 3-1 and/or the intra-chip bidirectional photonic channels 342 discussed above in connection with FIGS. 3-2 and 3-3.

In some examples, the inter-chip bidirectional photonic channels 344 are implemented using exterior waveguides such as optical fibers. For example, an optical fiber can couple with any suitable optical interface, such as a FAU (as described in connection with FIGS. 2-1 and 2-2) included in the circuit package 300 to connect to the photonic port(s) of one or more compute nodes 304 through an interior waveguide. In some examples, an optical fiber connects directly to a photonic port of one or more compute nodes 304 without an interior waveguide. The optical fiber may have a similar connection with one or more computing devices of a separate circuit package with which it connects. For example, the optical fiber may connect two circuit packages by connecting to an FAU of each circuit package. One or more optical fibers connected in this way may form one or more unidirectional photonic links including drivers, modulators, waveguides, grating couplers, FAUs, photodiodes, and transimpedance amplifiers associated with each circuit package. In this way, the inter-chip bidirectional photonic channels can be formed using any of the components described herein in connection with FIGS. 2-1 and 2-2.

In some examples, the inter-chip bidirectional photonic channels 344 connect to one or more of the peripheral nodes. In some examples, each of the peripheral nodes connect to an inter-chip bidirectional photonic channel 344. For example, each corner node may connect to two inter-chip bidirectional photonic channels 344, and each edge node may connect to one inter-chip bidirectional photonic channel 344. The connection of the peripheral nodes in this way may facilitate connecting and/or arranging multiple circuit packages into a grid or array. For example, as will be discussed in further detail below, in some examples, the multiple circuit packages 300 are connected together in an array to form a larger interconnect and/or network via the inter-chip bidirectional photonic channels 344. In some examples, the circuit package 300 connects to similar or complimentary circuit packages in place or in addition to connecting to identical or other instances of the circuit package 300. In this way, the inter-chip bidirectional photonic channels 3044 may facilitate incorporating the circuit package 300 and the compute nodes 304 into a larger inter-chip network.

In some examples, the circuit package 300 includes the inter-chip bidirectional photonic channels 344 in addition to the electronic channels 340 and the intra-chip bidirectional photonic channels 3042 described above. For clarity and for ease of discussion, only the inter-chip bidirectional photonic channels 344 are shown in FIG. 3-4, but an implementation with all of the channels can be seen in FIG. 3-5. The combination of the compute nodes 304 being connected through the electronic channels 340, the intra-chip bidirectional photonic channels 342, and the inter-chip bidirectional photonic channels 344 in this way may form a larger, inter-chip electro-photonic network 345. For example, the inter-chip bidirectional photonic channels 344 can facilitate joining or connecting the (e.g., intra-chip) electro-photonic network 343 with intra-chip networks of one or more other circuit packages into a larger, more robust network.

In the various example described and shown in connection with FIGS. 3-2 to 3-5 (and other examples described herein as well) the various photonic channels (both inter-chip and intra-chip) have been depicted as connected or terminating at an edge of the compute nodes 304. It should be understood, however, that these depictions are intended to be illustrative of the connectivity of the various components described herein and are not intended to be limiting with respect to an actual physical layout or implementation of the various components. For example, the various photonic channels may extend within or underneath the compute nodes 304. The various channels may terminate or end at a transceiver or AMS block of the compute nodes 304. The various channels may terminate or end at a inner region (e.g., central) region or location within the compute nodes 304. Additionally, while the compute nodes 304 are shown as connecting to the various channels at North, East, South, and/or West positions of the compute nodes 304, it should be understood that this is merely illustrative and the photonic ports of the compute nodes 304 can be located at any location with respect to the compute nodes 304, including one or more photonic ports at the same or adjacent location. For example, all four photonic ports of a compute node 304 may be located at the same location of the compute node 304.

In some examples, the circuit package 300 is connected via the inter-chip bidirectional photonic channels 344 to one or more additional circuit packages 300. FIG. 4 illustrates an example implementation of four of the circuit packages 300 of FIG. 2-1 being interconnected. In particular, a system 400 includes circuit packages 300' arranged in a two-dimensional array. The circuit packages 300' include a circuit package 300-1 (top-left), 300-2 (top-right), 300-3 (bottom-left), and 300-4 (bottom-right). As shown, the peripheral (corner, or non-corner, edge) nodes on each side of a circuit package that is adjacent a side of another circuit package may connect directly to a corresponding, "adjacent" node on the adjacent circuit package via inter-chip bidirectional photonic channels 344. In this way, the circuit packages 300-1 to 300-4, form a grid of 64 compute nodes 304 arranged in eight rows of eight adjacent and directly connected compute nodes 304.

In some examples, each of the circuit packages 300' include the electronic connections between adjacent nodes and/or the intra-chip bidirectional photonic channels between peripheral nodes. For clarity, such connections are not shown in FIG. 4. In this way, the benefits discussed above of the intra-connectivity of the compute nodes 304 within a single circuit package may similarly be applied to the inter-connectivity of multiple circuit packages 300' into a larger, inter-chip network. For example, what would take 10 hops through adjacent nodes to transmit a message from the top-left node of circuit package 300-1 to the bottom-right node of circuit package 300-2 may be achieved in 4 hops by utilizing the intra-chip bidirectional photonic channels connecting peripheral nodes within each circuit package as described above.

As shown, all of the peripheral nodes of each circuit packages 300' are connected to one or more inter-chip bidirectional photonic channels 344. For example, in addition to adjacent sides of the circuit packages 300' being directly connected, one or more of the peripheral nodes on non-adjacent sides (e.g., on a periphery of the inter-chip grid) may also be directly connected to other nodes. Any number of configurations or topologies of the inter-chip electro-photonic network 345 may be contemplated by interconnecting nodes with the inter-chip bidirectional photonic channels 344. Such configurations can reduce and/or minimize a number of hops between pairs of compute nodes 304 by leveraging the configurability of each compute node 304 to connect to two or more (or any quantity of) photonic channels (in this example four are shown). In this way, high network efficiency and flexibility for various routing schemes (depending on the algorithm being executed) may be maintained even for networks implementing multiple circuit packages and/or large numbers of compute nodes.

In general, the photonic interconnect platform described here can be used for either or both memory disaggregation and signal routing. For example, signal routing includes transmitting data packets between compute nodes in an electro-photonic network, where the routes include either or both photonic channels and electrical channels, e.g., electrical links, electrical interconnects, or other types of conductors that conduct electronic signals. Transmitting a data packet across a photonic channel includes encoding a data packet in an optical signal with an optical modulator. The network transmits a signal from a first compute node through an optical waveguide to a second compute node where it is detected by a photodetector. Transmitting a data packet across an electrical channel includes sending an electronic signal directly over electrical connections between the first and second compute nodes. In some examples, transmitting data between a first compute node and a second non-adjacent compute node that may be positioned far from the first compute node, e.g., on the opposite side of an array of compute nodes, with a direct electrical connection between the two nodes may require one or more buffers to accommodate transmission delays and bandwidth mismatches between transmitters and receivers. In some examples, a compute node can transmit a data packet to a non-adjacent compute node by instructing the data packet to traverse the electro-photonic network through adjacent nodes until the second node is reached. In some other examples, the electro-photonic network can be used for memory disaggregation. For example, a compute node can transmit a data packet through the electro-photonic network to a centralized memory appliance.

In certain examples, a compute node transmits a data packet to a second compute node to continue processing according to a specific computational task or software program. For example, a common implementation in relation to neural networks is at inference time, the computations corresponding to each neural network layer is performed in a corresponding compute node. The output of a computation from the first compute node is routed to the second compute node to perform the computation corresponding to the second neural network layer. As another example, a compute node transmits a data packet to a memory node to perform a memory operation. The memory node can be a memory appliance adjacent to the compute node, a memory appliance on the same substrate as the compute node, or a memory appliance on a separate substrate as the compute node.

FIGS. 5-1 to 5-29 and 6-1 to 6-3 illustrate example semiconductor devices that can be implemented using or otherwise included in circuit packages (e.g., SIPs) and uses of the circuit devices. The devices include a photonic interconnect platform that includes an electronic circuit layer and a photonic circuit layer. Although some of the devices are shown and described as being in the form of a network switch, the configuration of the photonic interconnect platform can be used in devices for other purposes, e.g., by including different components as part of the electronic circuit layer. For example, an electronic device can include one or more of the EICs of FIG. 1-1, but without the networking components of a network switch, e.g., to serve as an ML processor. Another example device can include memory with or without a processor, and without the networking components of a network switch.

Although shown and/or described as having an electronic circuit layer and a photonic circuit layer, the devices can have multiple electronic circuit layers and/or multiple photonic circuit layers. The photonic circuit layer can include one or more photonic circuit layer portions tiled together to provide the photonic circuit layer. Each photonic circuit layer portion can correspond to a PIC (e.g., be in the form of a PIC) or the combination of the photonic circuit layers can correspond to a PIC (e.g., be in the form of single PIC). The tiling can be achieved at the manufacturing stage using multiple reticles (or other type of photomask) that break down the photonic circuit layer into smaller photonic circuit portions that fit within the field size of a reticle. Thus, each photonic circuit layer can correspond to a single reticle and have a length and width that is less than or equal to the length and width of the reticle of the lithography tools used in manufacturing. The tiling can also be achieved the packaging stage by aligning photonic circuit layers during the packaging stage, e.g., such that optical connections are aligned between adjacent photonic circuit layer portions. The photonic circuit layer portions can of a device can have any of the configurations of PICs described herein unless stated otherwise or logically implausible.

The devices can include electro-optical transceivers that convert electronic signals into optical signals and vice versa. The electro-optical transceivers are shown as having AMS blocks and MP blocks to facilitate the conversions between optical and electronic signals. However, other types of OE interfaces can be used in place of the AMS blocks and/or other types of EO interfaces can be used in place of the MP blocks. The AMS block can include an electrical portion of the electro-optical transceiver and the MP block can include the optical portion of the electro-optical transceiver. The electrical portion of the electro-optical transceiver can include a TIA and a driver, and optionally a serializer/deserializer (SerDes). The optical portion of the electro-optical transceiver can include a modulator (e.g., an EAM) and a photodetector. Other electrical and/or optical portions can also be used.

The devices can include optical couplers that are configured to couple to respective optical interfaces, e.g., FAU, that can move light into a fiber when exiting the photonic circuit layer or into a waveguide when entering the photonic circuit layer. The optical couplers can be arranged in various locations of the photonic circuit layer, e.g., on the same side as the electronic circuit layer, on the side or surface of the photonic circuit layer opposite that of the electronic circuit layer, and/or along one or more edges of the photonic circuit layer. The illustrations that follow may show the optical couplers in a particular arrangement. However, the devices can be modified such that the optical couplers are in other arrangements, including those shown for other devices, unless stated otherwise or logically implausible.

The devices can include optical connections that facilitate optical communications via waveguides that cross borders between adjacent photonic circuit layer portions. The optical connections are arranged at the borders and can be wider than the portions of the waveguides away from the border. As described in more detail below, the optical connections can be created using optical stitching at the manufacturing stage or by aligning the photonic circuit portions during packaging such that the wider portions of the waveguides in the adjacent photonic circuit layer portions are aligned at the border between the adjacent photonic circuit layer portions. Adjacent photonic circuit layer portions are those that share a border.

Figures 1, 3:
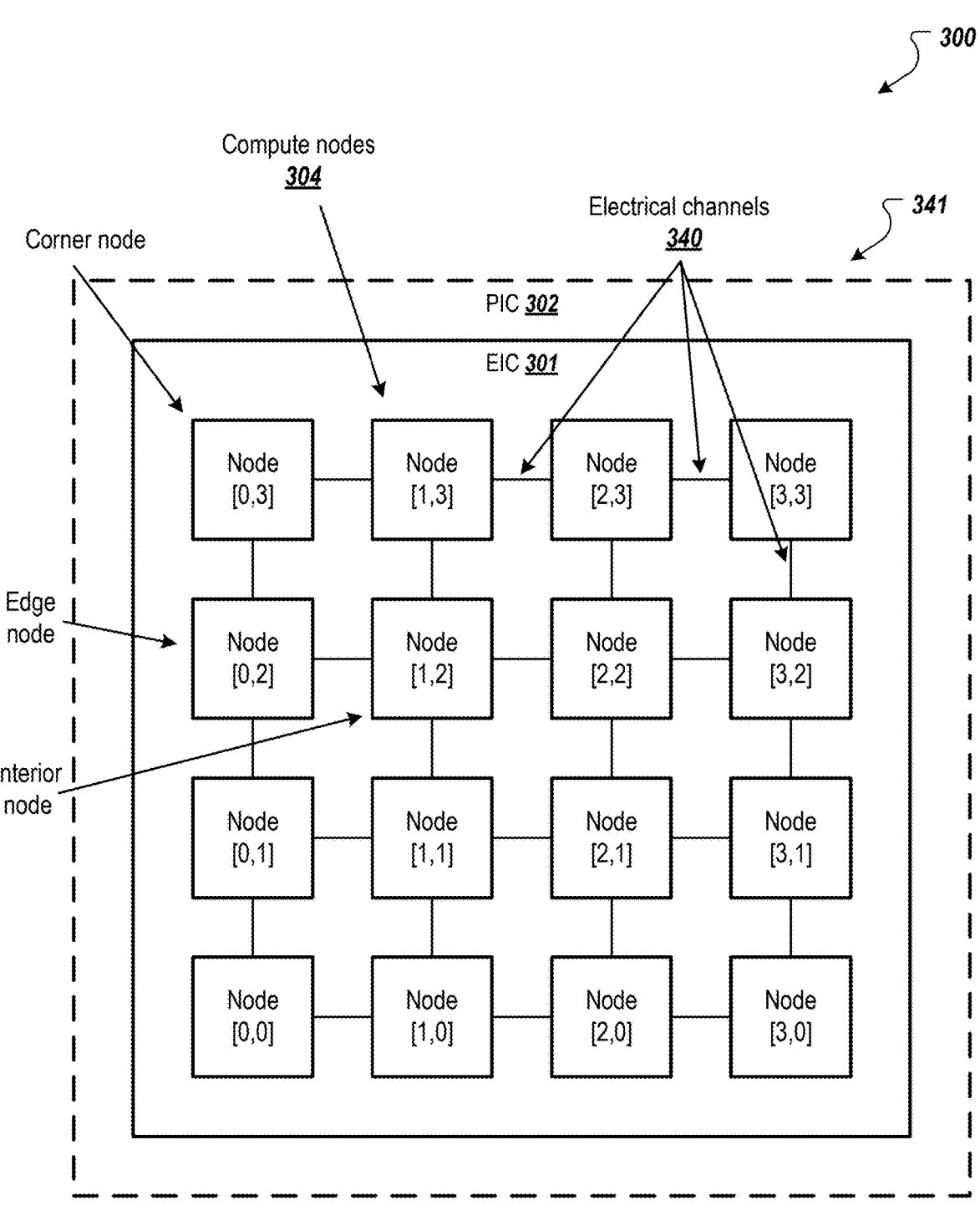
Figures 2, 3:
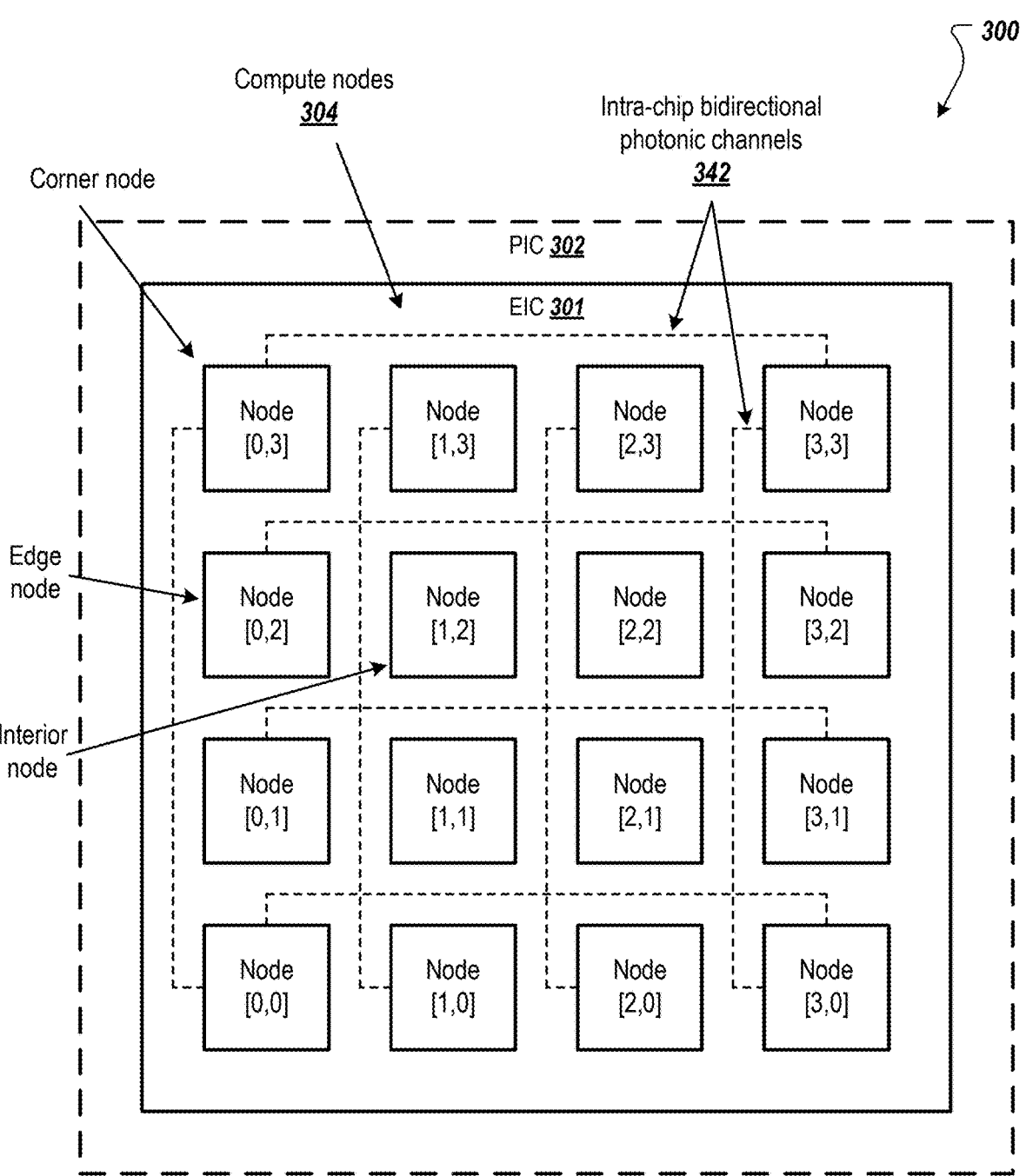
Figure 3:
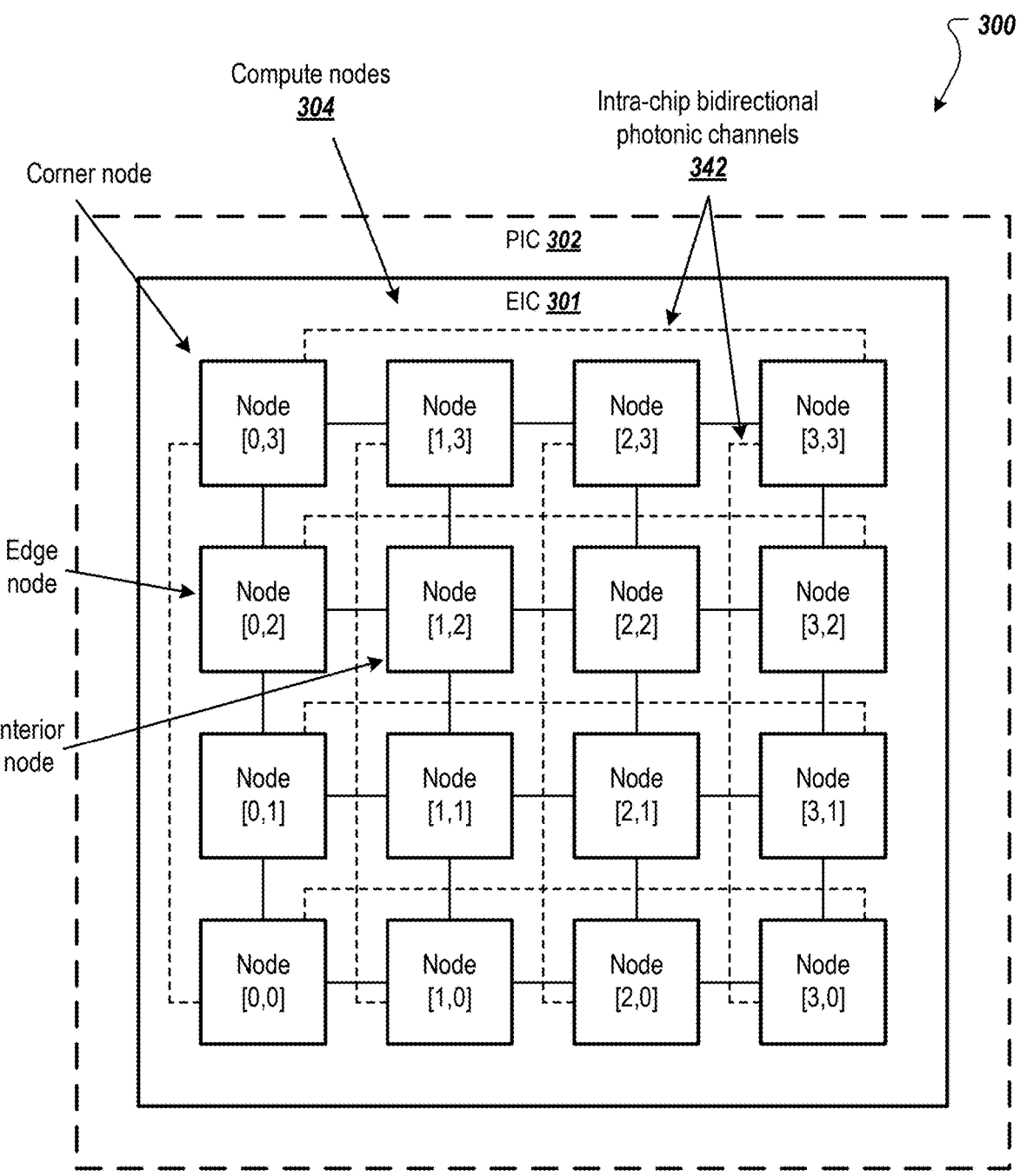
Figures 3, 4:
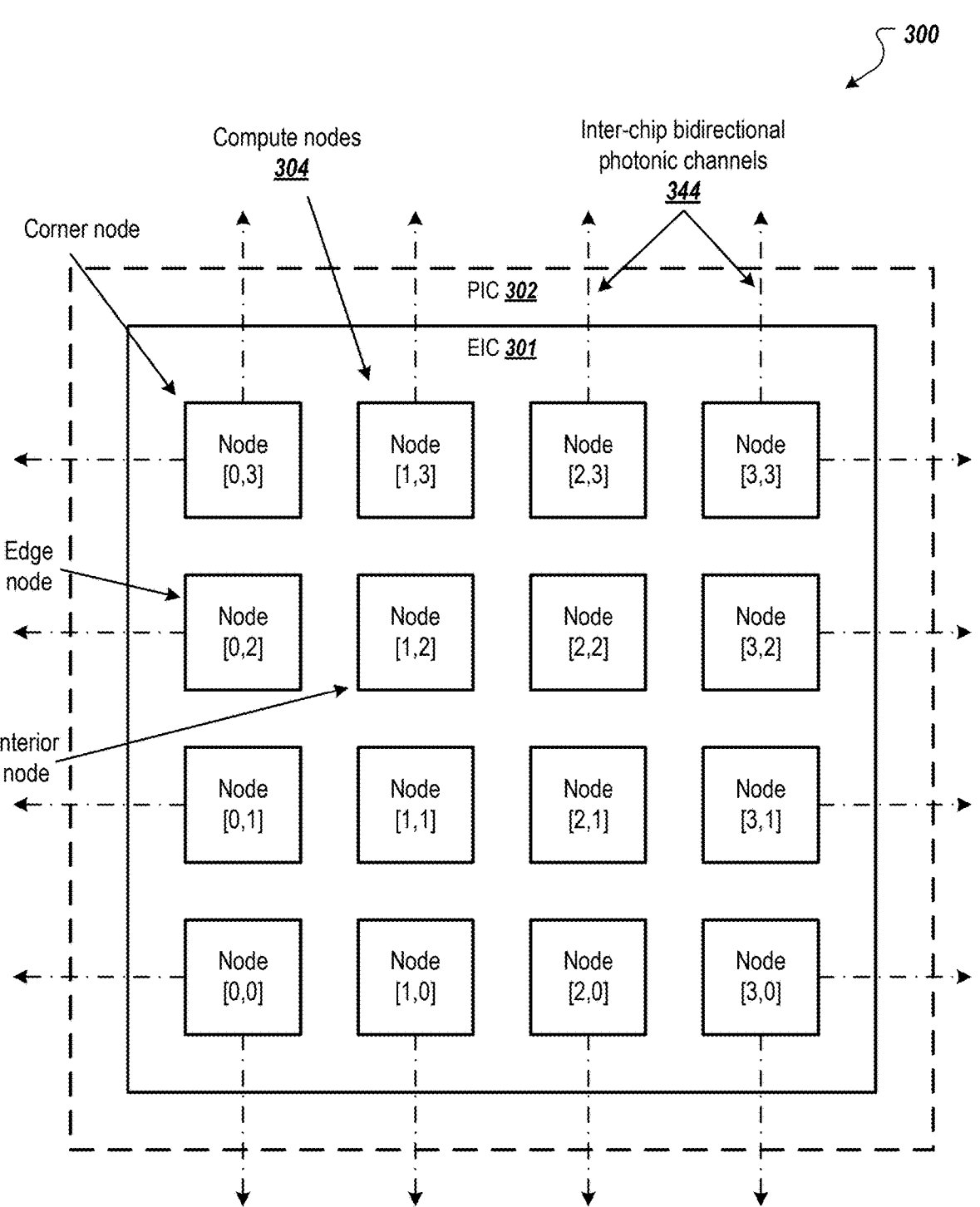
Figures 3, 4, 5:
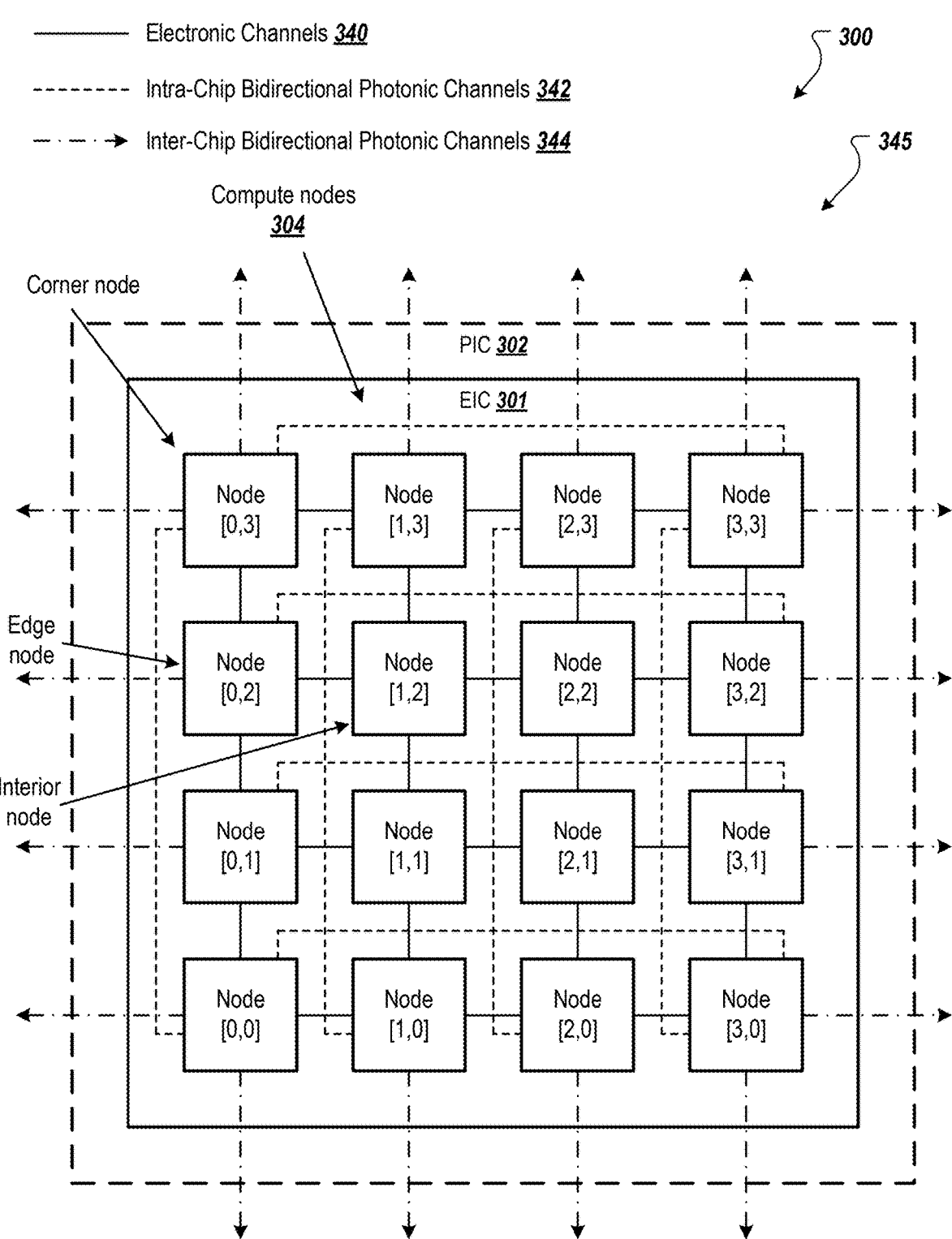
Figure 4:
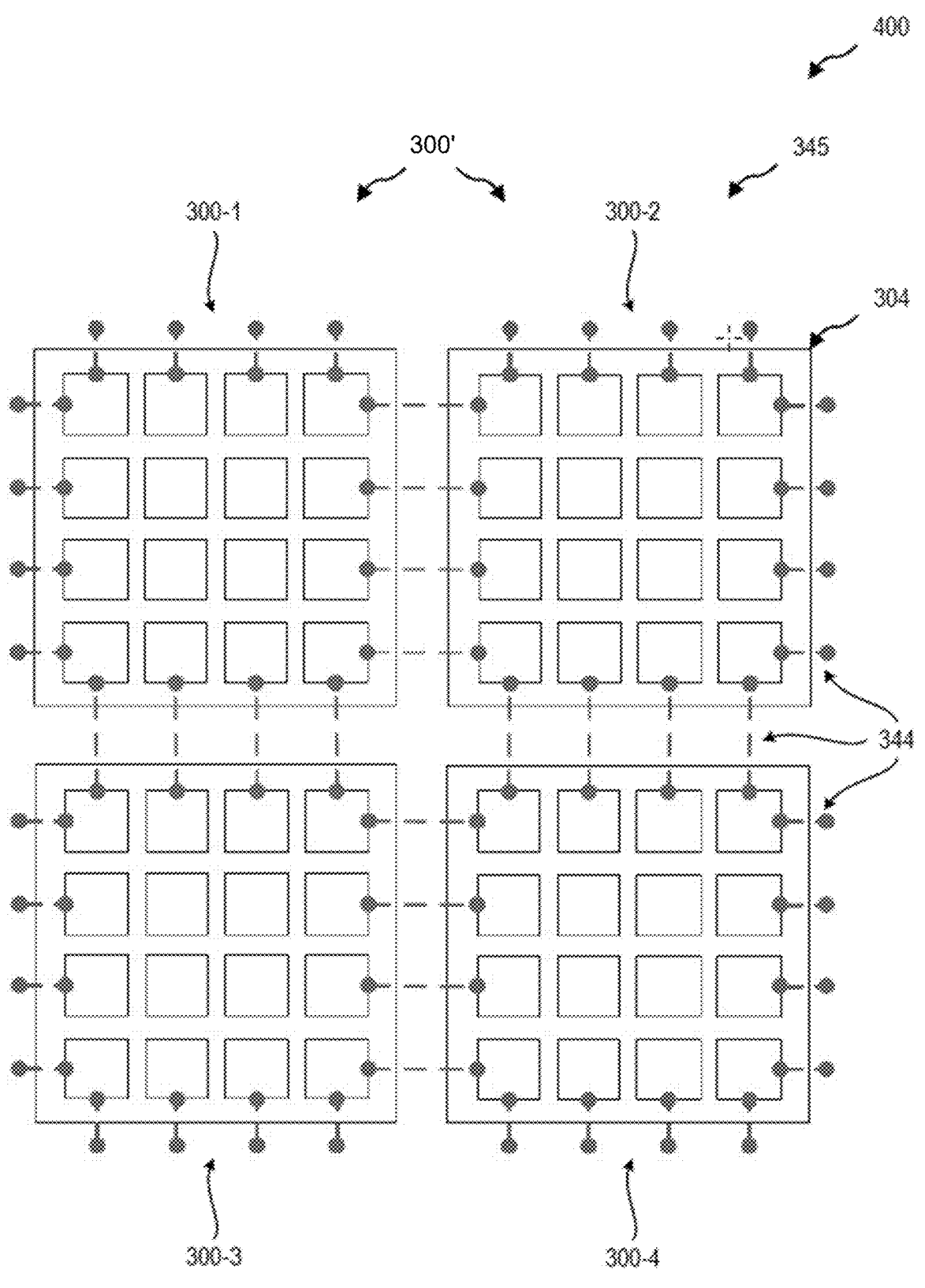

FIG. 5-1 is a diagram illustrating an example of a device 500 that includes an electronic circuit layer 501 and a photonic circuit layer 502. The photonic circuit layer 502 can be attached to, e.g., bonded to, a substrate 503. The electronic circuit layer 501 and the photonic circuit layer 502 can form a photonic interconnect platform. The electronic circuit layer 501 can arranged above the photonic circuit layer 502 and the photonic circuit layer can be disposed arranged above the substrate 503. For example, the electronic circuit layer 501 can be attached to a top of the photonic circuit layer 502 and the photonic circuit layer 502 can be attached to a top of the substrate 503.

The example device 500 can be configured to implement a network switch by including networking components, as described in more detail below. Such an example network switch can also include processing elements 550-1 to 550-4 (collectively processing elements 550) and memory nodes 530-1 to 530-16 (collectively, memory nodes 530).

The electronic circuit layer 501 can be implemented as one or more semiconductor chips (e.g., chiplets) that are attached to, e.g., bonded to, the photonic circuit layer 502, which can also be implemented as one or more semiconductor chips. The electronic circuit layer 501 can include any number of semiconductor chips attached to a photonic circuit layer that includes any number of semiconductor chips. When implemented on multiple chips, each individual chip for the electronic circuit layer 501 can be considered an EIC and each individual chip for the photonic circuit layer 502 can be considered a PIC. The EICs and PICS of the layers 501 and 502 can include any of the various arrangements of components described in this document.

Figures 1, 5:
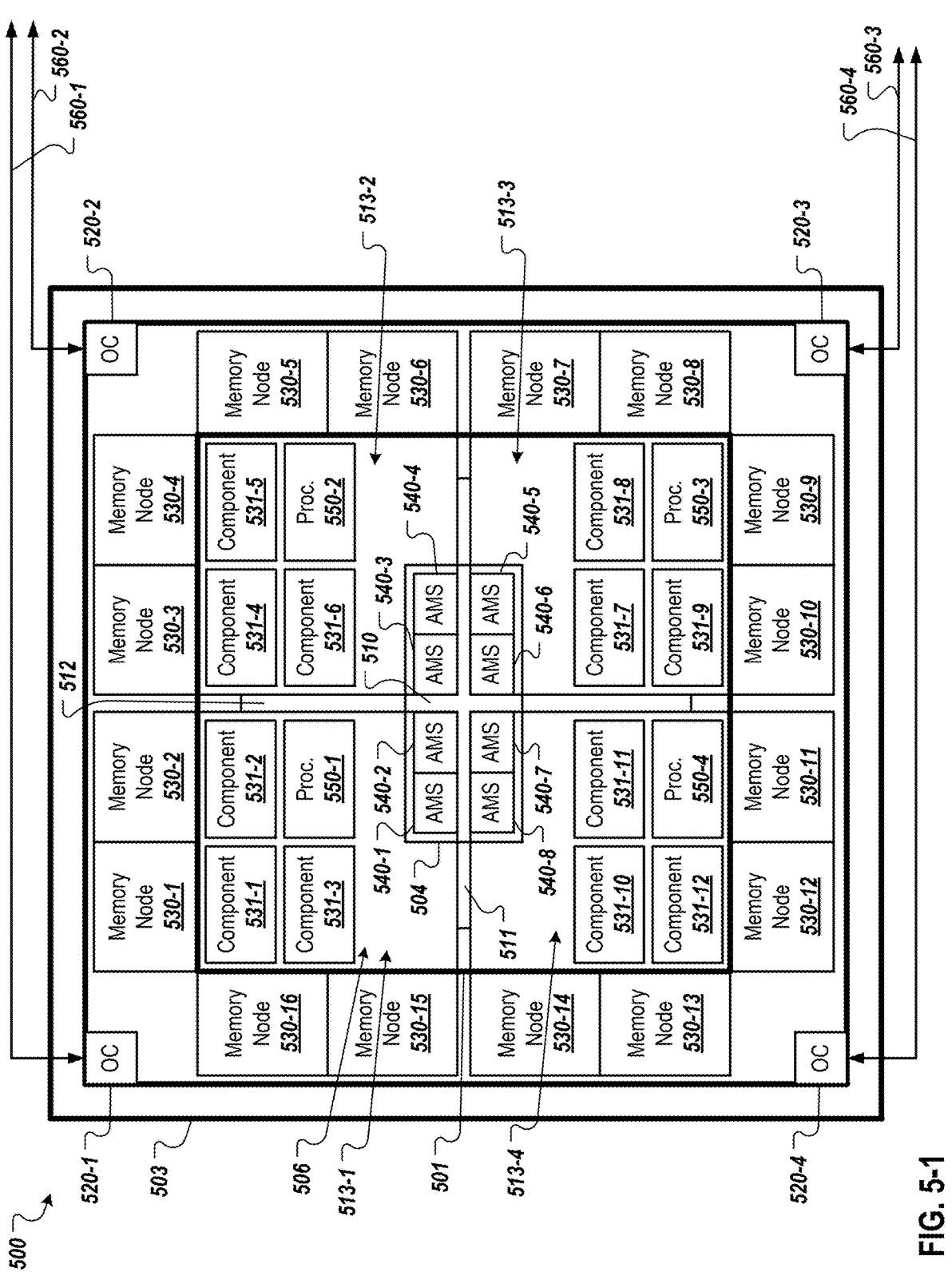
Figures 2, 5:
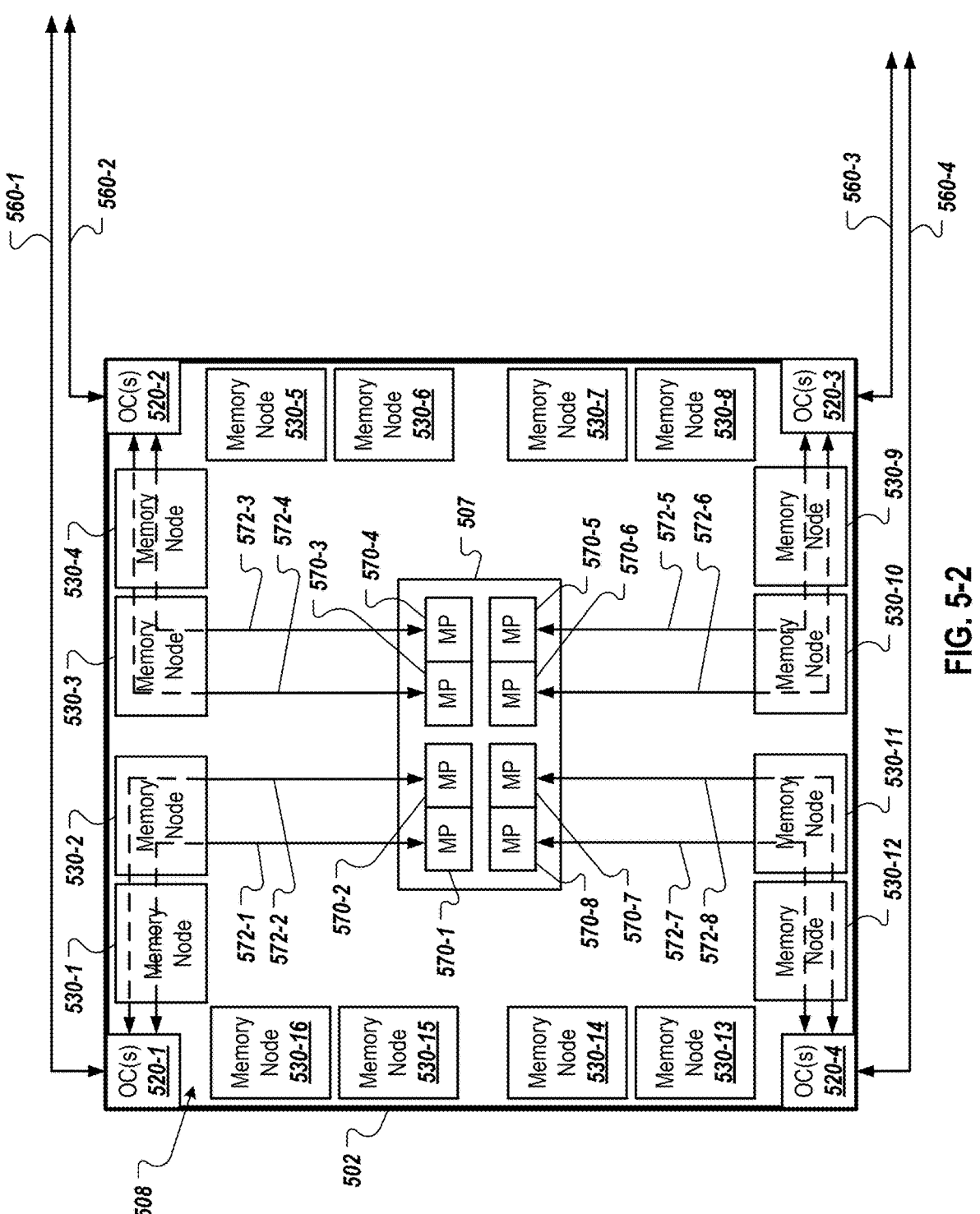
Figures 3, 5:
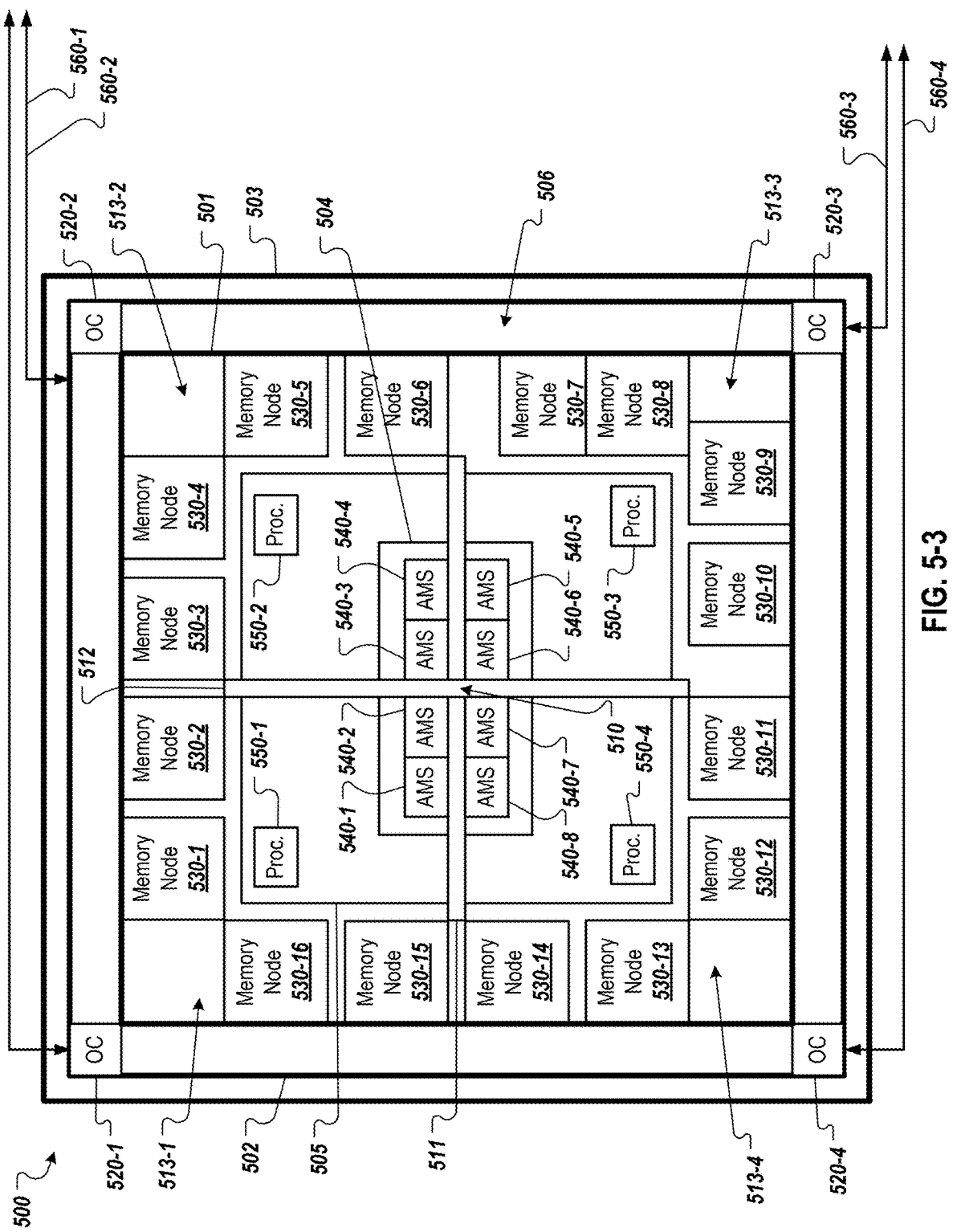
Figures 4, 5:
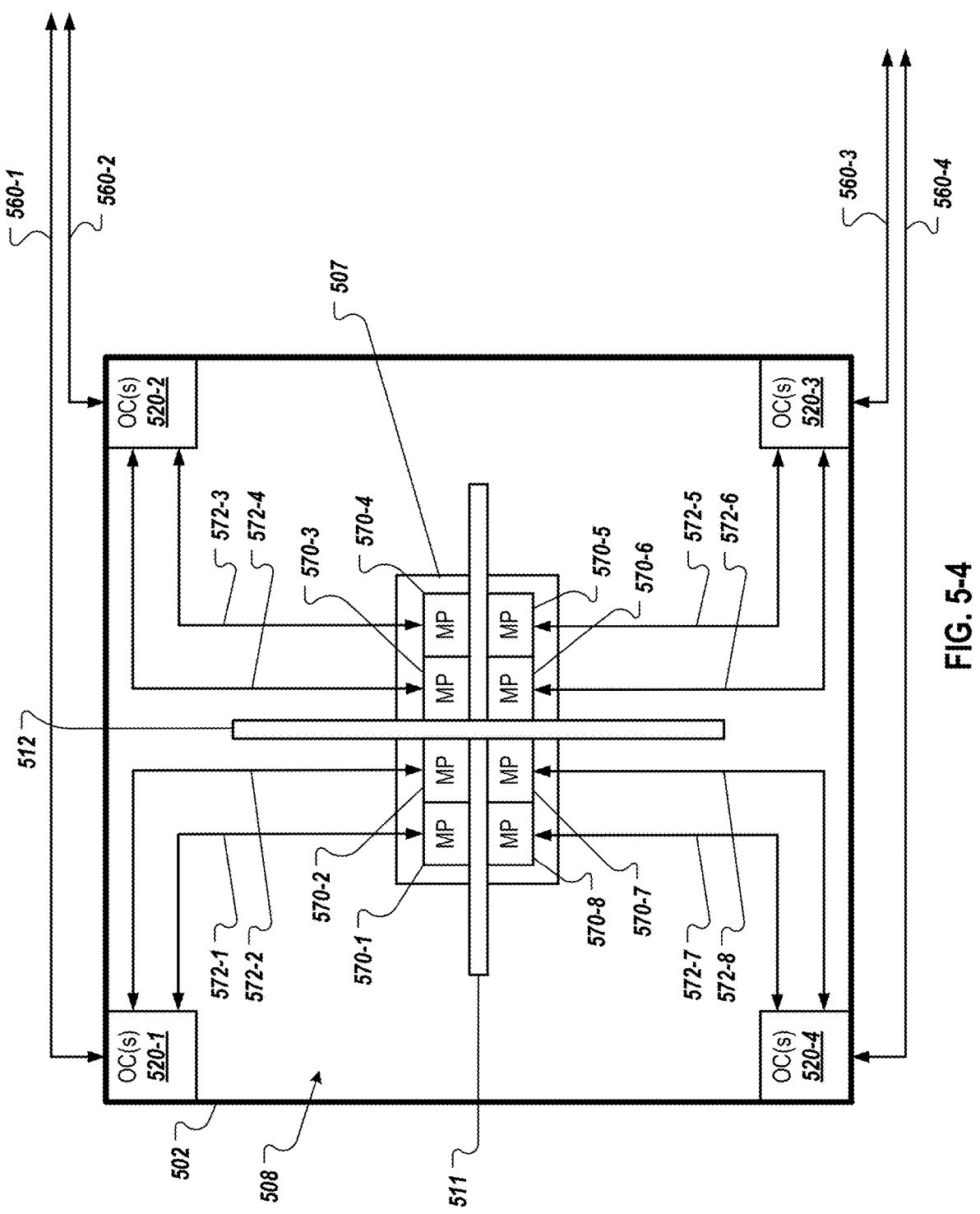
Figure 5:
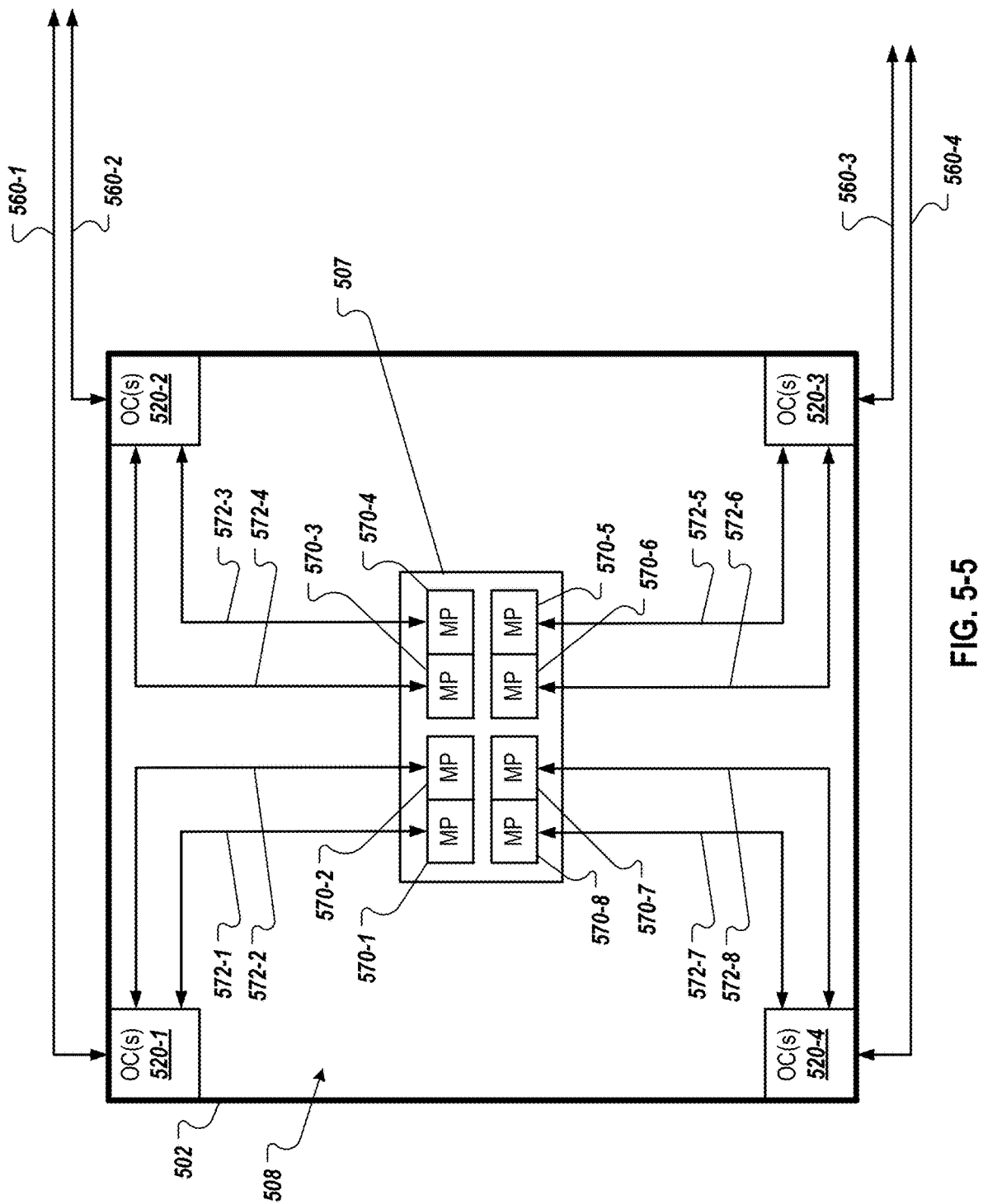
Figures 5, 6:
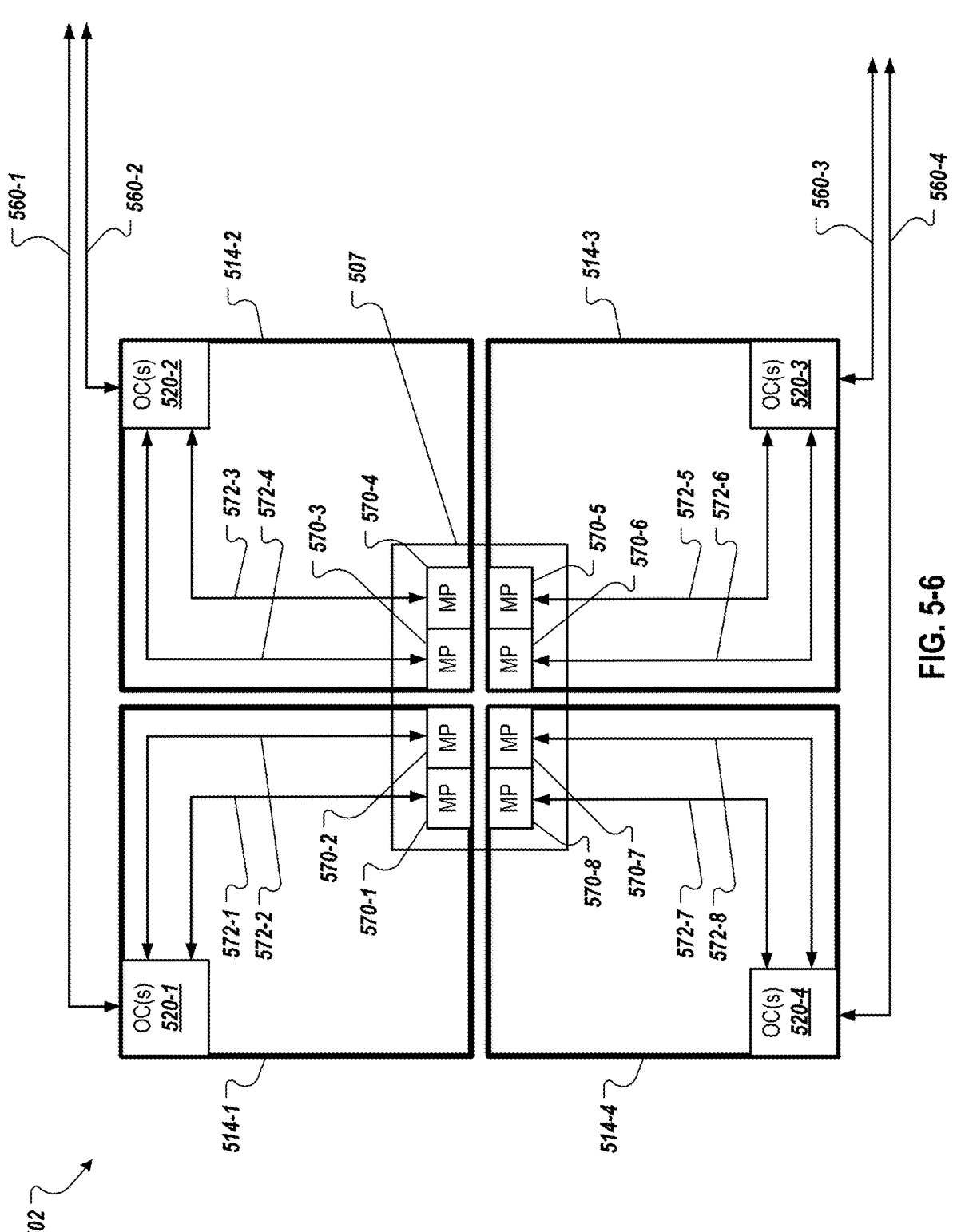
Figures 5, 6, 7:
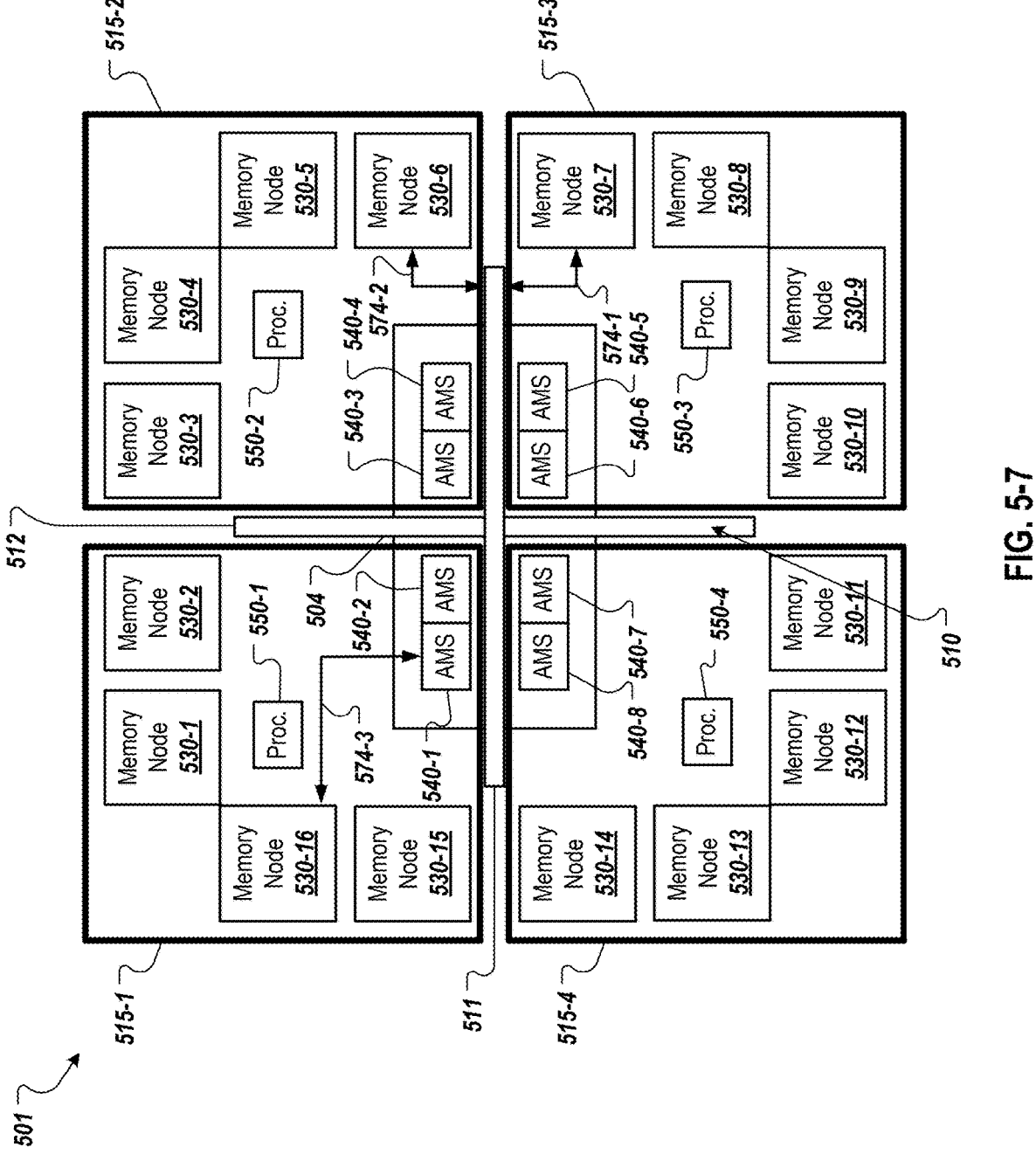

The electronic circuit layer 501 can be implemented using one or more EICs and the photonic circuit layer 502 can be implemented using one or more PICS. An example device 500 can include an electronic circuit layer 501 that is implemented using four EICs attached to a photonic circuit layer 502 that is implemented using a single PIC that includes one or more photonic circuit layer portions. That is, the four EICs can be arranged on and bonded to the one PIC as part of the device 500. An example of an electronic circuit layer 501 implemented using four EICs is shown in FIG. 5-7 and described in detail below. Examples of photonic circuit layers 502 implemented using a single PIC are shown in FIGS. 5-4 and 5-5 and described in detail below.

Another example device 500 can include an electronic circuit layer 501 that is implemented using a single EIC (e.g., a single monolithic chip) includes one or more electronic circuit portions. In this example, the electronic circuit layer 501 can be attached to a photonic circuit layer 502 that is implemented using a single PIC (e.g., a single monolithic chip) that includes one or more photonic circuit layer portions. That is, the one EIC can be bonded to the one PIC as part of the device 500. An example of an electronic circuit layer 501 implemented using a single EIC is shown in FIG. 5-3 and described in detail below.

Another example device 500 can include an electronic circuit layer 501 that is implemented using four EICs arranged on and attached to a photonic circuit layer 502 that is implemented using four PICs, which each PIC including one or more photonic circuit layer portions. For example, each EIC can be bonded to a corresponding PIC and the PICs can be bonded to each other. The EICs can also be bonded to each other. A switching device, e.g., a crossbar switch, can enable electronic signal routing between the four EICs. An example of a photonic circuit layer 502 implemented using four PICs is shown in FIG. 5-6 and described in detail below.

Referring to FIG. 5-1, the electronic circuit layer 501 is shown over the photonic circuit layer 502 such that some components of the photonic circuit layer 502 are not shown in FIG. 5-1. In particular, the only components of the photonic circuit layer 502 shown in the figure are the optical couplers 520 and the memory nodes 530. In figures that follow, components that are not visible due to another layer covering the component are shown in dashed lines.

Each optical coupler 520 is configured to couple to an optical interface, e.g., an FAU, that can move light into a fiber when exiting the photonic circuit layer 502 or into a waveguide when entering the photonic circuit layer 502. The optical couplers 520 can be implemented as grating couplers or edge couplers, as described above.

Although shown in this figure, the optical couplers 520 can be covered by the electronic circuit layer 501, e.g., in situations in which the electronic circuit layer 501 is the same size as the photonic circuit layer 502 and completely covers the photonic circuit layer 502. For example, the optical couplers 520 can be implemented on the other side of the photonic circuit layer 502, i.e., the side opposite the side to which the electronic circuit layer 501 is attached.

The photonic circuit layer 502 can have a rectangular shape, e.g., a square shape as in this example. In some implementations, the photonic circuit layer 502 is fabricated using a reticle once to create the circuits of the photonic circuit layer 502. In such an example, the photonic circuit layer 502 can have a surface area that has same size or smaller than the reticle of the lithography tools used in its manufacture.

In other examples, e.g., the example of FIG. 5-6, the photonic circuit layer 502 can created by using the same reticle multiple times to form multiple copies of the same semiconductor pattern that are aligned and/or attached to form the photonic circuit layer 502. Each copy can correspond to a photonic circuit layer portion of the photonic circuit layer 502. In another example, a monolithic photonic layer 502 can be created using multiple different reticles where each reticle forms one of the photonic circuit layer portions of the photonic circuit layer 502. In these examples, the photonic circuit layer 502 can have a surface area that is greater than the size of the reticle of the lithography tools.

The photonic circuit layer 502 includes optical couplers 520 arranged in the corners of the photonic circuit layer 502. In particular, the photonic circuit layer 502 includes one or more optical couplers 520-1 in the Northwest corner (top left corner), one or more optical couplers 520-2 in the Northeast corner (top right corner), one or more optical couplers 520-3 in the Southeast corner (bottom right corner), and one or more optical couplers 520-4 in the Southwest corner (bottom left corner). In some implementations, the photonic circuit layer 502 can include one or more optical couplers 520 in one or more corners, but not all corners. In some implementations, the photonic circuit layer 502 can include one or more optical couplers 520 arranged along the outer perimeter of the photonic circuit layer 502 rather than, or in addition to, the corners. For example, the photonic circuit layer 502 can include one or more optical couplers 520 at a center point of one or more sides of the outer perimeter of the photonic circuit layer 502 or at any other location along the one or more sides of the outer perimeter of the photonic circuit layer 502.

As described herein, the optical couplers 520 can be attached to FAUs or other optical interfaces to facilitate coupling external waveguides 560-1 to 560-4 (collectively, waveguides 560) to the internal waveguides of the photonic circuit layer 502 and/or to supply optical power from an external laser light source to the photonic circuit layer 502 to drive the photonics in the photonic circuit layer 502. Each optical coupler 520 can be implemented as a grating coupler, edge coupler, or other suitable coupler.

The memory nodes 530 are arranged along the outer perimeter of the photonic circuit layer 502 that is not covered by the electronic circuit layer 501. Although the example photonic circuit layer 502 includes sixteen memory nodes 530, the photonic circuit layer 502 can include any number of memory nodes 530 depending on the size of the memory nodes 503 and the size of the photonic circuit layer 502 available for the memory nodes 503. The memory nodes 530 can be attached to one or more surfaces of the photonic circuit layer 502, e.g., to the top surface on which the electronic circuit layer 501 is attached. The memory nodes 530 can be arranged on one or more sides of the photonic circuit layer 502, e.g., rather than along all four sides in the illustrated example.

The memory nodes 530 can be equivalent to the memory nodes described above. In some examples, the memory nodes 530 can include high-bandwidth memory (HBM), e.g., vertically stacked HBM, cache memory, and/or other types of memory.

The electronic circuit layer 501 includes AMS blocks 540-1 to 540-8 (collectively, AMS blocks 540), and computing components, e.g., compute nodes or processing elements 550-1 to 550-4 (collectively, processing elements 550), and/or other types of computing components arranged in various regions of the electronic circuit layer 501. The electronic circuit layer 501 can include any number of AMS blocks 540 depending on the size of the AMS blocks 540 and the size of the electronic circuit layer 501 available for the AMS blocks 540. The AMS blocks 540 can be equivalent to the AMS blocks 360 described above. Similarly, the processing elements 550 can be equivalent to the compute nodes 104 described above. The processing elements 550 can include GPUs, CPUs, TPUs, NPUs, and/or other types of processing elements.

The components of the electronic circuit layer 501 can be arranged in quadrants 513-1 to 513-4 (collectively, quadrants 513) that each include a semiconductor chip (as shown in FIG. 5-7 and described below) or that are all a part of a single monolithic semiconductor chip that is logically divided into quadrants 513, e.g., with each quadrant 513 being the equivalent of an individual EIC. The quadrants 513 can be defined by, e.g., separated by, a switching device 510 that includes a horizontal segment 511 and a vertical segment 512. For example, the quadrant 513-1 can be the portion of the electronic circuit layer 501 that is North of (above) the horizontal segment 511 and to the West of (left of) the vertical segment 512; the quadrant 513-2 can be the portion of the electronic circuit layer 501 that is North of (above) the horizontal segment 511 and to the East of (right of) the vertical segment 512; the quadrant 513-3 can be the portion of the electronic circuit layer 501 that is South of (below) the horizontal segment 511 and to the East of (right of) the vertical segment 512; and the quadrant 513-4 can be the portion of the electronic circuit layer 501 that is South of (below) the horizontal segment 511 and to the West of (left of) the vertical segment 512.

The switching device 510, which is described in more detail below, can be a crossbar switch that selectively electrically couples components of each quadrant 513 to components of each other quadrant 513 or in each adjacent quadrant 513. Although each quadrant 513 includes a processing element 550 in this example, less than all of the quadrants 513 can include a processing element 550 in other examples. For example, each quadrant 513 can include the same or different types of computing components and the same or different arrangements of computing components.

The electronic circuit layer 501 includes an inner region 504 and an outer region 506 that is outside of the inner region 504. The AMS blocks 540 are arranged in the inner region 504 to interface with modulators and photodetector blocks (MP blocks) 570 located in an inner region of the photonic circuit layer 502 (described below with reference to FIGS. 5-4 to 5-4). For example, the photonic circuit layer 502 can include an MP block 570 that includes a modulator and photodetector directly under or otherwise directly adjacent to each AMS block 540 of the electronic circuit layer 501. A combination of a modulator and a photodetector can be referred to as an MP block 570 or MP module.

The inner region 504 of the electronic circuit layer 501 can be a central region defined as the region that includes the AMS blocks 540 and the center of the electronic circuit layer 501, or by a perimeter that contains the AMS blocks 540 and the center of the electronic circuit layer 501. For example, the inner region 504 can have a defined length and width that has a center located at the center of the electronic circuit layer 501 and that consumes less than all of the surface of the electronic circuit layer 501. In another example, the inner region 504 can include the area of the electronic circuit layer 501 that extends a defined distance from the center of the electronic circuit layer 501. The defined distance can be the same in each direction from the center or different. The inner region 504 can include other components in addition to the AMS blocks 540.

The inner region 504 of the electronic circuit layer 501 can be defined as an inner region having a perimeter such that each point along the perimeter is at least a specified distance from an outer perimeter (e.g., edges) of the electronic circuit layer 501. For example, an EIC 515 can have a width (x-dimension) that is in a range from 4 mm to 10 mm (e.g., 5 mm to 8 mm, such as 6 mm). The EIC 515 can have a length (y-dimension) that is in a range from 15 mm to 30 mm (e.g., 20 mm to 25 mm, such as 24 mm). In this example, the inner region 504 can have a width that is 2 mm to 8 mm such that the perimeter along the width is 2 mm from the outer perimeter of the EIC 515. The distance from the perimeter could also be 3 mm, 4 mm (assuming the width of the EIC 515 is greater than 4 mm) or another appropriate distance. Similarly, the inner region 504 can have a length that is 12 mm to 27 mm such the perimeter along the length is 3 mm from the outer perimeter of the EIC 515. The distance from the perimeter could also be 4 mm, 5 mm, 6 mm or another appropriate distance. If the electronic circuit layer 501 includes multiple EICs 515, the distances could be even larger. Thus, the distances can be based on the size of the electronic circuit layer 501.

The inner region 504 of the electronic circuit layer 501 can be defined as a region that does not touch the outer perimeter of the electronic circuit layer 501 and that includes bumps for the AMS blocks 540 to connect to the photonic circuit layer 502. The bumps can be arranged directly under the AMS blocks 540 in this example. Such an inner region 504 can be defined as including the central point of the electronic circuit layer 501 and the bumps. In another example, the inner region 504 can be defined as including the bumps and having a perimeter that is at least a specified distance from the outer perimeter of the electronic circuit layer 501. In another example, the inner region 504 can be defined as the region that includes the bumps, but does not include an area considered to be the beachfront that is along the outer perimeter of the electronic circuit layer 501. In another example, the inner region 504 can be defined as the region that includes the bumps, but does not include memory nodes or processing elements.

The inner region 504 of the electronic circuit layer 501 can be a region of the electronic circuit layer 501 having a perimeter that is at least a minimum distance from the outer perimeter of the electronic circuit layer 501 and at least a threshold percentage of the size of the electronic circuit layer 502 along each dimension. For example, each edge along the perimeter of the inner region 504 can be at least 2 mm, 3 mm, 4 mm, 5 mm, or another appropriate distance from the corresponding edge of the electronic circuit layer 501. Additionally, the distance between each edge along the perimeter of the inner region 504 and the corresponding edge of the electronic circuit layer 501 can be at least 5%, 10%, 15%, 20%, 25%, 50% or another appropriate percentage of the length of the electronic circuit layer 501 along that dimension. For example, if the length of the electronic circuit layer 501 along the x-dimension is 10 mm and the distance between the inner region 504 and the edge of the electronic circuit layer 501 is 2 mm, the inner region 504 would have a length along the x-dimension of 6 mm with 2 mm of outer region between both edges of the inner region 504 along the x-dimension and the corresponding edges of the electronic circuit layer 501 along the x-dimension. If the percentage is 25%, the inner region would have a length of 5 mm with 2.5 mm (10 mm*25%) of outer region 506 between both edges of the inner region. A combination of a minimum distance between edges of the inner region 504 and the outer perimeter of the electronic circuit layer 501 and a minimum percentage along each dimension can be used to define the area of the inner region 501. The minimum distances and percentages along the x- and y-dimensions can be the same or different.

The inner region 504 can be a region of the electronic circuit layer 504 that includes bumps for AMS blocks 540 located in the inner region 504 and the inner region 504 can be located in the electronic circuit layer 501 such that there is at least a minimum number of bumps for other components (e.g., memory nodes, processing elements, etc.) between the inner region 504 and the outer perimeter of the electronic circuit layer in at least one direction (e.g., in all 4 directions for a rectangular inner region 504). For example, the perimeter of the inner region 504 along one side can be separated from the outer perimeter of the electronic circuit layer 501 by at least a threshold number of bumps for other components that are not AMS blocks 540. The minimum number if bumps can be 1, 2, 3, 5, 10, or another appropriate number, e.g., depending on the size of the electronic circuit layer 501. In some implementations, the minimum number of bumps can be a number of bumps in a straight line extending from the outer perimeter of the electronic circuit layer 501 and the corresponding edge of the perimeter of the inner region 504.

The inner region 504 can be manifested by a combination of the parameters described above. For example, the inner region 504 can be a region that includes the center of the electronic circuit layer 501, at least one AMS block 504, one or more bumps for AMS blocks 540, and have a perimeter that is at least a threshold distance from each edge of the electronic circuit layer 501 and/or the distance between each edge of the inner region 504 and the corresponding edge of the electronic circuit layer 501 is at least a threshold percentage of the length of the electronic circuit layer 501 along that dimension. In this example, there may also be a minimum number of bumps for components other than AMS blocks 540 between each edge of the inner region 504 and its corresponding edge of the electronic circuit layer 501. In another example, the inner region 504 can be defined in this way, but may not include the center of the electronic circuit layer 501. For example, the inner region 504 may be offset from the center.

As described elsewhere herein (e.g., with reference to FIG. 5-28), having the electro-optical transceivers that include the AMS blocks 540 within the inner region 501 enables shorter electrical channels between the AMS blocks 540 and the other components of the electronic circuit layer 501 as compared to electronic circuit layers 501 in which the AMS blocks 540 are located along the outer perimeter of the electronic circuit layer 501. This can reduce latency in transmitting the electronic signals along the electrical channels, reduce signal loss of the electronic signals, reduce noise imposed on the signals, and reduce the amount of heat generated by the electronic signals as compared to longer electrical channels.

The outer region 506 includes the areas of the electronic circuit layer 501 between the inner region 504 and the outer perimeter of the electronic circuit layer 501. For example, the outer region 506 can include the remaining area of the electronic circuit layer 501 that is not designated as the inner region 504.

Various computing components 531 can be located in the outer region 506, including processing elements 550 and additional memory nodes 530. These computing components 531 can be arranged throughout the outer region 506 in any arrangement. The computing components 531 can include, for example, memory agents, memory controllers, memory physical layers (memory PHYs), cache memory, Compute Express Link (CML) memory, memory nodes 530, other types of memory devices, and/or networking components, e.g., switching and routing components, electrical interfaces, network adapters, Peripheral Component Interconnect (PCI) buses and controllers, and/or other types of copper-based connection devices. Such components can be located anywhere along the outer region 506. Some of the components can also be located in the inner region 504 with the AMS blocks 540.

The memory components (e.g., memory agents, memory controllers, and memory PHYs can be used to interface computing components 531 and processing elements 550 of the electronics circuit layer 501 with the memory nodes 530 arranged on the photonic circuit layer 502 and/or with memory nodes 530 of the electronic circuit layer 501. The memory components can also be used to interface the memory nodes 530 with external devices that are external to the device 500.

The electronic circuit layer 501 can be fabricated using a single reticle that includes the pattern for the entire electronic circuit layer 501. In such an example, the electronic circuit layer 501 can have a surface area that is the same size of smaller than the reticle of the lithography tools used in manufacturing.

In another example, the electronic circuit layer 501 can be fabricated using a single reticle four times to create the four quadrants 513. In such examples, the four circuits corresponding to the four quadrants 513 can be rotated such that the corner that includes the AMS blocks 540 are located in the inner region 504. In another example, each quadrant 513 can be fabricated using a respective reticle, where at least one reticle differs from at least one other reticle. In these examples, the electronic circuit layer 501 can have a surface area that is greater than the size of the reticle of the lithography tools.

A computing component 531 of the electronic circuit layer 501 can be electrically coupled to the switching device 510 and/or to an AMS block 540 via an electrical channel. When a component is electrically coupled to another component, electronic signals can be routed between the components. An example electrical channel is illustrated in FIG. 5-7 and described below. A computing component 531 can be electrically coupled to an AMS block 540 via an electrical channel and, in turn, to the photonic circuit layer 502 and external waveguides 560 to facilitate communication of data between the computing component 531 and external devices, e.g., external processing elements, memory, or other electronic circuit layers, that are external to the device 500. Components of the electronic circuit layer 501 can also be directly coupled to each other via electrical channels of the electronic circuit layer 501. For example, electrical channels can be used to directly connect multiple processing elements 550 of a quadrant 513 and/or processing elements 550 with memory nodes 530 within a quadrant 513.

The switching device 510, which can be implemented as a crossbar switch, electrically and communicatively couples components of different quadrants of the electronic circuit layer 501. The switching device 510 is optional and can be omitted if the electronic circuit layer 501 is implemented on a single semiconductor chip and/or when optical channels are used to communicate data between EICs. If the electronic circuit layer 501 is implemented on multiple semiconductor chips, e.g., multiple EICs, the switching device 510 can electrically and communicatively couple the components of each semiconductor chip to the components of each other semiconductor chip to facilitate inter-chip data communications.

The switching device 510 can be implemented in the electronic circuit layer 501, in the photonic circuit layer 502, in both the electronic circuit layer 501 and the photonic circuit layer 502, as a separate device, e.g., disposed between the electronic circuit layer 501 and the photonic circuit layer 502, in a redistribution layer (RDL), in through-silicon vias (TSVs), in bumps, in other types of interconnects, and/or in other ways. In a particular example, the switching device 510 can be a crossbar switch implemented in a photonic circuit layer 502 that includes RDLs that connect bumps such that crossbar is in the photonic circuit layer 502.

As described below with reference to FIGS. 6-1 and 6-2, a crossbar switch can be implemented using interconnects, e.g., Universal Chiplet Interconnect Express (UCIe) interconnects. Other types of die-to-die interfaces, such as Bunch of Wires (BoW) and Advanced Interface Bus (AIB) can also be used to implement the crossbar switch.

FIG. 5-2 is a diagram illustrating an example of the photonic circuit layer 502 of FIG. 5-1. The photonic circuit layer 502 includes the optical couplers 520, the memory nodes 530, MP blocks 570-1 to 570-8 (collectively, MP blocks 570) and internal waveguides 572-1 to 572-2 (collectively, waveguides 572). In this example, the photonic circuit layer 502 is implemented as a single semiconductor chip. The single semiconductor chip can include a single photonic circuit portion created using a single reticle and that has a length and width that is less than or equal to a length and width of the reticle. In another example, the single semiconductor chip can include multiple photonic circuit portions that are tiled together to provide the photonic circuit layer 502. In this example, each photonic circuit portion can be created using a respective reticle and can have a length and width that is less than or equal to a length and width of the reticle. The multiple reticles can be identical or different.

Each MP block 570 includes an optical modulator and a photodetector, e.g., the modulator 356 and photodetector 366 described above, to interface with an AMS block of the 540 of the electronic circuit layer 501. The photonic circuit layer 502 can include an MP block 570 for each AMS block 540 of the electronic circuit layer 501. The MP block 570 can be located adjacent, e.g., directly under, its corresponding AMS block 540 to minimize the distance between the MP block 570 and the AMS block 540. For example, an MP block 570 and corresponding AMS block 540 can be arranged as shown in FIG. 2-1, so that the electrical path (e.g., electronic interconnect) for drive signals between the modulator and its driver circuit is less than 4 mm or less in length (e.g., 2 mm or less, 1 mm or less, 500 μm or less, 200 μm or less, such as low as 50 μm). Here, the length of an electrical interconnect refers to the total length of the passive electrical conduits (e.g., conducting traces, wires, vias, posts, and/or bumps) between the active components of the modulator/TIA and the electrode of the modulator/photodetector.

Similar to the AMS blocks 540 of the electronic circuit layer 501, the MP blocks 570 of the photonic circuit layer 502 are arranged in an inner region 507 of the photonic circuit layer 502. The inner region 507 of the photonic circuit layer 502 can have the same dimensions as, or different dimensions from, the dimensions of the inner region 504 of the electronic circuit layer 501. The inner region 507 of the photonic circuit layer 502 can be arranged adjacent to, e.g., directly under, the inner region 504 of the electronic circuit layer 501.

The photonic circuit layer 502 also includes an outer region 508 in which the optical couplers 520 and memory nodes 530 are arranged. The outer region 508 includes the areas of the photonic circuit layer 502 between the inner region 507 and the outer perimeter of the photonic circuit layer 502. For example, the outer region 508 can include the remaining area of the photonic circuit layer 502 that is not designated as the inner region 507.

The waveguides 572 couple the MP blocks 570 to the optical couplers 520 and to the memory nodes 530. Although the example waveguides 572 are illustrated as having a 90-degree turn, the waveguides 572 can have different configurations, e.g., straight line between an optical coupler 520 and a modulator of an MP block 356 or turns of different angles. The photonic circuit layer 502 can include many waveguides 572.

FIG. 5-3 is a diagram illustrating an example of a device 500 that includes an electronic circuit layer 501 and a photonic circuit layer 502. This device 500 is similar to the device 500 of FIG. 1 and includes many of the same components as the device 500 of FIG. 1. However, this device 500 includes memory nodes arranged as part of the electronic circuit layer 501 rather than the photonic circuit layer 502. In this example, the photonic circuit layer 502 can be the same or close to the same size at the electronic circuit layer 501. However, this example device can also include a larger photonic circuit layer 502 like the photonic circuit layer 502 of FIGS. 5-1 and 5-2 with memory nodes 530 or other components arranged along the photonic circuit layer 502.

The electronic circuit layer 501, photonic circuit layer 502, and the substrate 503 can otherwise be arranged as described with reference to FIG. 5-1. For example, the electronic circuit layer 501 can include one or more semiconductor chips that are attached to the photonic circuit layer 502 and the photonic circuit layer 502 can be attached to the substrate 503.

Referring to FIG. 5-3, the electronic circuit layer 501 is shown over the photonic circuit layer 502 such that some components of the photonic circuit layer 502 are not shown in FIG. 5-3. In particular, the only components of the photonic circuit layer 502 shown in the figure are the optical couplers 520. Each optical coupler 520 is configured to couple to an optical interface, e.g., an FAU, that can move light into a fiber when exiting the photonic circuit layer 502 or into a waveguide when entering the photonic circuit layer 502. The optical couplers 520 can be implemented as grating couplers or edge couplers, as described above.

Although shown in this figure, the optical couplers 520 can be covered by the electronic circuit layer 501, e.g., in situations in which the electronic circuit layer 501 is the same size as the photonic circuit layer 502 and completely covers the photonic circuit layer 502. For example, the optical couplers 520 can be implemented on the other side of the photonic circuit layer 502, i.e., the side opposite the side to which the electronic circuit layer 501 is attached.

The photonic circuit layer 502 can have a rectangular shape, e.g., a square shape as in this example. In some implementations, the photonic circuit layer 502 is fabricated using a reticle once to create the circuits of the photonic circuit layer 502. In such an example, the photonic circuit layer 502 can have a surface area that is the size of the reticle or smaller than the size of the reticle.

In other examples, e.g., the example of FIG. 5-6, the photonic circuit layer 502 can created by using the same reticle multiple times to form multiple copies of the same semiconductor pattern that are aligned and/or attached to form the photonic circuit layer 502. Each copy can correspond to a photonic circuit layer portion of the photonic circuit layer 502. In another example, a monolithic photonic layer 502 can be created using multiple different reticles where each reticle forms one of the photonic circuit layer portions of the photonic circuit layer 502. In these examples, the photonic circuit layer 502 can have a surface area that is greater than the size of the reticle.

The photonic circuit layer 502 includes optical couplers 520 arranged in the corners of the photonic circuit layer 502. In particular, the photonic circuit layer 502 includes one or more optical couplers 520-1 in the Northwest corner (top left corner), one or more optical couplers 520-2 in the Northeast corner (top right corner), one or more optical couplers 520-3 in the Southeast corner (bottom right corner), and one or more optical couplers 520-4 in the Southwest corner (bottom left corner). In some implementations, the photonic circuit layer 502 can include one or more optical couplers 520 in one or more corners, but not all corners. In some implementations, the photonic circuit layer 502 can include one or more optical couplers 520 arranged along the outer perimeter of the photonic circuit layer 502 rather than, or in addition to, the corners. For example, the photonic circuit layer 502 can include one or more optical couplers 520 at a center point of one or more sides of the outer perimeter of the photonic circuit layer 502 or at any other location along the one or more sides of the outer perimeter of the photonic circuit layer 502.

As described above, the optical couplers 520 can be attached to FAUs or other optical interfaces to facilitate coupling external waveguides 560-1 to 560-4 (collectively, waveguides 560) to the internal waveguides of the photonic circuit layer 502 and/or to supply optical power from an external laser light source to the photonic circuit layer 502 to drive the photonics in the photonic circuit layer 502. Each optical coupler 520 can be implemented as a grating coupler, edge coupler, or other suitable coupler.

The electronic circuit layer 501 includes AMS blocks 540-1 to 540-8 (collectively, AMS blocks 540), and computing components, e.g., compute nodes or processing elements 550-1 to 550-4 (collectively, processing elements 550), and/or other types of computing components arranged in various regions of the electronic circuit layer 501. The electronic circuit layer 501 can include any number of AMS blocks 540 depending on the size of the AMS blocks 540 and the size of the electronic circuit layer 501 available for the AMS blocks 540. The AMS blocks 540 can be equivalent to the AMS blocks 360 described above. Similarly, the processing elements 550 can be equivalent to the compute nodes 104 described above. The processing elements 550 can include GPUs, CPUs, TPUs, NPUs, and/or other types of processing elements.

The components of the electronic circuit layer 501 can be arranged in quadrants 513-1 to 513-4 (collectively, quadrants 513) that each include a semiconductor chip (as shown in FIG. 5-7 and described below) or that are all a part of a single monolithic semiconductor chip that is logically divided into quadrants 513, e.g., with each quadrant 513 being the equivalent of an individual EIC. The quadrants 513 can be defined by, e.g., separated by, a switching device 510 that includes a horizontal segment 511 and a vertical segment 512. For example, the quadrant 513-1 can be the portion of the electronic circuit layer 501 that is North of (above) the horizontal segment 511 and to the West of (left of) the vertical segment 512; the quadrant 513-2 can be the portion of the electronic circuit layer 501 that is North of (above) the horizontal segment 511 and to the East of (right of) the vertical segment 512; the quadrant 513-3 can be the portion of the electronic circuit layer 501 that is South of (below) the horizontal segment 511 and to the East of (right of) the vertical segment 512; and the quadrant 513-4 can be the portion of the electronic circuit layer 501 that is South of (below) the horizontal segment 511 and to the West of (left of) the vertical segment 512.

The switching device 510 can be a crossbar switch that selectively electrically and communicatively couples components of each quadrant 513 to components of each other quadrant 513 or in each adjacent quadrant 513. Although each quadrant 513 includes a processing element 550 in this example, less than all of the quadrants 513 can include a processing element 550 in other examples. For example, each quadrant 513 can include the same or different types of computing components and the same or different arrangements of computing components.

The electronic circuit layer 501 includes an inner region 504 and an outer region 506 that is outside of the inner region 504. The AMS blocks 540 are arranged in the inner region 504 to interface with modulators and photodetector blocks (MP blocks) 570 located in a inner region of the photonic circuit layer 502 (described below with reference to FIGS. 5-4 to 5-6). For example, the photonic circuit layer 502 can include an MP block 570 that includes a modulator and photodetector directly under or otherwise directly adjacent to each AMS block 540 of the electronic circuit layer 501.

The inner region 504 of the electronic circuit layer 501 can be defined as the region that includes the AMS blocks 540 and the center of the electronic circuit layer 501, or by a perimeter that contains the AMS blocks 540 and the center of the electronic circuit layer 501. For example, the inner region 504 can have a defined length and width that has a center located at the center of the electronic circuit layer 501 and that consumes less than all of the surface of the electronic circuit layer 501. In another example, the inner region 504 can include the area of the electronic circuit layer 501 that extends a defined distance from the center of the electronic circuit layer 501. The defined distance can be the same in each direction from the center or different. The inner region 504 can include other components in addition to the AMS blocks 540.

The outer region 506 includes the areas of the electronic circuit layer 501 between the inner region 504 and the outer perimeter of the electronic circuit layer 501. For example, the outer region 506 can include the remaining area of the electronic circuit layer 501 that is not designated as the inner region 504.

Various computing components 531 can be located in the outer region 506, including the memory nodes 530 and processing elements 550. These computing components 531 can be arranged throughout the outer region 506 in any arrangement although the memory nodes 530 are arranged along the outer perimeter of the electronic circuit layer 501 in the illustrated example.

In some implementations, the outer region 506 can include an intermediate region 505 disposed between the outer perimeter of the electronic circuit layer 501 and the inner region 504. Although only processing elements 550 are shown in the intermediate region 505 in this example, other computing components 531 can also be arranged in the intermediate region 505 and/or in the outer region 506 outside of the intermediate region 505. For example, the other computing components 531 can include memory agents, memory controllers, memory PHYs, cache memory, CML memory, other types of memory devices, and/or networking components, e.g., switching and routing components, electrical interfaces, network adapters, PCI buses and controllers, and/or other types of copper-based connection devices. Such components can be located anywhere along the outer region 506, including in the intermediate region 505 and/or outside the intermediate region 505. Some of the components can also be located in the inner region 504 with the AMS blocks 540. For example, one or more of the memory nodes 530 shown in FIG. 5-3 can be replaced with another computing component.

The electronic circuit layer 501 can include any number of memory nodes 530, depending on the size of the memory nodes 501 and the size of the electronic circuit layer 501 available for the memory nodes 501. The memory nodes 530 can be equivalent to the memory nodes described above. In some examples, the memory nodes 530 can include HBM, e.g., vertically stacked HBM, cache memory, and/or other types of memory.

A computing component 531 of the electronic circuit layer 501 can be electrically and communicatively coupled to the switching device 510 and/or to an AMS block 540 via an electrical channel. A computing component 531 can be electrically coupled to an AMS block 540 via an electrical channel and, in turn, to the photonic circuit layer 502 and external waveguides 560 to facilitate communication of data between the computing component 531 and external devices, e.g., external processing elements, memory, or other electronic circuit layers, that are external to the device 500. Components of the electronic circuit layer 501 can also be directly coupled to each other via electrical channels of the electronic circuit layer 501. For example, electrical channels can be used to directly connect multiple processing elements 550 of a quadrant 513 and/or processing elements 550 with memory nodes 530 within a quadrant.

The switching device 510, which can be implemented as a crossbar switch, electrically couples components of different quadrants of the electronic circuit layer 501. The switching device 510 is optional and can be omitted if the electronic circuit layer 501 is implemented on a single semiconductor chip and/or when optical channels are used to communicate data between EICs. If the electronic circuit layer 501 is implemented on multiple semiconductor chips, e.g., multiple EICs, the switching device 510 can electrically couple the components of each semiconductor chip to the components of each other semiconductor chip to facilitate inter-chip data communications.

The switching device 510 can be implemented in the electronic circuit layer 501, in the photonic circuit layer 502, in both the electronic circuit layer 501 and the photonic circuit layer 502, as a separate device, e.g., disposed between the electronic circuit layer 501 and the photonic circuit layer 502, in an RDL, in TSVs, in bumps, using UCIe interconnects, BOWs, AIBs, in other types of interconnects, and/or in other ways.

FIG. 5-4 is a diagram illustrating an example of the photonic circuit layer 502. The photonic circuit layer 502 can be used to implement the photonic circuit layer 502 of FIG. 5-3.

The photonic circuit layer 502 includes the optical couplers 520, MP blocks 570-1 to 570-8 (collectively, MP blocks 570), the switching device 510, and internal waveguides 572-1 to 572-8 (collectively, waveguides 572). In this example, the photonic circuit layer 502 is implemented as a single semiconductor chip. The single semiconductor chip can include a single photonic circuit portion created using a single reticle and that has a length and width that is less than or equal to a length and width of the reticle. In another example, the single semiconductor chip can include multiple photonic circuit portions that are tiled together to provide the photonic circuit layer 502. In this example, each photonic circuit portion can be created using a respective reticle and can have a length and width that is less than or equal to a length and width of the reticle. The multiple reticles can be identical or different.

Each MP block 570 includes an optical modulator and a photodetector, e.g., the modulator 356 and photodetector 366 described above, to interface with an AMS block of the 540 of the electronic circuit layer 501. The photonic circuit layer 502 can include an MP block 570 for each AMS block 540 of the electronic circuit layer 501. The MP block 570 can be located adjacent, e.g., directly under, its corresponding AMS block 540 to minimize the distance between the MP block 570 and the AMS block 540. For example, an MP block 570 and corresponding AMS block 540 can be arranged as shown in FIG. 2-1, so that the electrical path (e.g., electronic interconnect) for drive signals between the modulator and its driver circuit can be 4 mm or less in length (e.g., 2 mm or less, 1 mm or less, 500 μm or less, 200 μm or less, such as low as 50 μm). Here, the length of an electrical interconnect refers to the total length of the passive electrical conduits (e.g., conducting traces, wires, vias, posts, and/or bumps) between the active components of the modulator/TIA and the electrode of the modulator/photodetector. An advantage of this short length is that the overhead of implementing a transmission line can be avoided when implementing the electrical path.

Similar to the AMS blocks 540 of the electronic circuit layer 501, the MP blocks 570 of the photonic circuit layer 502 are arranged in an inner region 507 of the photonic circuit layer 502. The inner region 507 of the photonic circuit layer 502 can have the same dimensions as, or different dimensions from, the dimensions of the inner region 504 of the electronic circuit layer 501. The inner region 507 of the photonic circuit layer 502 can be arranged adjacent to, e.g., directly under, the inner region 504 of the electronic circuit layer 501.

The photonic circuit layer 502 also includes an outer region 508 in which the optical couplers 520 are arranged. The outer region 508 includes the areas of the photonic circuit layer 502 between the inner region 507 and the outer perimeter of the photonic circuit layer 502. For example, the outer region 508 can include the remaining area of the photonic circuit layer 502 that is not designated as the inner region 507.

The waveguides 572 couple the MP blocks 570 to the optical couplers 520. Although the example waveguides 572 are illustrated as having a 90-degree turn, the waveguides 572 can have different configurations, e.g., straight line between an optical coupler 520 and a modulator of an MP block 356 or turns of different angles. The photonic circuit layer 502 can include many waveguides 572.

FIG. 5-5 is a diagram illustrating an example of a photonic circuit layer 502. The photonic circuit layer 502 can be used to implement the photonic circuit layer 502 of FIG. 5-3. In this example, the photonic circuit layer 502 does not include the switching device 510. Instead, the switching device 510 may be excluded entirely, or implemented in the electronic circuit layer 501 or as a separate device.

FIG. 5-6 is a diagram illustrating an example of a photonic circuit layer 502. The photonic circuit layer 502 can be used to implement the photonic circuit layer 502 of FIG. 5-3. In this example, the photonic circuit layer 502 is implemented as four different PICs 514-1 to 514-4 (collectively, PICs 514). Each PIC 514 can be fabricated using the same reticle or a different reticle. If fabricated using the same reticle, each PIC 514 can be rotated such that the MP blocks of the PIC 514 are in the inner region 507 of the photonic circuit layer 502 and the optical coupler(s) 520 of the PIC 514 are at an outer corner of the photonic circuit layer 502, as shown in FIG. 5-6. In such examples, the MP blocks 570 can be located at or near the inner corner of each PIC 513, but may be in different arrangements due to the rotation.

The outer corners are corners along an outer perimeter of the photonic circuit layer 502. An optical coupler 520 can be considered to be located in an outer corner when all or at least a portion of the optical coupler 520 is within a threshold distance of the corner or the two outer edges of the photonic circuit layer 502 that form the outer corner. For example, the outer corner can be an area that extends up to a defined length from the two edges that form the outer corner.

Each PIC 514 includes one or more optical couplers 520 and one or more MP blocks 570 with there being two MP blocks 570 per PIC 514 in this example. Each PIC 514 includes internal waveguides 572 that couple the optical couplers 520 to modulators of the MP blocks 570. Each optical coupler 520 is configured to couple to an optical interface that can move light into a fiber when exiting the PIC 514 or into a waveguide when entering the PIC 514. The inner region 507 of the photonic circuit layer 502 spans portions of the PICs 514 and contains the MP blocks 570.

Although shown spaced apart for clarity, the PICs 514 can be in contact with one another or coupled to each other, e.g., via bonding. In some implementations, the waveguides 572 of PICs 514 are optically coupled using optical connections to facilitate optical routing between the PICs 514. When two components are optically coupled, optical signals can be routed between the components. For example, optical connections can optically couple internal waveguides of teach PIC 514 with internal waveguides of each adjacent PIC. Adjacent PICs are PICs that share a border with each other. For example, PIC 514-1 is adjacent to PIC 514-2 and to PIC 514-4; PIC 514-2 is adjacent to PIC 514-1 and PIC 514-3; PIC 514-3 is adjacent to PIC 514-3 and PIC 514-4; and PIC 514-4 is adjacent to PIC 514-1 and PIC 514-3. Some example optical connections are shown in FIGS. 7-1 and 7-2, and described below.

The optical connections can enable optical routing between the components of the electronic circuit layer 501 in each quadrant as well as, or in place of, the electrical routing provided by the switching device 510. In some implementations, the waveguides 572 can also be configured for optical communication between diagonally arranged PICs 514. For example, a waveguide 572 can be routed from the PIC 514-1 to the PIC 514-3 either directly or via one of the PICs 514-2 or 514-4. For example, the waveguide 572 can be turned at an angle within one of the other PICs 514-2 or 514-4. In some implementations, the waveguides 572 of each PIC 514 can be routed to a location on one of the PICs 514 where switching between the waveguides 572 can occur for communications between PICs 514.

In some implementations, the components of a quadrant 513 can communicate with components of another quadrant 513 via external waveguides 560. For example, a component in quadrant 513-1 can send data to a component in quadrant 513-3 by sending an electronic signal to an AMS block 540-1 of the quadrant 513-1, which interacts with an MP block 570-1 adjacent to, e.g., directly under, the AMS block 540-1 to convert the electronic signal to an optical signal. The optical signal can be routed from the MP block 570-1 to the optical coupler 520-1 via an internal waveguide 572-1 and the optical coupler 520-1 cam route the signal to the optical coupler 520-3 via an external waveguide 560. The optical coupler 520-3 can route the optical signal to an MP block 570-5, which interacts with an AMS block 540-5 to convert the optical signal to an electronic signal. The AMS block 540-5 can route the electronic signal to the component of quadrant 513-3 via an electrical channel.

FIG. 5-7 is a diagram illustrating an example of an electronic circuit layer 501. The electronic circuit layer 501 can be used to implement the electronic circuit layer 501 of FIG. 5-1 or the electronic circuit layer 501 of FIG. 5-3. In this example, the electronic circuit layer 501 is implemented as four different EICs 515-1 to 515-4 (collectively, EICs 515). Each EIC 515 corresponds to a respective quadrant 513 and includes the components of its quadrant 513. For example, the EIC 515-1 includes the memory nodes 530-1, 530-2, 530-15, and 530-16, processing element 550-1, and AMS blocks 540-1 and 540-2. Although shown spaced apart for clarity, the EICs 515 can be in contact with one another or coupled to each other, e.g., via bonding. The inner region 504 of the electronic circuit layer 501 spans portions of the EICs 515 and contains the AMS blocks 540.

Each EIC 515 can be coupled to a corresponding PIC 514 of FIG. 5-6. For example, the EIC 515-1 can be attached to the PIC 514-1; the EIC 515-2 can be attached to the PIC 514-2; the EIC 515-3 can be attached to the PIC 514-3; and the EIC 515-4 can be attached to the PIC 514-4, e.g., via flip chip bonding or another appropriate technique. In this way, the AMS blocks 540 of the EICs 515 are adjacent to, e.g., directly above, their corresponding MP blocks 570. For example, in this arrangement, the AMS block 540-1 would be directly above the MP block 570-1 so that the distance between the driver and TIA of the AMS block 540-1 and the corresponding modulator and photodetector of the MP block 570-1 are minimized. For example, the distance of an electronic interconnect that electrically couples the modulator to the driver can be 4 mm or less in length (e.g., 2 mm or less, 1 mm or less, 500 μm or less, 200 μm or less, such as low as 50 μm). Here, the length of an electrical interconnect refers to the total length of the passive electrical conduits (e.g., conducting traces, wires, vias, posts, and/or bumps) between the active components of the driver and the electrode of the modulator.

Similarly, the distance of an electronic interconnect that electrically couples the TIA to the photodetector can be 4 mm or less in length (e.g., 2 mm or less, 1 mm or less, 500 μm or less, 200 μm or less, such as low as 50 μm). Here, the length of an electrical interconnect refers to the total length of the passive electrical conduits (e.g., conducting traces, wires, vias, posts, and/or bumps) between the active components of the TIA and the electrode of the photodetector.

As described above, the switching device 510, which may or may not be implemented in the electronic circuit layer 501, enables electronic signal routing between the components of the EICs 515. For example, a crossbar switch can enable data from memory node 530-7 to be transferred to memory node 530-6. In particular, the data can be transferred from the memory node 530-7 to the switching device 510 via an electrical channel 574-1 and from the switching device 510 to the memory node 530-6 via an electrical channel 574-2.

The AMS blocks 540 of the electronic circuit layer 501 and the MP blocks 570 of the photonic circuit layer 502 also enable the components of each EIC 515 to communicate with external devices that are external to the switch 500. For example, data can be transferred from the memory node 530-16 to an external device by transferring the data to the AMS 540-1 via an electrical channel 574-3. As described above, the AMS block 540-1 can interface with its corresponding MP block 570 to convert (e.g., encode) the electronic signal into an optical signal and the MP block 570 can send the optical signal to the optical coupler 520-1 (FIG. 5-6) via internal waveguide 572-1. In turn, the FAU attached to the optical coupler 520-1 routes the optical signal to the external device via the external waveguide 560-1.

FIG. 5-8 is a diagram illustrating an example portion of an electronic circuit layer 501 and a portion of a photonic circuit layer 502 with an electro-optical transceiver 580. The layers 501 and 502 can be part of a network switch or another type of device 500. Although only one EIC 515 and one PIC 514 are shown in this diagram, the electronic circuit layer 501 can include multiple EICs 515 and/or the photonic circuit layer 502 can include multiple PICs 514, as described above.

The PIC 514 includes an optical coupler 520 that is configured to couple to an optical interface (FAU 582 in this example) that can move light into a fiber or other external waveguide when exiting the PIC 514 or into an internal waveguide when entering the PIC 514. The FAU 582 is coupled to a light engine 582, which can be the same as or similar to the light engine 350 described above. The light engine 581 provides a carrier signal to the FAU 582, such as through an optical fiber. The FAU 582 is optically coupled to the optical coupler 520 (e.g., a grating coupler) which directs the optical carrier signal to other components of the PIC 514. For example, the optical coupler 520 can direct the light between a fiber 588 coupled to the FAU 582 and waveguides 589-1 and 589-2. For example, the FAU 582 and optical coupler 520 can move light into the fiber 588 when exiting the PIC 514 or into the waveguide 589 (or other type of photonic path) when entering the PIC 514. The waveguide 589-1 optically couples the optical coupler 520 with a modulator 586 of the electro-optical transceiver 580. The waveguide 589-2 optically couples the optical coupler 520 with a photodetector 587 of the electro-optical transceiver 580.

In general, the electro-optical transceiver 580 is configured to convert between electrical and optical signals. In this example, the electro-optical transceiver 580 includes an AMS block 540 and an MP block 570. However, an electro-optical transceiver 580 can include other arrangements of EO interfaces and OE interfaces. Although only one electro-optical transceiver 580 is shown in this diagram, the device 500 can include multiple electro-optical transceivers 580, e.g., one for each AMS block and MP block shown in FIGS. 5-1 to 5-7.

As described above, each MP block 570 can include an optical modulator 586 and a photodetector 587. The optical modulator 586 can be the same as or similar to the optical modulator 356 described above. Similarly, the photodetector 587 can be the same as or similar to the photodiode 366 described above.

As described above, each AMS block 540 can include a driver 584 and a TIA 585. The driver 584 can be the same as or similar to the driver 362 described above. Similarly, the TIA 585 can be the same as or similar to the TIA 364 described above.

The operations of the components of the AMS block 540 and the MP blocks 570 are described above, e.g., with reference to FIGS. 1-1 to 2-1. In general, the driver 584 and the modulator 586 can be considered a first part of the electro-optical transceiver 580 that is configured to convert electronic signals into optical signals, e.g., by transforming electrons into photons. For example, the first part of the electro-optical transceiver 580 can convert electronic signals received from computing components of the EIC 515 to optical signals that are sent to external components via the optical coupler 520 and the FAU 582.

The TIA 585 and the photodetector 587 can be considered a second part of the electro-optical transceiver 585 that is configured to convert optical signals into electronic signals, e.g., by transforming photons into electrons. For example, the second part of the electro-optical transceiver 580 can converter optical signals received from external components via the optical coupler 520 and the FAU 582 to electronic signals that are sent to one or more computing components of the EIC 515.

The driver 584 can be connected to the optical modulator 586 using a short electrical interconnect 597-1. Similarly, the transimpedance amplifier 585 can be connected to the photodiode 587 using a short electrical interconnected 597-2. For example, the short electrical interconnects can be less than or equal to 4 mm (e.g., 2 mm or less, 1 mm or less, 500 μm or less, 200 μm or less, such as low as 50 μm).

The device 500 includes a serializer/deserializer (SerDes) 583 that is configured to convert electronic signals between serial and parallel formats. The device 500 can include a SerDes 583 for each electro-optical transceiver 580. The SerDes 582 can receive parallel messages from computing components (e.g., the memory block 530 or another type of computing component, e.g., memory agent, memory controller, cache or CML memory, networking components, interfaces, PHY, etc.) of the EIC 515, convert the parallel messages to serial bit streams that can be converted to optical signals and sent over the waveguide 589 and the fiber 588. Similarly, the SerDes 583 can convert a serial bit streams output by the TIA 585 to parallel messages to be routed to the memory nodes 530 and/or other computing components 531 of the EIC 515.

FIG. 5-9 is a diagram illustrating another example portion of an electronic circuit layer 501 and a portion of a photonic circuit layer 502 with an electro-optical transceiver 580. In this example, the driver 584 and the transimpedance amplifier 585 are implemented in the PIC 514 rather than the EIC 515. The driver 584 is electrically coupled to the SerDes 583 of an interface 509 via short electrical interconnects 597-3 and 597-4, e.g., less than or equal to 4 mm in length (e.g., 2 mm or less, 1 mm or less, 500 μm or less, 200 μm or less, such as low as 50 μm). Additionally, the transimpedance amplifier 585 is electrically coupled to the interface 509 via short electrical interconnects 597-5. Otherwise, the layers 501 and 502 can be the same as or similar to those of FIG. 5-6. The electro-optical transceivers 580 of FIGS. 5-6 and 5-7 can be used in any of the devices and circuit packages, e.g., circuit packages 100, 200, 210, and 300, and device 500, described in this document.

FIGS. 5-10 to 5-20 show example devices 500 that include various arrangements of electronic circuit layers 501 and photonic circuit layers 502. The devices 500 can be used to implement a network switch, ML processor, memory, or other functionality. In each example, the electronic circuit layer includes sixteen EICs 515 arranged in a grid pattern having four arrays (e.g., rows) with four EICs 515 in each array. Although these examples include sixteen EICs 515, the electronic circuit layer 501 can include any number of EICs 515 arranged in a grid pattern including multiple arrays or a non-grid pattern.

In the illustrated examples, the EICs 515 are shown to include AMS blocks 540 that have corresponding MP blocks on the photonic layer 502. However, the EICs 515 of the electronic circuit layer 501 can include SerDes blocks 583 having corresponding AMS blocks 540 in the photonic circuit layer 502, as shown in FIG. 5-9 and described above. Thus, in the description that follows, any reference to an AMS block 540 of an EIC 515 can be replaced with a reference to a SerDes 583 of the EIC 515. Similarly, any reference to an MP block 570 of a PIC 514 can be replaced with a reference to an AMS block 540 of the PIC 514. Additionally, although one of each block is shown in these figures, an EIC 515 can include multiple AMS blocks 540 or SerDes blocks 585 and a PIC 514 can include multiple MP blocks 570 or AMS blocks 540. Thus, these blocks can represent one or more of that type of block. Similarly, each optical coupler 520 can represent multiple optical couplers 520.

FIGS. 5-10 and 5-11 show an example device 500 that includes an electronic circuit layer 501 with multiple EICs 515 (e.g., sixteen EICs 515 in this example) and a photonic circuit layer 502 with multiple PICs 514 (e.g., sixteen PICs 514 in this example). Each PIC 514 could instead be a photonic circuit layer portion). In particular, FIG. 5-10 is a diagram illustrating another example device 500 that includes an electronic circuit layer 501 with sixteen EICs 515 and a photonic circuit layer 502. FIG. 5-11 is a diagram illustrating the photonic circuit layer 502 of the device 500 of FIG. 5-10 with the electronic circuit layer 501 not shown.

For example, the electronic circuit layer 501 can be arranged above the photonic circuit layer 502 such that components of the photonic circuit layer 502 are not shown in FIG. 5-10, but are shown in FIG. 5-11 with the electronic circuit layer 501 hidden.

The electronic circuit layer 501 includes sixteen EICs 515 arranged in four arrays (e.g., rows) having four EICs 515 in each array. Similarly, as shown in FIG. 5-11, the photonic circuit layer 502 includes sixteen PICs 514 arranged in a grid pattern having four arrays (e.g., rows) with four PICs 514 in each array. Although this example includes sixteen PICs 516, the photonic circuit layer 501 can include any number of PICs 514 arranged in a grid pattern including multiple arrays or a non-grid pattern. As shown in FIG. 5-20 and described in more detail below, the waveguides of the PICs 514 can be stitched to the waveguides of adjacent PICs 514.

In this example, the arrangement of EICs 515 matches the arrangement of PICs 514 such that there is one EIC 515 corresponding to each PIC 514 and the corresponding EIC 515 is located adjacent to, e.g., directly above, the PIC 514. For example, if the electronic circuit layer 501 is above the photonic circuit layer 502, the EIC 515-1 can be arranged directly above the PIC 514-1.

In other examples, the EICs 515 can be in an arrangement that differs from the arrangement of the PICs 514. For example, there may be sixteen EICs 515 as shown in FIG. 5-10, but the photonic circuit layer 502 may include four PICs 514 such that there are four EICs 515 adjacent to (e.g., directly above) each PIC 514. In this example, each PIC 514 can be created using a reticle such that each PIC 514 has a size that matches the reticle. Each EIC 515 can smaller than the reticle used to create each PIC 514.

In yet another example, there may be sixteen EICs 515 as shown in FIG. 5-10, but the photonic circuit layer 502 may include a single PIC 514 such that there are four EICs 515 above each PIC 514 such that the PIC 514 occupies the same area as the sixteen PICs 514 of FIG. 5-11. In this example, the PIC 514 can be created using a reticle such that the PIC 514 has a size that matches the reticle. Each EIC 515 can smaller than the reticle used to create the PIC 514. Various other arrangements are also possible.

To minimize the length of the electrical path (e.g., interconnects) that connects each AMS block 540 to a corresponding MP block 570 of the photonic circuit layer 502, each AMS block 540 can be located directly adjacent to, e.g., directly above, its corresponding MP block 570. For example, the AMS block 540-1 is located in the same area of the EIC 515-1 as the MP block 570-1 of the PIC 514-1, e.g., such that the AMS block 540-1 is directly above the MP block 570-1. This enables the electrical paths between each AMS block 540 and its corresponding MP block 570-1 to be less than 4 mm in length (e.g., 2 mm or less, 1 mm or less, 500 μm or less, 200 μm or less, such as low as 50 μm).

Although each EIC 515 is shown as having one or more AMS blocks 540 and each PIC 514 is shown as having one or more MP blocks 570, some EICs 515 may not include AMS blocks 570 and/or some PICS 514 may not include MP blocks 570. For example, only the interior or "landlocked" EICs 515-6, 515-7, 515-10, and 515-11 that are located near the center of the electronic circuit layer 501 may include AMS blocks 540, while the other EICs 515 do not include AMS blocks 540. Similarly, only the interior PICs 514-6, 514-7, 514-10, and 514-11 that are located near the center of the photonic circuit layer 502 may include MP blocks 570, while the other PICs 515 do not include MP blocks 570. In such examples, stitched waveguides of the PICs 514 can route optical signals between the optical couplers 520 of the photonic circuit layer 502 and the MP blocks of the photonic circuit layer 502. For example, the waveguides of the PIC 512-12 can be stitched to the waveguides of the PIC 512-11 such that these stitched waveguides can route optical signals between the optical coupler 520-6 and the MP block 570-11.

The photonic circuit layer 502 includes optical couplers 520 arranged along its perimeter. The optical couplers 520 can be arranged on the same side of the photonic circuit layer 502 as the PICs 514 and the electronic circuit layer 501 (e.g., the top of the photonic circuit layer 502), the opposite side (e.g., the bottom of the photonic circuit layer 502), or along the edge of the photonic circuit layer 502, e.g., using edge couplers. In this example, the photonic circuit layer 502 is larger than the combined size of the PICs 514 so that the optical couplers 520 can be located on the same side of the photonic circuit layer as the PICs 514. As described above, each optical coupler 520 is configured to couple to an optical interface that can move light into a fiber when exiting the PIC 514 or into a waveguide when entering the PIC 514.

Although there are twelve optical couplers 520-1 to 520-12 in this example, the switch 500 can include a different amount of optical couplers 520, e.g., depending on the number of AMS blocks 540 and the number of MPC blocks 570 and/or the expected amount of data traffic between the switch 500 and external devices. For example, a device 500 can include four optical couplers 520, e.g., one in each corner of the photonic circuit layer 502. In another example, a device 500 can include multiple (e.g., 2, 3, or more) optical couplers 520 for each EIC 515. To reduce the length of optical signal transmissions, the optical coupler(s) for each EIC 515 can be located near the EIC 515, e.g., adjacent to the EIC 515 for edge EICs 515 that border the outer perimeter of the photonic circuit layer 502, i.e., EICs 515-1 to 515-5, 515-8, 515-9, and 515-12 to 515-16, which can also be referred to as beachfront EICs 515. Some additional example arrangements of optical couplers 520 are shown in the following figures and described below.

The device 500 also includes switching devices 510, e.g., crossbar switches, that selectively electrically couple EICs 515 to other EICs 515. For example, the switching device 510-1 can couple the EIC 515-1 with the EIC 515-2 and the EIC 515-5, and also couples the EIC 515-6 with the EIC 515-2 and the EIC 515-5. In some implementations, the switching device 510 also electrically couples the EIC 515-1 with the EIC 515-6. As described above, a switching device 510 can be implemented in the electronic circuit layer 501, in the photonic circuit layer 502, in both the electronic circuit layer 501 and the photonic circuit layer 502, as a separate device, e.g., disposed between the electronic circuit layer 501 and the photonic circuit layer 502, in an RDL, in TSVs, in bumps, in other types of interconnects, and/or in other ways.

In this example, the EICs 515 can be identical and the PICs 514 can be identical. That is, each EIC 515 can be created using a common or otherwise identical EIC reticle and each PIC 514 can be created using a common or otherwise identical PIC reticle. For example, the AMS block 540 can be in the same location in every EIC 515 and each EIC 515 can include other components (e.g., processor(s), memory, networking components, etc.) in the same arrangement. The EICs 515 and/or PICs 514 can be rotated as desired in the switch 500 to place components of the EICs 515 and/or PICs 514 in desired locations.

In some implementations, the some EICs 515 and some PICS 514 may differ. For example, some EICs 515 can include AMS blocks 540 or SerDes blocks 583, while other EICs 515 do not have either. In another example, some EICs 515 can include memory, while some EICs 515 include one or more processing elements and memory, while some other EICs 515 may not include memory or processing elements. In another example, one or more EICs 515 can be configured as a switch while others are configured as processing elements or memory. For example, the interior EICs 515-6, 515-7, 515-10, and 515-11 can be configured as a single switch when combined or as individual switches, while the edge EICs 515-1 to 515-5, 515-8, 515-9, and 515-12 to 515-16 primarily include memory nodes and/or processing elements. In another example, the EICs 515 can include the same components, but in different arrangements.

As noted above, the photonic circuit layer 502 can include 16 photonic circuit layer portions. Each photonic circuit layer portion can be a PIC 514, as shown in FIG. 5-11. In another example, the photonic circuit layer portions can be tiled together to form a single PIC 514 that provides the photonic circuit layer 502. In this example, the photonic circuit layer portions can be arranged in place of the PICs 514 of FIG. 5-11.

Although not shown in FIG. 5-11, the photonic circuit layer 502 can include optical connections at the borders between adjacent PICs 514 or photonic circuit layer portions. For example, at least one or more of the internal waveguides of the photonic circuit layer 502 can cross the borders between adjacent PICs or photonic circuit layer portions. Such waveguides can be referred to as boundary-crossing waveguides and can include optical connections at the borders, as described in more detail with reference to FIGS. 5-20 to 5-22, and 7-1 to 7-2.

Although not shown, the photonic circuit layer 502 can include memory nodes 530. For example, the memory nodes 513 can be arranged along the perimeter of the photonic circuit layer 502 similar to the memory nodes 530 of FIGS. 5-1 and 5-2. In such examples, the EICs 515 can include memory PHYs to interface with the memory nodes 530, as described above.

FIGS. 5-12 and 5-13 show another example device 500 that includes an electronic circuit layer 501 with sixteen EICs 515 and a photonic circuit layer 502. In particular, FIG. 5-12 is a diagram illustrating the device 500 and FIG. 5-13 is a diagram illustrating the photonic circuit layer 502 of the device 500 of FIG. 5-12.

This example is similar to the example of FIGS. 5-10 and 5-11 and includes many of the same components, which can be in any of the configurations described above except where noted in this description. In this example, the photonic circuit layer 502 can be the same size as the combined PICs 514 or slightly larger allowing for a small external perimeter outside the perimeter of the PICs 514. Without the extra space along the perimeter of the photonic circuit layer 502, the optical couplers 520 can be attached to the side of the photonic circuit layer 502 opposite the EICs 515. If the electronic circuit layer 501 is coupled to, e.g., attached to, the top of the photonic circuit layer 502, the optical couplers 520 can be coupled to, e.g., attached to, the bottom side of the photonic circuit layer 502.

In this example, the device 500 includes an optical coupler 520 for each EIC 515/PIC 514 pair. Other arrangements of optical couplers 520 can also be used, as described above. In general, the optical coupler 520 for each EIC 515/PIC 514 pair is shown along an outer edge of the EIC 515/PIC 514 pair. However, the optical couplers 520 can be located in different areas and do not have to be directly under their EIC 515/PIC 514 pairs. For example, the optical coupler 520-6 can be located along an edge or corner of the photonic circuit layer 502, e.g., under the EIC 515-2, the EIC 502-5, the EIC 502-1, or under any other EIC 515.

FIGS. 5-14 and 5-15 show another example device 500 that includes an electronic circuit layer 501 with sixteen EICs 515 and a photonic circuit layer 502. In particular, FIG. 5-14 is a diagram illustrating the device 500 and FIG. 5-15 is a diagram illustrating the photonic circuit layer 502 of the device 500 of FIG. 5-14. This example is similar to the example of FIGS. 5-10 to 5-13 and includes many of the same components, which can be in any of the configurations described above except where noted in this description.

In this example, the optical couplers 520 are edge couplers that are coupled to, e.g., attached to, the edges of the photonic circuit layer 502. The example switch 500 includes twelve optical couplers 520 coupled to the edge of the photonic circuit layer 502, but can include other amounts and/or arrangements. For example, all of the optical couplers 520 may be arranged on one edge of the photonic circuit layer 502, all along two edges, along one or more corners of the photonic circuit layer, and/or in other configurations. In another example the device 500 can include 16 optical couplers 520, one for each EIC/PIC pair.

FIGS. 5-16 and 5-17 show another example device 500 that includes an electronic circuit layer 501 with sixteen EICs 515 and a photonic circuit layer 502. In particular, FIG. 5-16 is a diagram illustrating the device 500 and FIG. 5-17 is a diagram illustrating the photonic circuit layer 502 of the device 500 of FIG. 5-16. This example is similar to the example of FIGS. 5-10 to 5-15 and includes many of the same components, which can be in any of the configurations described above except where noted in this description. For example, although not shown, the switch 500 can include switching devices 510 in any configuration described above.

Although optical couplers 520 are shown as being coupled to the bottom of the photonic layer 502, the optical couplers 520 can in any of the configurations shown in FIGS. 5-10 to 5-15, including on top of the photonic circuit layer 502 if the photonic circuit layer 502 is larger than the combined size of the PICs 514, e.g., as shown in FIGS. 5-10 and 5-11.

In this example, the AMS blocks 540 of the EICs 515 are located in the corners of the EICs 515 closest to the center of the electronic circuit layer 501. For example, the AMS blocks 540-6, 540-7, 540-10, and 540-11 are located at the center of the electronic circuit layer 501. Similarly, the AMS blocks 540-1, 540-4, 540-13, and 540-16 in the EICs 515 on the outer corners are located in their inner most corners closest to the center of the electronic circuit layer 501.

If the other components of the EICs 515 are the same, each EIC 515 can be created using the same or otherwise identical reticle. The EICs 515 can then be rotated to create the configuration of FIG. 5-16. For example, the EIC 515-2 can be rotated 90 degrees clockwise to arrive at the configuration of the EIC 515-3.

FIGS. 5-18 and 5-19 show another example switch 500 that includes an electronic circuit layer 501 with sixteen EICs 515 and a photonic circuit layer 502. In particular, FIG. 5-18 is a diagram illustrating the switch 500 and FIG. 5-19 is a diagram illustrating the photonic circuit layer of the switch of FIG. 5-18. This example is similar to the example of FIGS. 5-10 to 5-17 and includes many of the same components, which can be in any of the configurations described above except where noted in this description. For example, although not shown, the switch 500 can include switching devices 510 in any configuration described above.

In this example, the EICs 515 are smaller than the PICs 514 such that there is room for one or more optical couplers

520 for each EIC/PIC pair to be coupled to the same side of the photonic circuit layer 502 as the PICs 514 and adjacent to the EIC 515 of the EIC/PIC pair. For example, the optical coupler 520-1 is coupled to the PIC 514-1 in a corner adjacent to the EIC 514-1. The optical couplers 520 can be located anywhere in the area left open on the PIC 514 by the smaller size EIC 514.

Various routing algorithms can be used to route data between the components of the EICs 515 and the between these components and external components that are external to the switch 500 for each example switch 500 shown in the figures and described in this document. In some implementations, if a component of an EIC 515 is sending data to a component of an adjacent EIC, the data can be sent electrically via a switching device 510. If the component is sending the data to a component of a non-adjacent EIC 515, the data can be sent optically via the interior waveguides of the PICs 514 in the photonic circuit layer and/or exterior waveguides coupled to the optical couplers 520.

For example, referring back to FIG. 5-10, if a processing element of the EIC 515-1 is sending data to memory of the EIC 515-2, the data can be sent electrically across the switching device 510-1 because the EIC 515-1 is adjacent to the EIC 515-2. If the processing element of the EIC 515-1 is sending data to a processing element of the EIC 515-9, the data can be sent optically over the photonic circuit layer 502 since the EIC 515-1 is not adjacent to the EIC 515-9. Adjacent EICs 515 are EICs that are directly next to each other (e.g., having edges facing each other) and non-adjacent nodes are nodes that are not directly next to each other (e.g., do not have edges facing each other).

FIG. 5-20 is a diagram illustrating an example photonic circuit layer 502 that includes sixteen PICs 514 and internal waveguides 589. In this example, the PICs 514 are arranged in a grid pattern of four arrays (e.g., rows) with four PICs 514 in each array. The internal waveguides 589 that route optical signals between various components of the photonic circuit layer 502. For example, the waveguides 589 can route optical signals between optical couplers 520 (not shown) and MP blocks 570 and between different MP blocks 570. Although the photonic circuit layer 502 can include many waveguides, only seven waveguide portions 589-1 to 589-7 are shown in FIG. 20 to show example optical routing while allowing for clarity of other components.

Some of the waveguides 589 can be configured to cross the borders between adjacent PICs 514 (or adjacent photonic circuit layer portions). Such waveguides 589 can include optical connections 593 that are arranged at the border between the adjacent PICs 514. In this example, the photonic layer 502 includes one or more optical connections 593 between each pair of adjacent PICs 514. The optical connection 593-1 can enable light to pass between the portions of one or more waveguides 589 of the PIC 514-1 and the corresponding portion of the one or more waveguides 589 of the PIC 514-2. Example forms of optical connections are show in FIGS. 7-1 and 7-2, and described below. Other types of optical connections can also be used.

To illustrate some routing examples between PICs 514, the photonic circuit layer 502 includes an optical connection 593-1 at the border between the PIC 514-1 and the PIC 514-2. This optical connection 593-1 facilitates the passing of light between waveguide portions 589-1 and 589-3 and therefore between the PICs 514-1 and 514-2. This enables optical communication between the components of the EIC 515-1 corresponding to the PIC 514-1 and the components of the EIC 515-2 corresponding to the PIC 514-2 via the electro-optical transceivers of this EIC/PIC pair. For example, a component of the EIC 515-1 can send data to a component of the EIC 515-2 by sending an electronic signal to the AMS block 540-1 which interacts with the MP block 570-1 to convert the electronic signal to an optical signal and sends the optical signal along the waveguide 589-1. The optical connection 593-1 passes the optical signal to the waveguide portion 589-3 which routes the signal to the MP block 570-2, which interacts with the AMS block 540-2 to convert the optical signal to an electronic signal that is routed in the EIC 514-2 to the appropriate component.

Similarly, the photonic circuit layer 502 includes an optical connection 593-2 at the border between the PIC 514-1 and the PIC 514-5. This optical connection 593-2 facilitates the passing of light between waveguide portions 589-2 and 589-4 and therefore between the PICS 514-1 and 514-5. This enables optical communication between the components of the EIC 515-1 corresponding to the PIC 514-1 and the components of the EIC 515-5 corresponding to the PIC 514-5 via the electro-optical transceivers of this EIC/PIC pair. For example, a component of the EIC 515-1 can send data to a component of the EIC 515-5 by sending an electronic signal to the AMS block 540-1 which interacts with the MP block 570-1 to convert the electronic signal to an optical signal and sends the optical signal along the waveguide 589-2. The optical connection 593-2 passes the optical signal to the waveguide portion 589-4 which routes the signal to the MP block 570-5, which interacts with the AMS block 540-5 to convert the optical signal to an electronic signal that is routed in the EIC 514-5 to the appropriate component.

In another example, waveguides 589 can be turned at various angles to route optical signals between non-adjacent PICs 514. For example, the waveguide portions 589-5 to 589-7 route data between the components of the EICs 515-1 and 515-6 through optical connections 593-2 and 593-8 without having to be converted to an electronic signal in the PIC 514-5 or be processed by another component in the PIC 514-5.

FIG. 5-21 is a diagram illustrating a photonic circuit layer 502 that includes two PICs 514-1 and 514-2 optically coupled using optical connections 593-1 and 593-2. Although PICS 514-1 and 514-2 are shown in this figure, the PICs 514-1 and 514-2 can be photonic circuit layer portions, as described elsewhere herein.

The PIC 514-1 includes an inner region 507-1 and an outer region 508-1 that includes the area between the inner region 507-1 and the outer perimeter of the PIC 514-1. The PIC 514-1 includes MP blocks arranged in the inner region. The PIC 514-1 also includes optical couplers 520-1 and 520-4 arranged in outer corners of the PIC 54-1. In other examples, the optical couplers 520-1 and 520-4 can be arranged along the edges of the PIC 514-1 or on the other surface of the PIC 514-1, as described herein.

Similarly, the PIC 514-2 includes an inner region 507-2 and an outer region 508-2 that includes the area between the inner region 507-2 and the outer perimeter of the PIC 514-2. The PIC 502-2 includes MP blocks arranged in the inner region 507-2. The PIC 514-2 also includes optical couplers 520-2 and 520-3 arranged in outer corners of the PIC 514-2. In other examples, the optical couplers 520-2 and 520-3 can be arranged along the edges of the PIC 514-2 or on the other surface of the PIC 514-2, as described herein. In either example, the optical couplers 520 can couple the MP blocks to optical interfaces that are optically coupled to external waveguides 560.

Although not shown, the MP blocks of each PIC 514 can be optically coupled to the optical couplers 520 of the PIC

514 using internal waveguides. For example, the MP blocks in the top of the inner region 507-1 can be coupled to optical coupler(s) 502-1 while the MP blocks in the bottom of the inner region 507-1 are coupled to optical coupler(s) 502-4.

MP blocks of the PIC 514-1 are also optically coupled to MP blocks of the PIC 514-2 via optical connections 593-1 and 593-2. This enables optical communication between the components of EIC(s) coupled to the PIC 514-1 and components of EIC(s) coupled to the PIC 514-2. Thus, in this example, optical signals can be used for inter-chip communications rather than, or in addition to, electronic signals using switching devices.

In this example, each PIC 514 can be created using a common reticle such that the total size of the photonic circuit layer 502 is larger than the size of a single reticle. For example, if the reticle has a square shape, the photonic circuit layer 502 has a length in one dimension (vertical or North and South in this illustration) that is the length of a side of the reticle and a length in the orthogonal direction (East and West in this illustration) that is twice the length of a side of the reticle. If larger photonic circuit layers 502 are desired, additional PICs 514 can be optically stitched (or otherwise connected using optical connections 593) together in either dimension (horizontal North and South or East and West). For example, another PIC 514 can be located to the East or right of the PIC 514-2 and optically stitched to the MP blocks of the PIC 514-2 to create a photonic circuit layer 502 with a length of three sides of a reticle in one direction.

A device 500 can include the photonic circuit layer 502 and an electronic circuit layer 501 (not shown in this figure). The electronic circuit layer 501 can include any number of EICs 515 coupled to the PICs 514 of the photonic circuit layer 502. For example, one or more EICs 515 can be disposed above and coupled to the PIC 514-1 and one or more EICs 515 can be disposed above and coupled to the PIC 514-2. In another example, single EIC 515 can be coupled to both PICs 514-1 and 514-2.

FIG. 5-22 is a diagram illustrating portions of two EICs 515-1 and 515-2 and two PICs 514-1 and 514-2. The two PICs 514-1 and 514-2 can be arranged as shown in FIG. 5-21 and described above. Each EIC/PIC pair (i.e., EIC 515-1 and PIC 514-1 being one pair and EIC 515-2 and PIC 514-2 being another pair) can also be arranged as shown in FIG. 5-8 or FIG. 5-9 although shown as being arranged as shown in FIG. 5-8. Although only one EIC 515 is shown for each PIC 514, each PIC 514 can be coupled to multiple EICs 515, e.g., there may be an EIC 515 behind 515-1 and coupled to the PIC 515-1 but not visible in this figure.

Optical connections 593 facilitate the passing of light (e.g., optical signals) between waveguide portions 589-3 and 589-4 as well as between waveguide portions 589-5 and 589-6. In particular, the optical connections 593 can include an optical connection that is part of a waveguide between the modulator 586-1 and the photodetector 587-2. This waveguide includes the waveguide portions 589-3 and 589-4. The optical connection is at the border between the PIC 514-1 and the PIC 514-1 and can be wider than the waveguide portions 589-3 and 589-4 that are away from the border. This waveguide and optical connection enable the modulator 586-1 to send optical signals to the photodetector 587-2 and therefore facilitate optical communication from components of the EIC 515-1 to components of the EIC 515-2.

Similarly, the optical connections 593 can include an optical connection that is part of a waveguide between the modulator 586-2 and the photodetector 587-1. This waveguide includes the waveguide portions 589-5 and 589-6. The optical connection is at the border between the PIC 514-1 and the PIC 514-1 and can be wider than the waveguide portions 589-5 and 589-6 that are away from the border. This waveguide and optical connection enable the modulator 586-2 to send optical signals to the photodetector 587-1 and therefore facilitate optical communication from components of the EIC 515-2 to components of the EIC 515-1. Thus, the optical connections 593 facilitate two-way optical communication between the PICs 514-1 and 514-2 and therefore components of the EICs 515-1 and 515-2. Of course, part of the communication can include electronic signals in the EICs 515-1 and 515-2.

Although not shown, the PIC 514-1 can be optically coupled to another PIC, e.g., to the left of the PIC 514-1, via optical connections. Similarly, the PIC 514-2 can be optically coupled to another PIC, e.g., to the left of the PIC 514-2, via optical connections. This enables enlargement of the photonic circuit layer 502 to any size by tiling the PICs 514 or photonic circuit layer portions and using optical connections 593 to enable optical communication between adjacent PICs or photonic circuit layer portions.

FIG. 5-23 is a diagram illustrating a device 500 that includes two PICs 514-1 and 514-2 (or photonic circuit layer portions) and four EICs 515-1 to 515-4. FIG. 5-24 is a diagram illustrating the PICs 514-1 and 514-2 of FIG. 5-23. As shown in FIG. 5-24 optical connections 593 can enable optical communication between the two PICs 514-1 and 514-2.

Figures 5, 6, 7, 8:
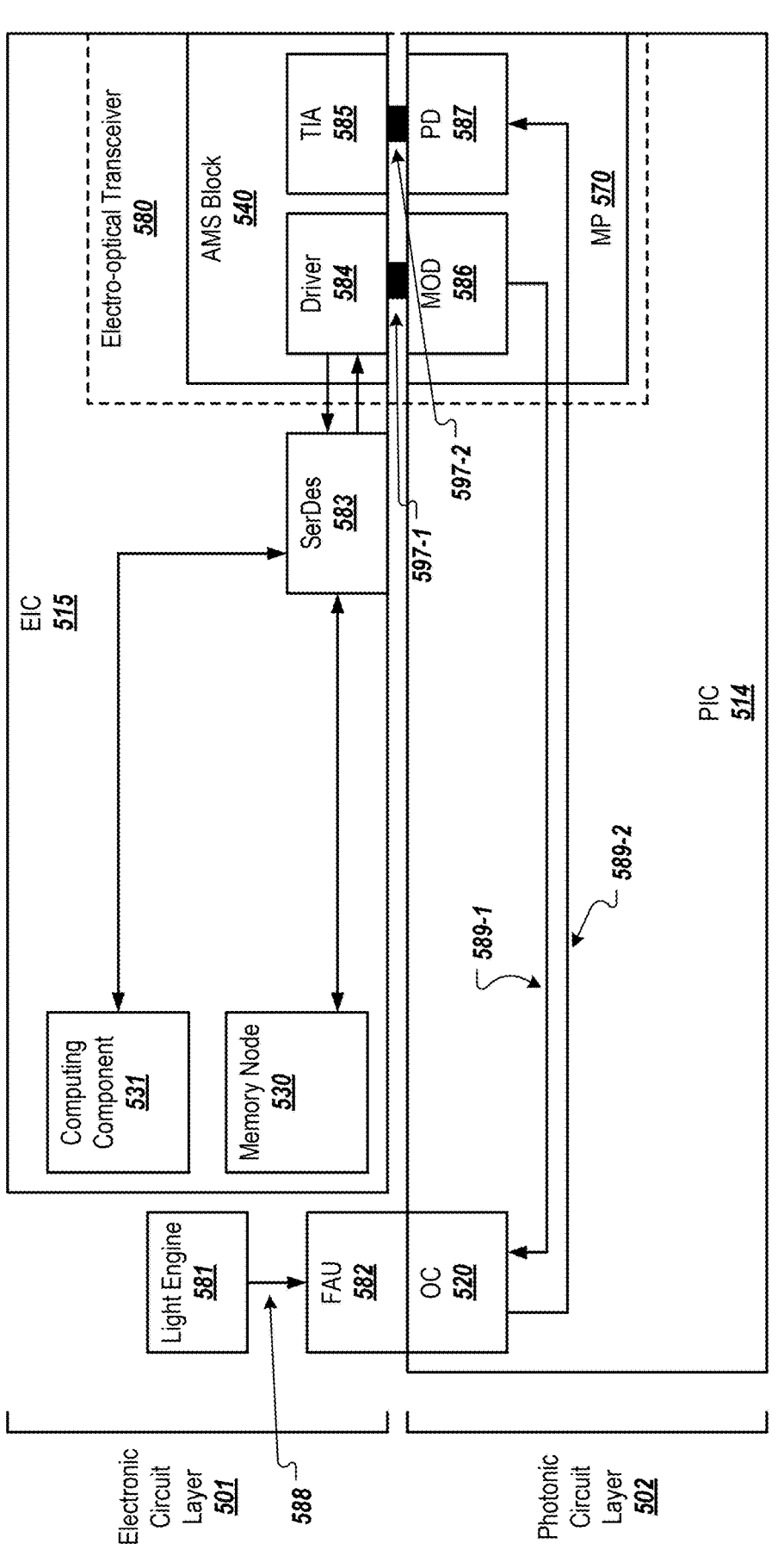
Figures 5, 6, 7, 8, 9:
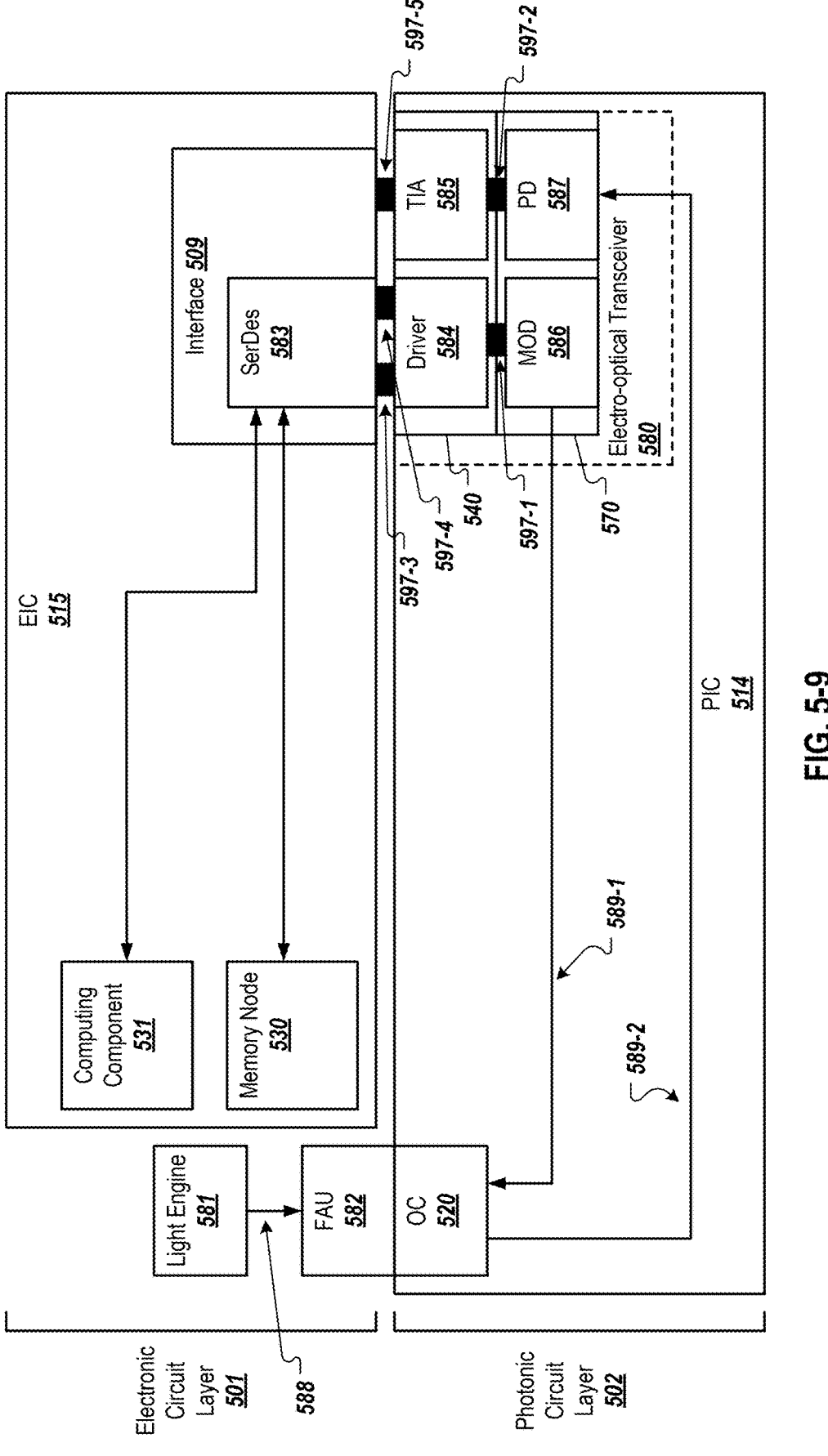
Figures 5, 6, 7, 8, 9, 10:
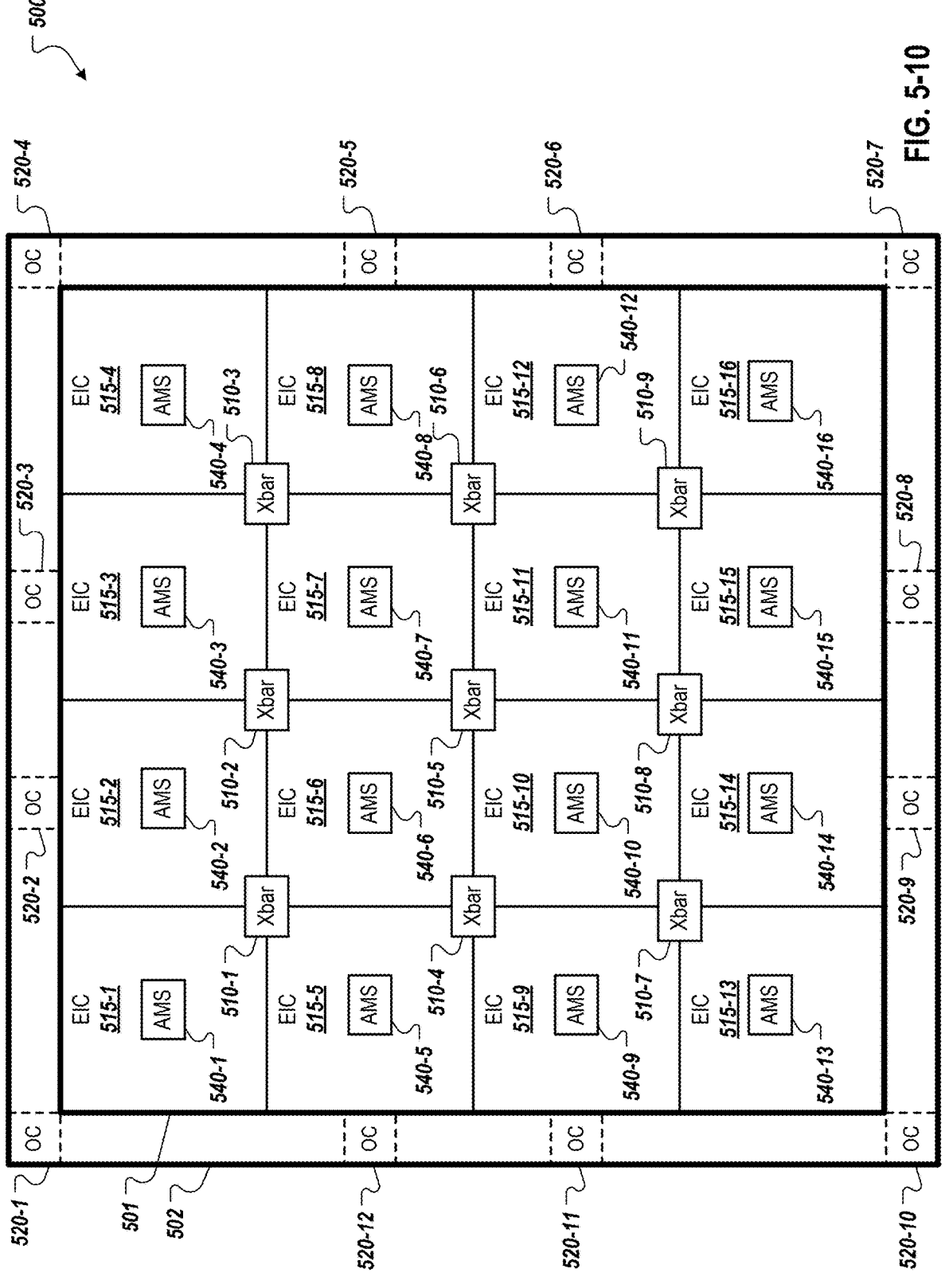
Figures 5, 6, 7, 8, 9, 10, 11:
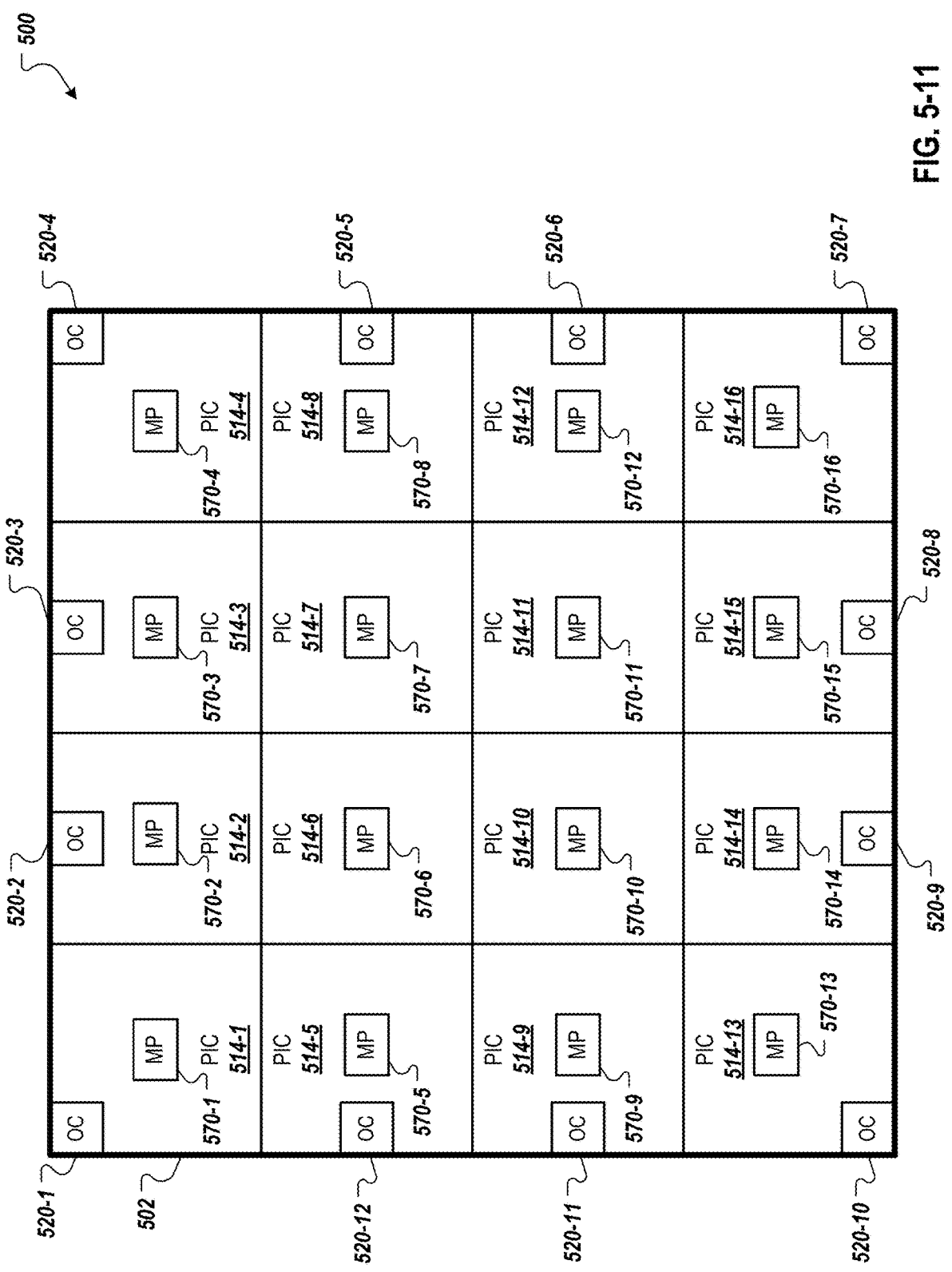
Figures 5, 6, 7, 8, 9, 10, 11, 12:
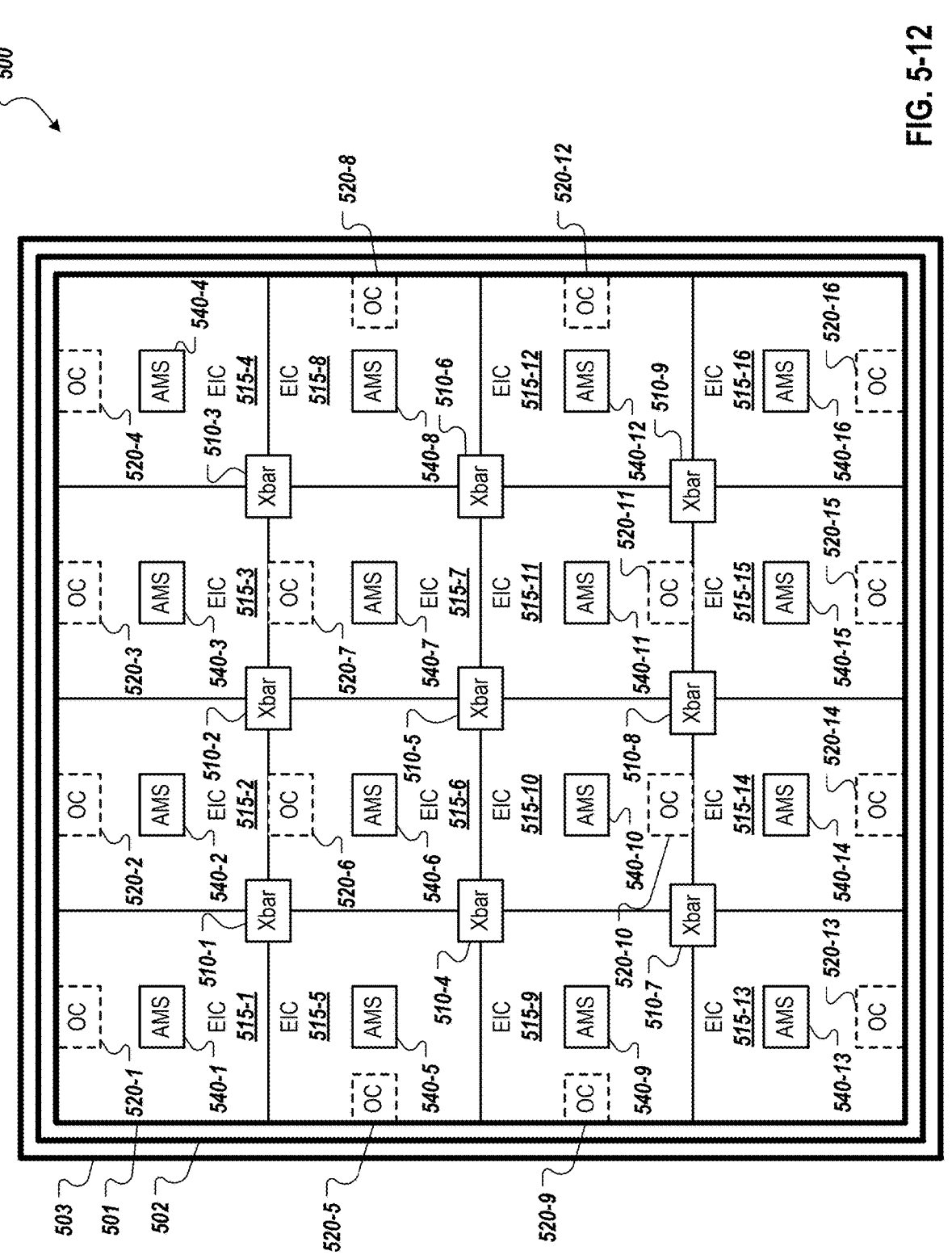
Figures 5, 6, 7, 8, 9, 10, 11, 12, 13, 14:
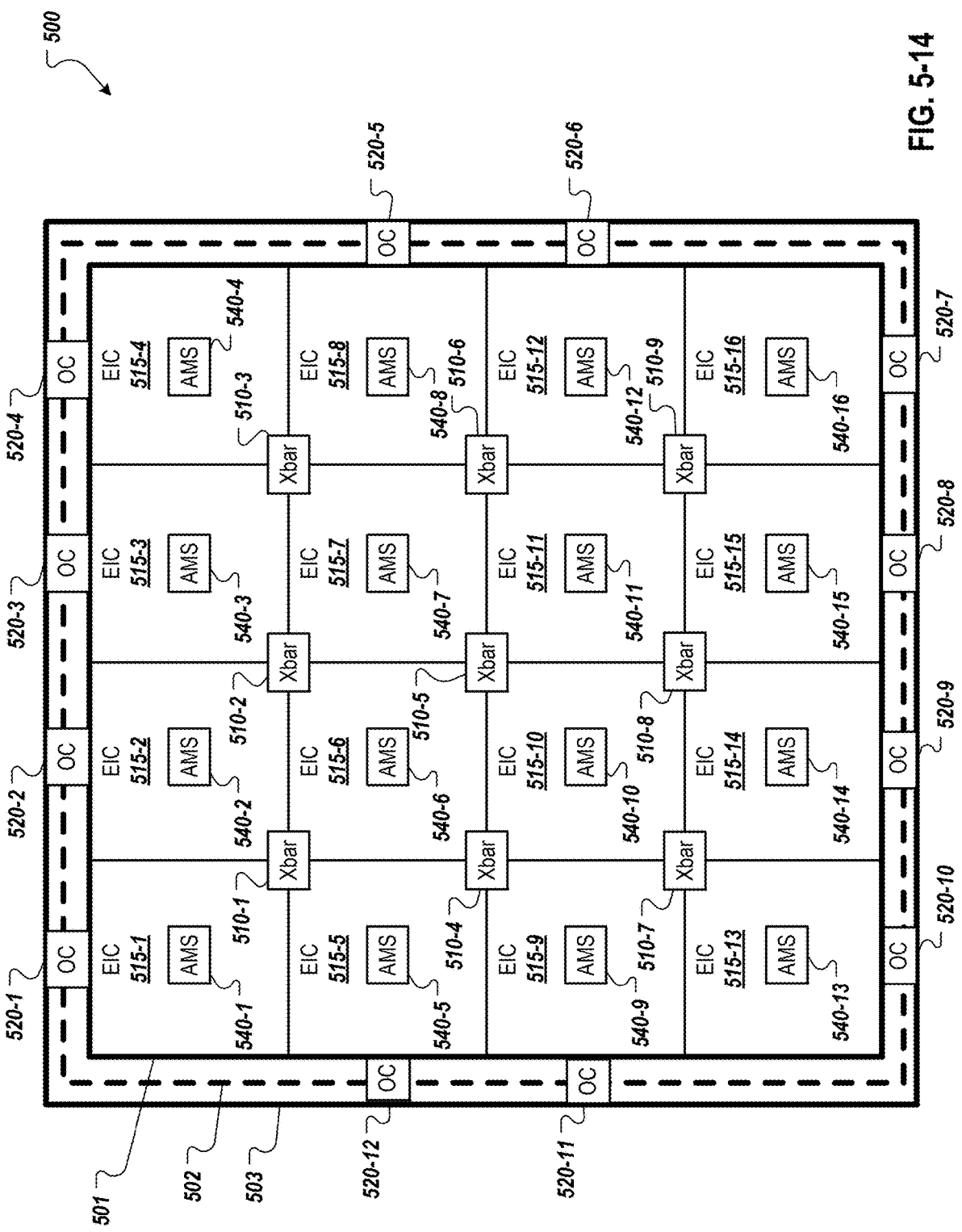
Figures 5, 6, 7, 8, 9, 10, 11, 12, 13, 14, 15:
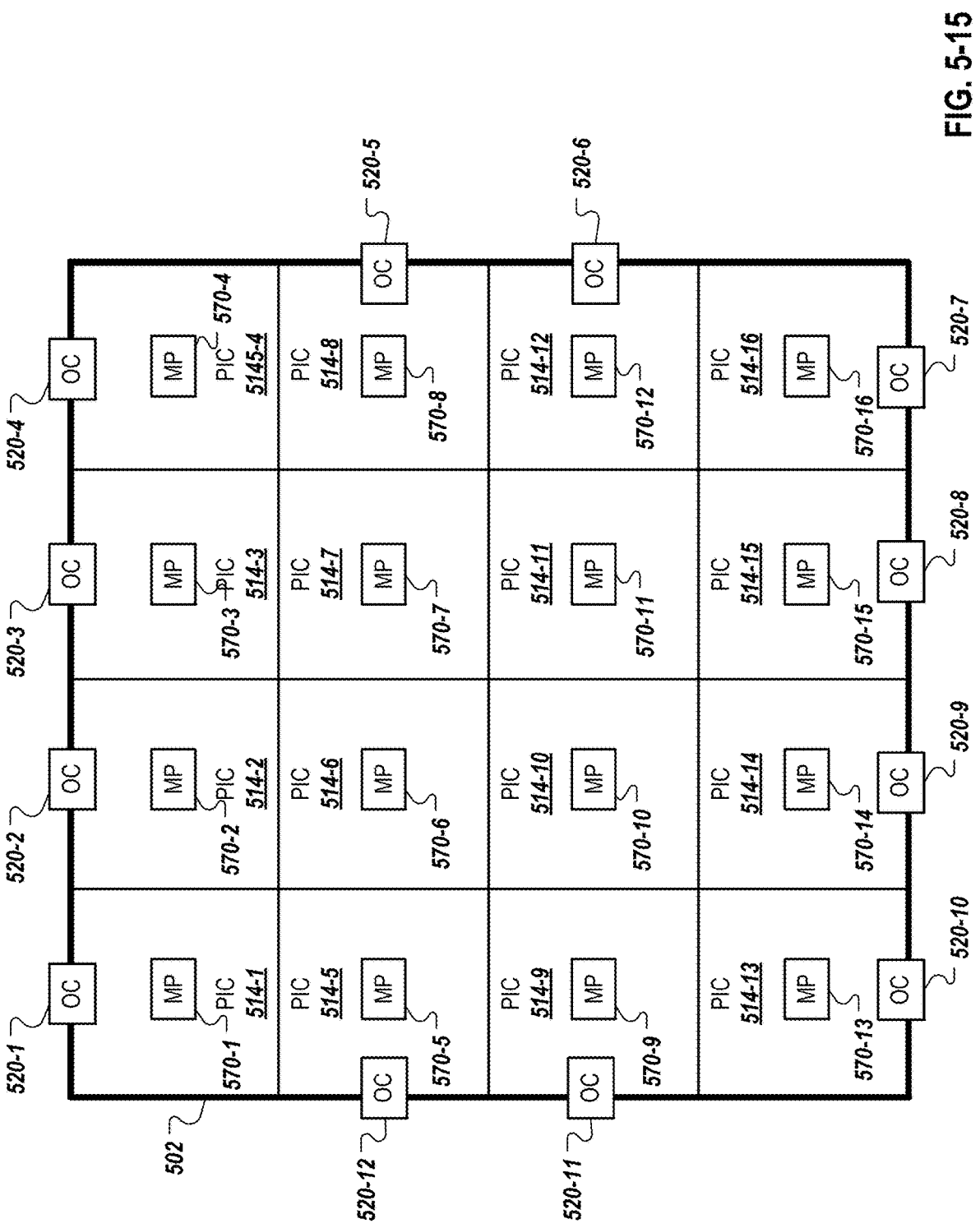
Figures 5, 6, 7, 8, 9, 10, 11, 12, 13, 14, 15, 16:
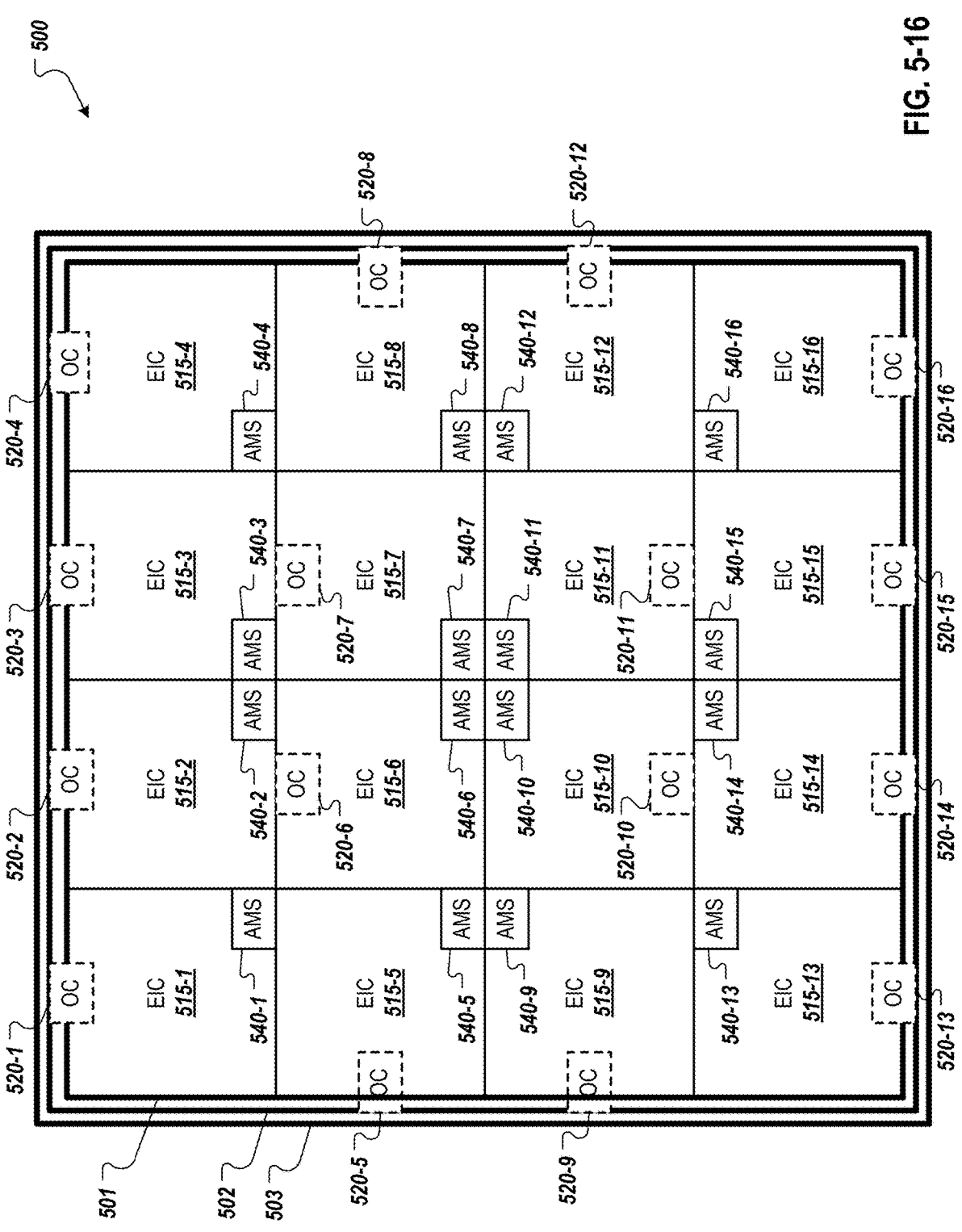
Figures 5, 6, 7, 8, 9, 10, 11, 12, 13, 14, 15, 16, 17:
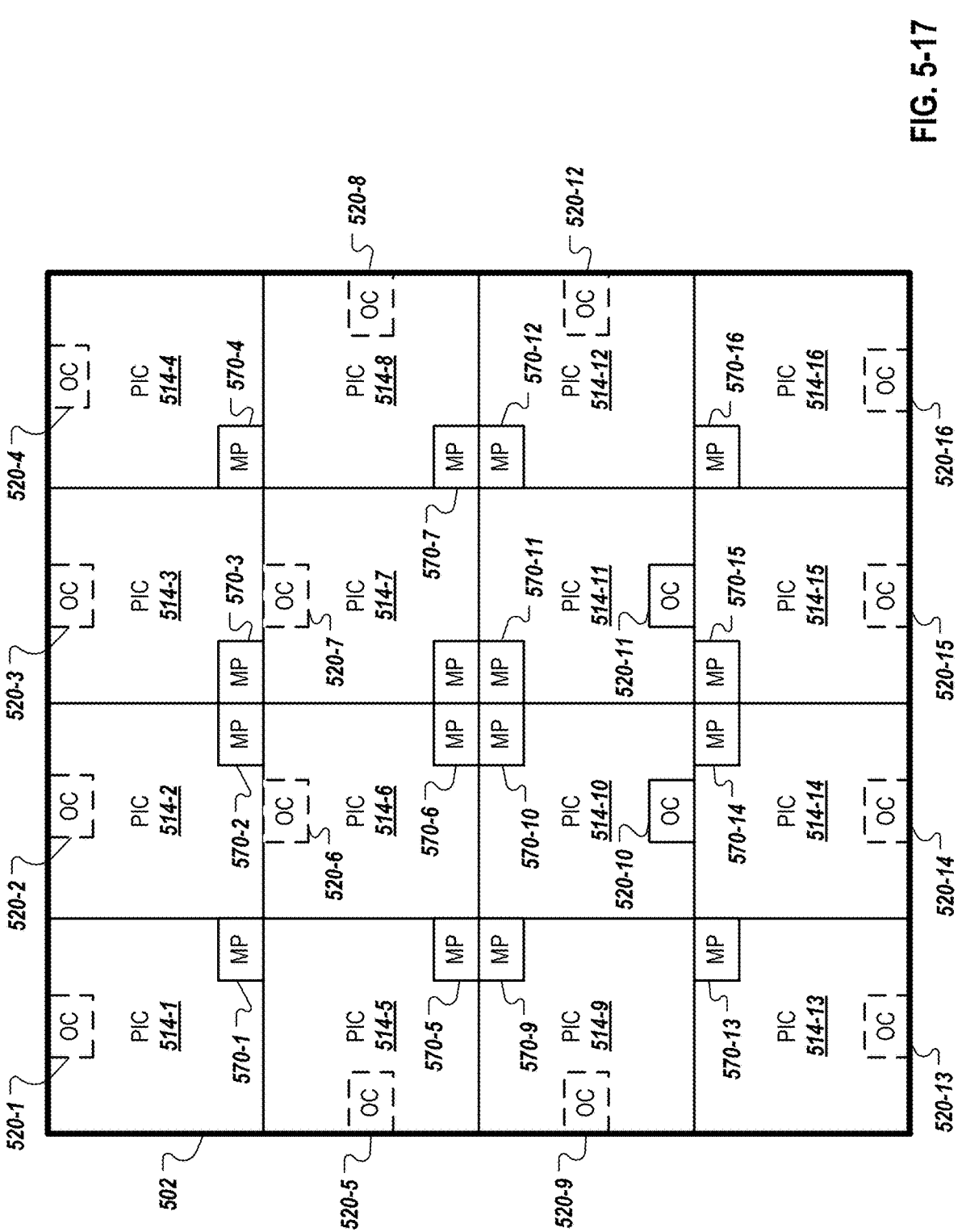
Figures 5, 6, 7, 8, 9, 10, 11, 12, 13, 14, 15, 16, 17, 18:
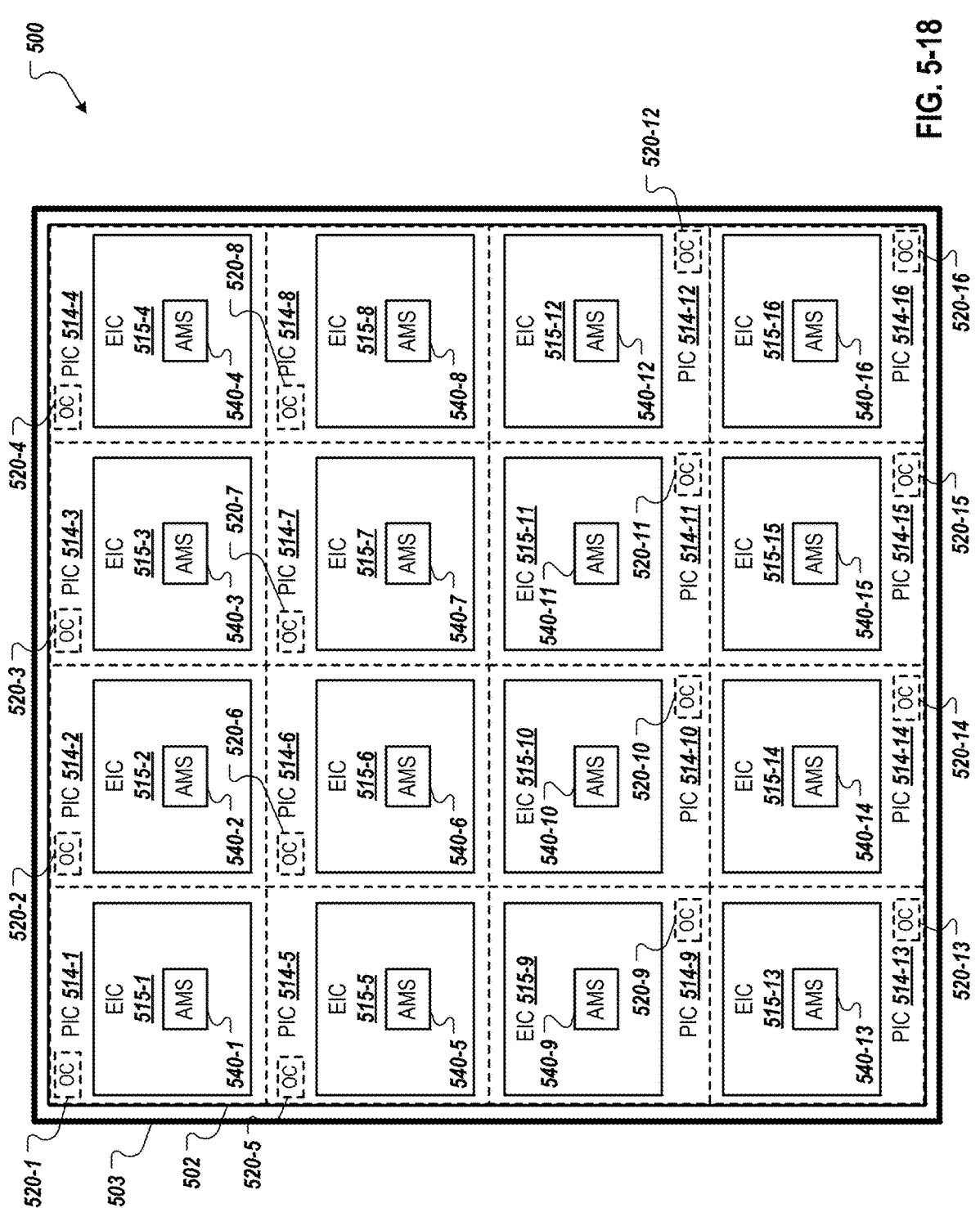
Figures 5, 6, 7, 8, 9, 10, 11, 12, 13, 14, 15, 16, 17, 18, 19:
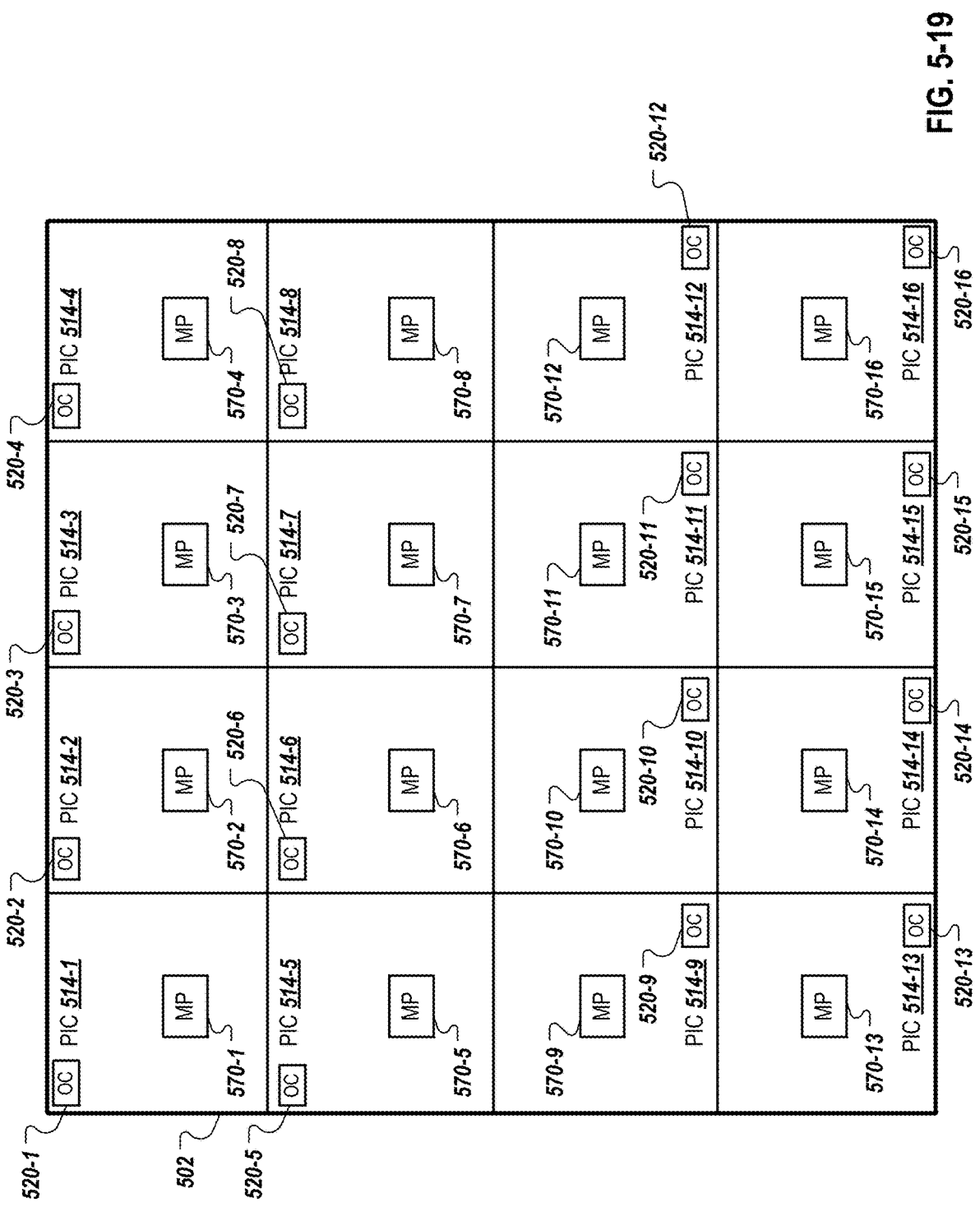
Figures 5, 6, 7, 8, 9, 10, 11, 12, 13, 14, 15, 16, 17, 18, 19, 20:
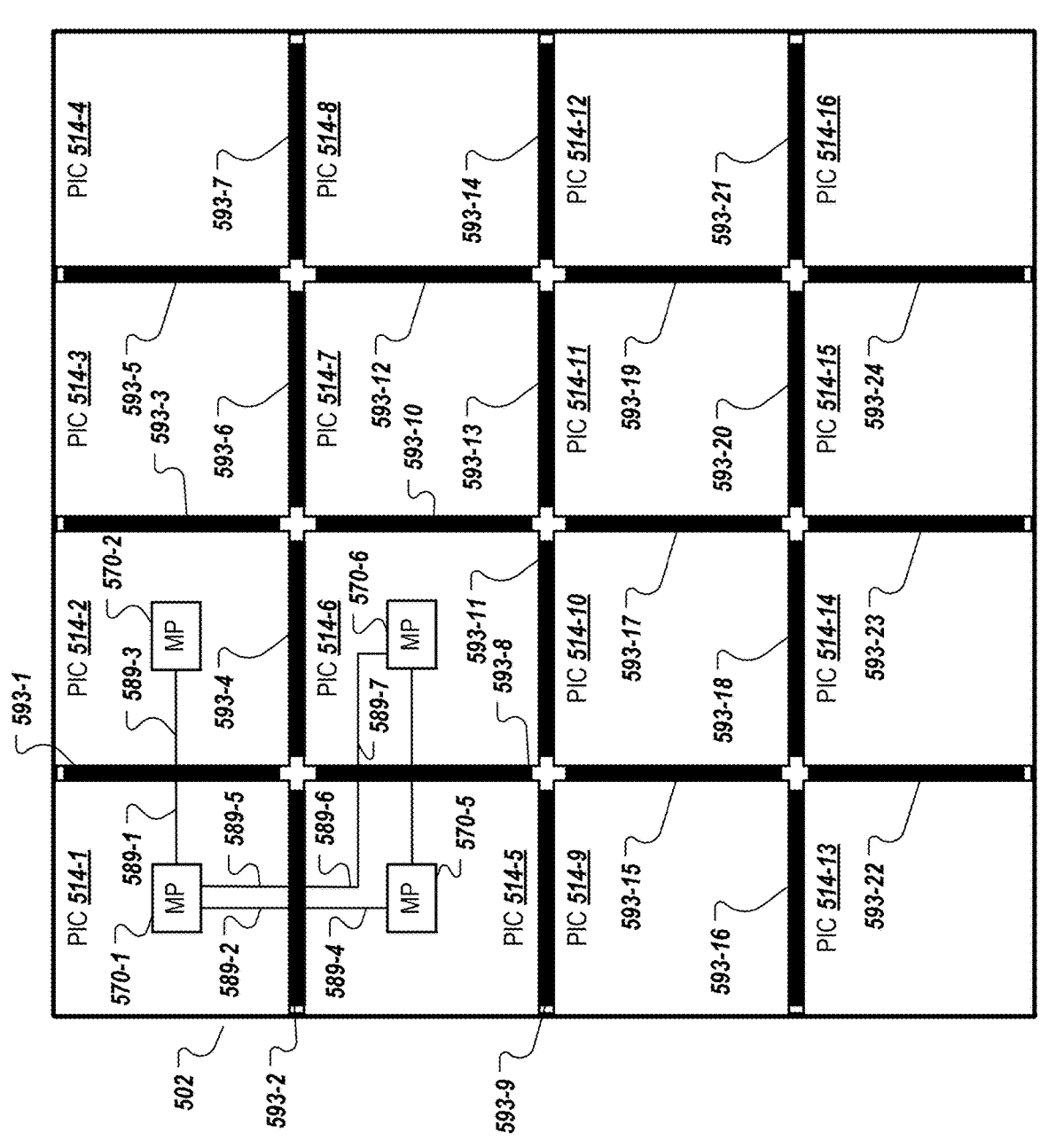
Figures 5, 6, 7, 8, 9, 10, 11, 12, 13, 14, 15, 16, 17, 18, 19, 20, 21:
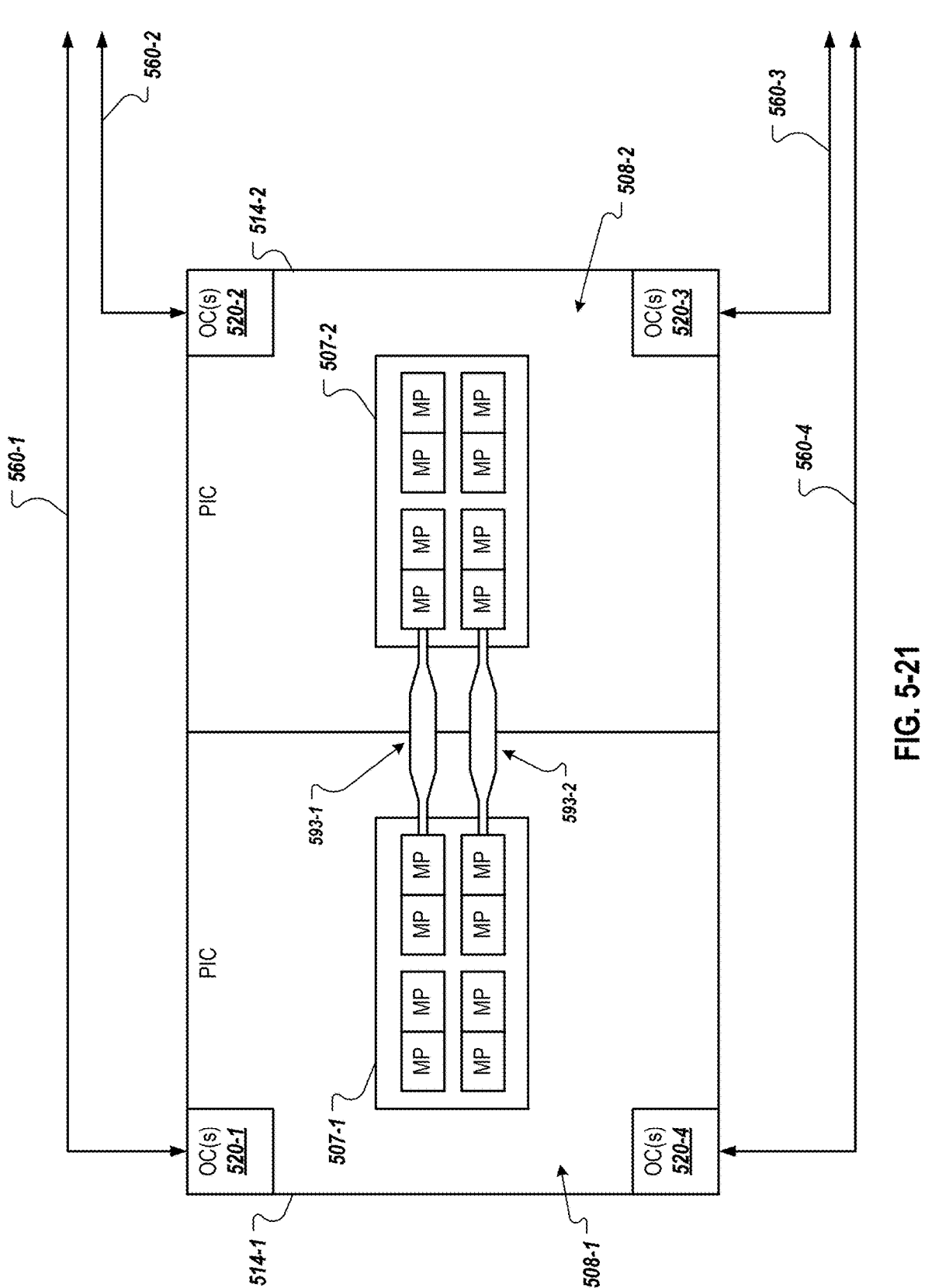
Figures 5, 6, 7, 8, 9, 10, 11, 12, 13, 14, 15, 16, 17, 18, 19, 20, 21, 22:
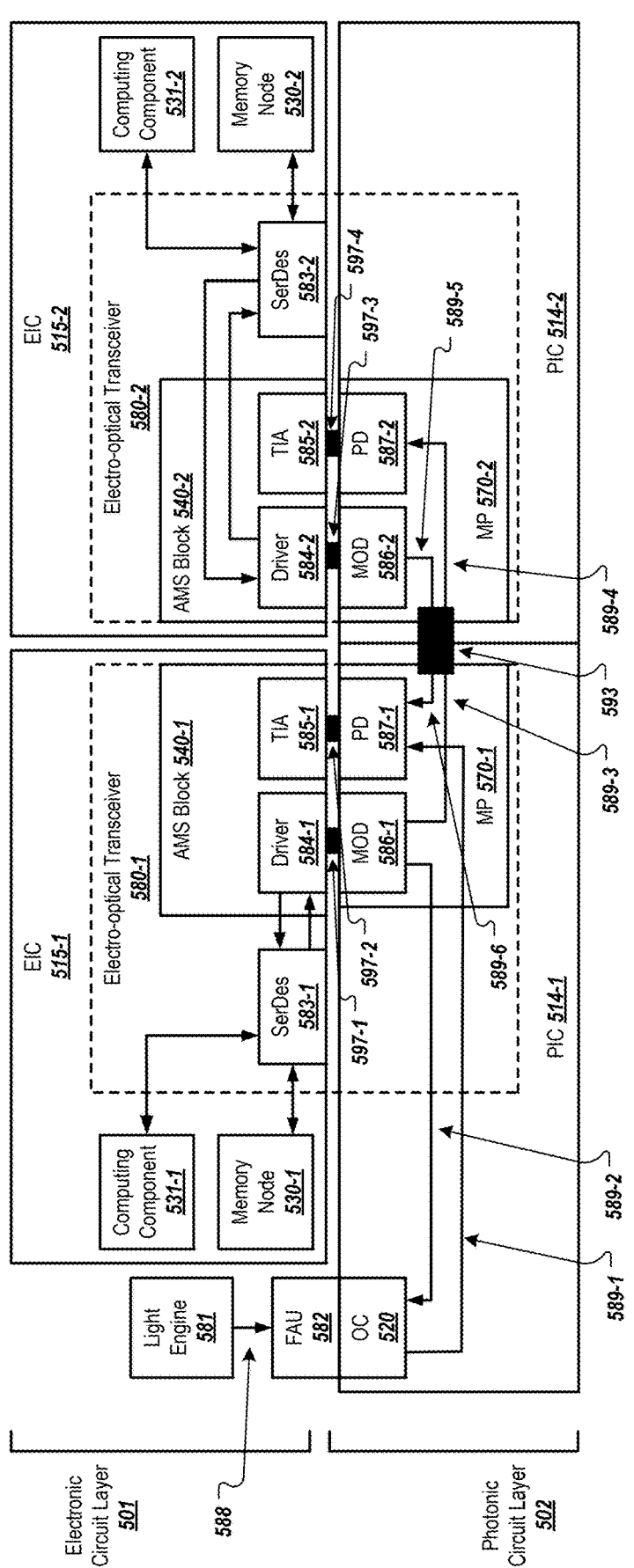
Figures 5, 6, 7, 8, 9, 10, 11, 12, 13, 14, 15, 16, 17, 18, 19, 20, 21, 22, 23, 24:
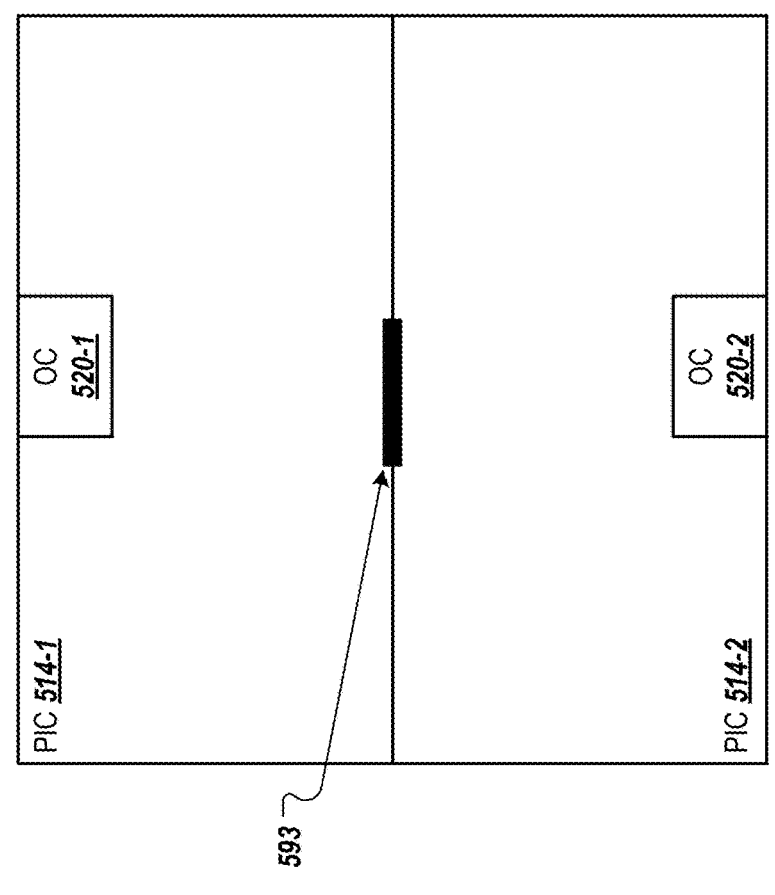
Figures 5, 6, 7, 8, 9, 10, 11, 12, 13, 14, 15, 16, 17, 18, 19, 20, 21, 22, 23:
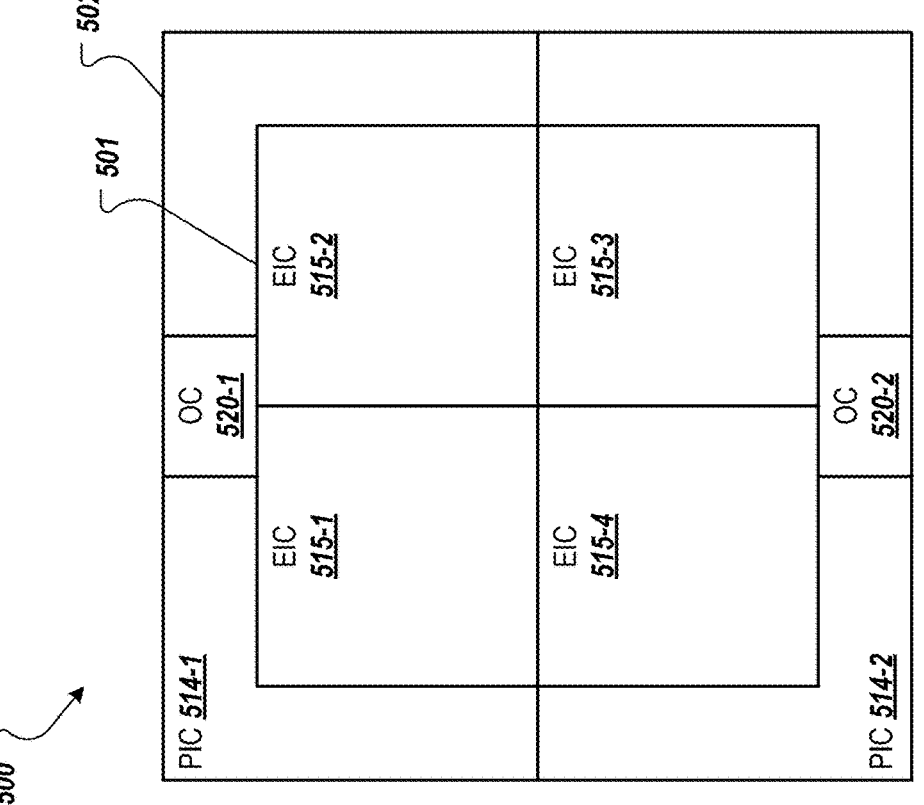

Referring to FIG. 23, the EICs 515-1 to 515-4 are arranged in a center or inner region of a photonic circuit layer 502 that includes the two PICs 514-1 and 514-2. However, other arrangements are possible, e.g., with the EICs 515 being spaced apart or located towards one side of the photonic circuit layer 502. Although four EICs 515-1 to 515-4 are shown in this example, devices with two PICs 514-1 and 514-2 can include fewer or more EICs 515 in other examples. Although not shown, the electronic circuit layer 501 can include one or more switching devices, e.g., crossbar switches, to enable electronic signals to be sent between the EICs 515-1 to 515-4 without being converted to optical signals.

Each PIC 514-1 and 514-2 can include one or more optical couplers 520-1 and 520-2, respectively. In this example, the optical couplers 520-1 and 520-2 are shown as being attached to the same surface of the PICs 514-1 and 514-2 as the EICs 515. In other examples, the optical couplers 520-1 and 520-2 can be coupled to other locations on the surface of the PICs 514-1 and 514-2, e.g., in one or more corners of the PICs 514-1 and 514-2, to the opposite surface of the PICs 514-1 and 514-2, or edge-coupled to the PICs 514-1 and 514-2.

Although not shown, each PIC 514-1 and 514-2 can include internal waveguides that connect the optical couplers 520-1 and 520-2 to MP blocks of the PICs 514-1 and 514-2 and that connect the MP blocks and/or optical couplers 520-1 and 520-2 to the optical connection 593. Using optical connections as shown, the photonic circuit layer 502 can be larger than the size of a reticle used to create each PIC 514. For example, using two PICs 514-1 and 514-2 can allow for a photonic circuit layer 502 that is twice as long as the reticle in one dimension and equal to the size of the reticle in the orthogonal dimension. This can allow additional space on the photonic circuit layer 502 for more EICs 515, optical couplers, or other components and/or improved thermal management.

FIG. 5-25 is a diagram illustrating a device 500 that includes a substrate 503, multiple PICs 514 and multiple EICs 515. FIG. 5-26 is a diagram illustrating the electrical circuit layer 501 of the device 500 of FIG. 5-25 and FIG. 5-27 is a diagram illustrating photonic circuit layer 502 of the device 500 of FIG. 5-25.

The example device 500 includes a photonic circuit layer 502 that includes three PICS 514-1 to 514-3 (or photonic circuit layer portions) attached to the substrate 503. The device 500 also includes an electronic circuit layer 501 that includes four EICs 515-1 to 515-4 (collectively, EICs 515) attached to the photonic circuit layer 502.

Figures 5, 6, 7, 8, 9, 10, 11, 12, 13, 14, 15, 16, 17, 18, 19, 20, 21, 22, 23, 24, 25:
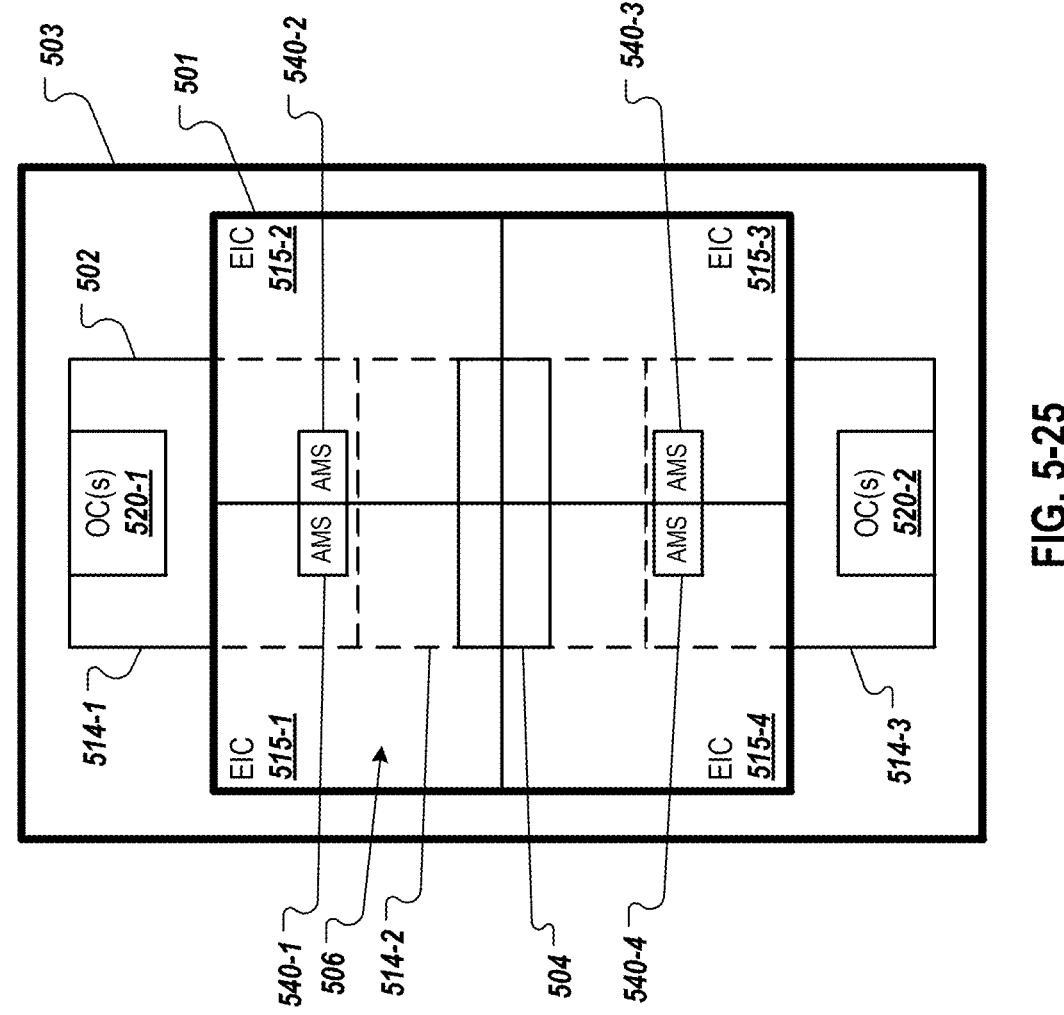
Figures 5, 6, 7, 8, 9, 10, 11, 12, 13, 14, 15, 16, 17, 18, 19, 20, 21, 22, 23, 24, 25, 26, 27:
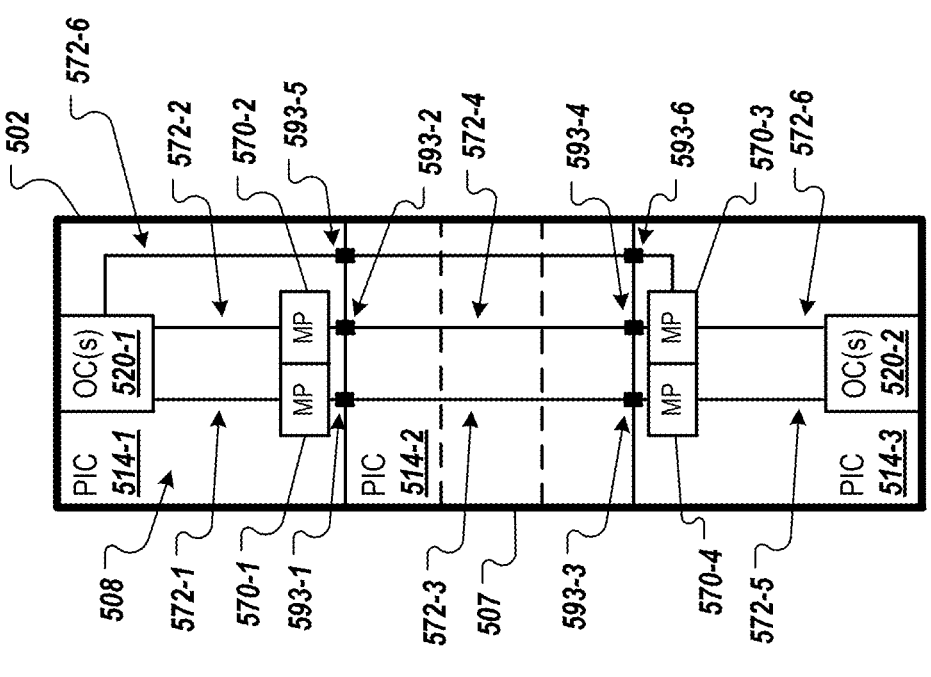
Figures 5, 6, 7, 8, 9, 10, 11, 12, 13, 14, 15, 16, 17, 18, 19, 20, 21, 22, 23, 24, 25, 26:
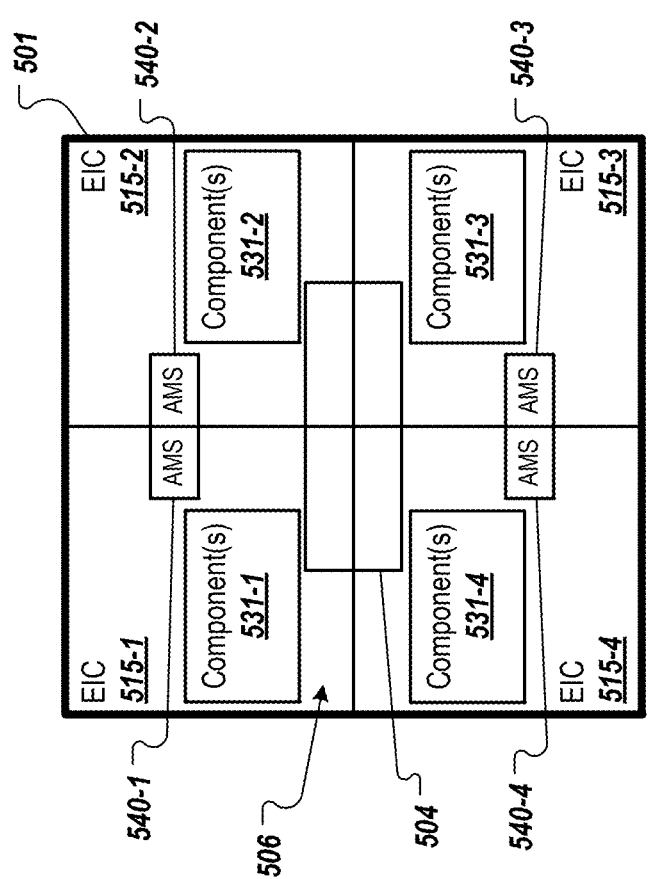
Figures 5, 6, 7, 8, 9, 10, 11, 12, 13, 14, 15, 16, 17, 18, 19, 20, 21, 22, 23, 24, 25, 26, 27, 28:
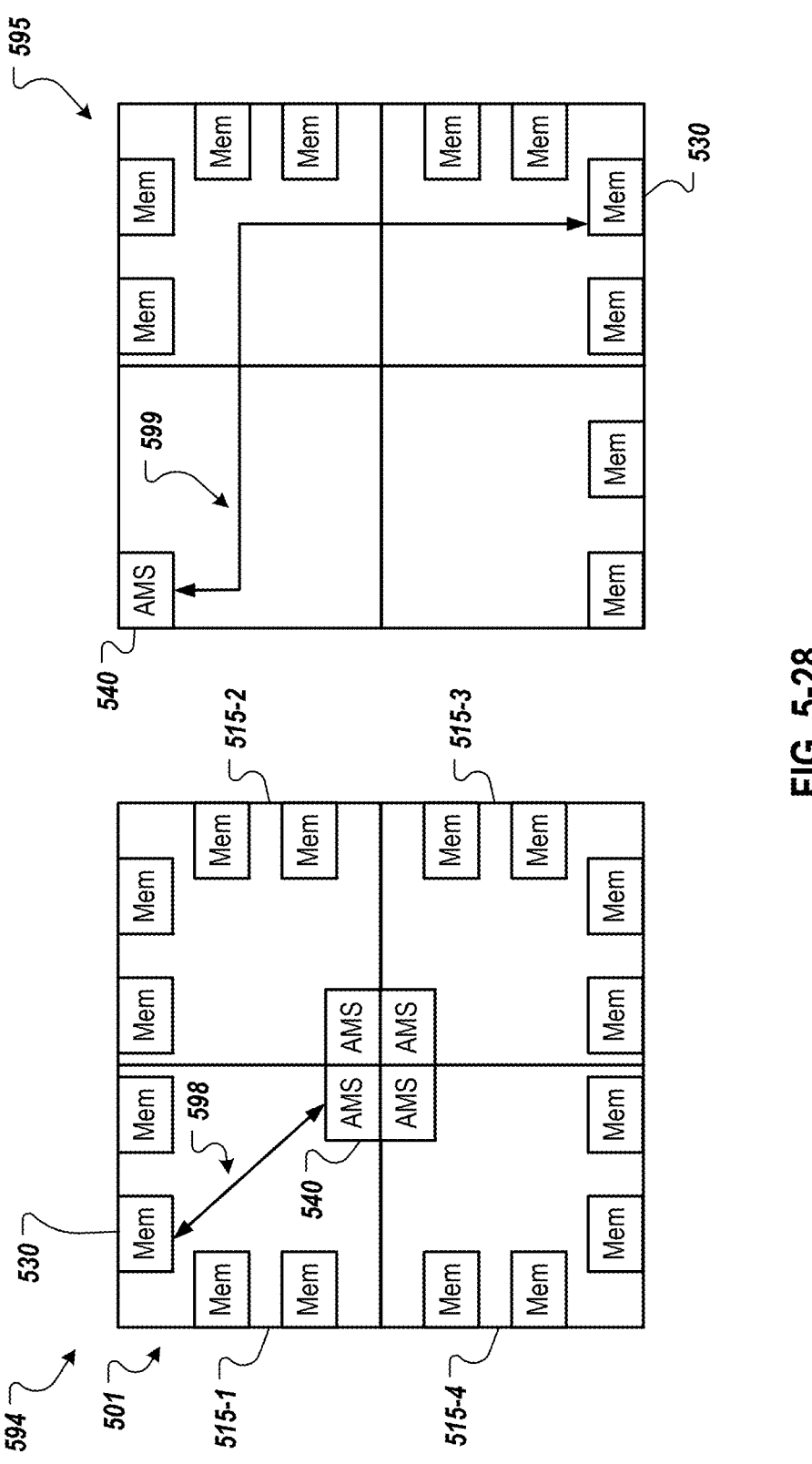
Figures 5, 6, 7, 8, 9, 10, 11, 12, 13, 14, 15, 16, 17, 18, 19, 20, 21, 22, 23, 24, 25, 26, 27, 28, 29:
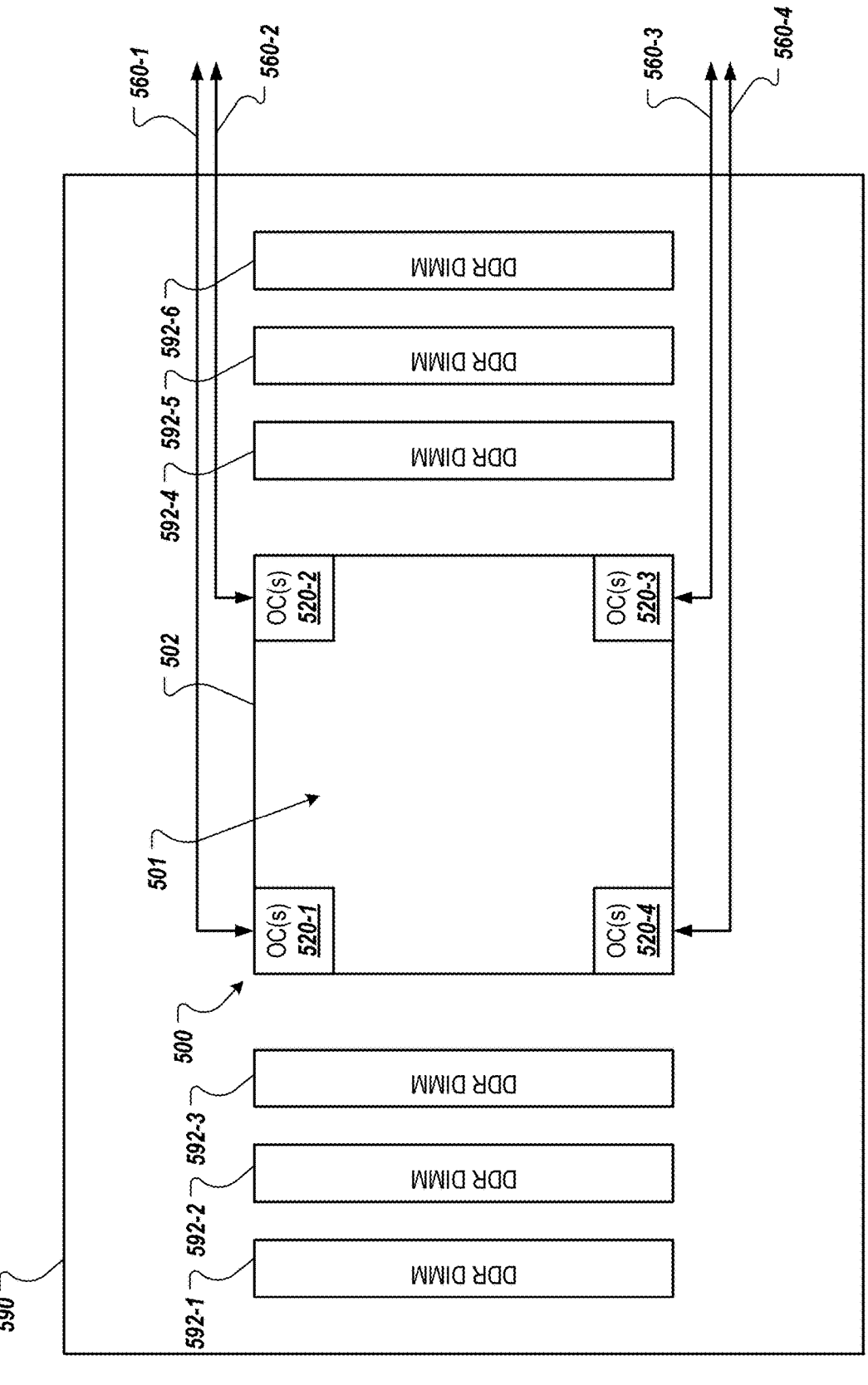
Figures 5, 6, 7, 8, 9, 10, 11, 12, 13, 14, 15, 16, 17, 18, 19, 20, 21, 22, 23, 24, 25, 26, 27, 28, 29, 30:
Figures 1, 6:
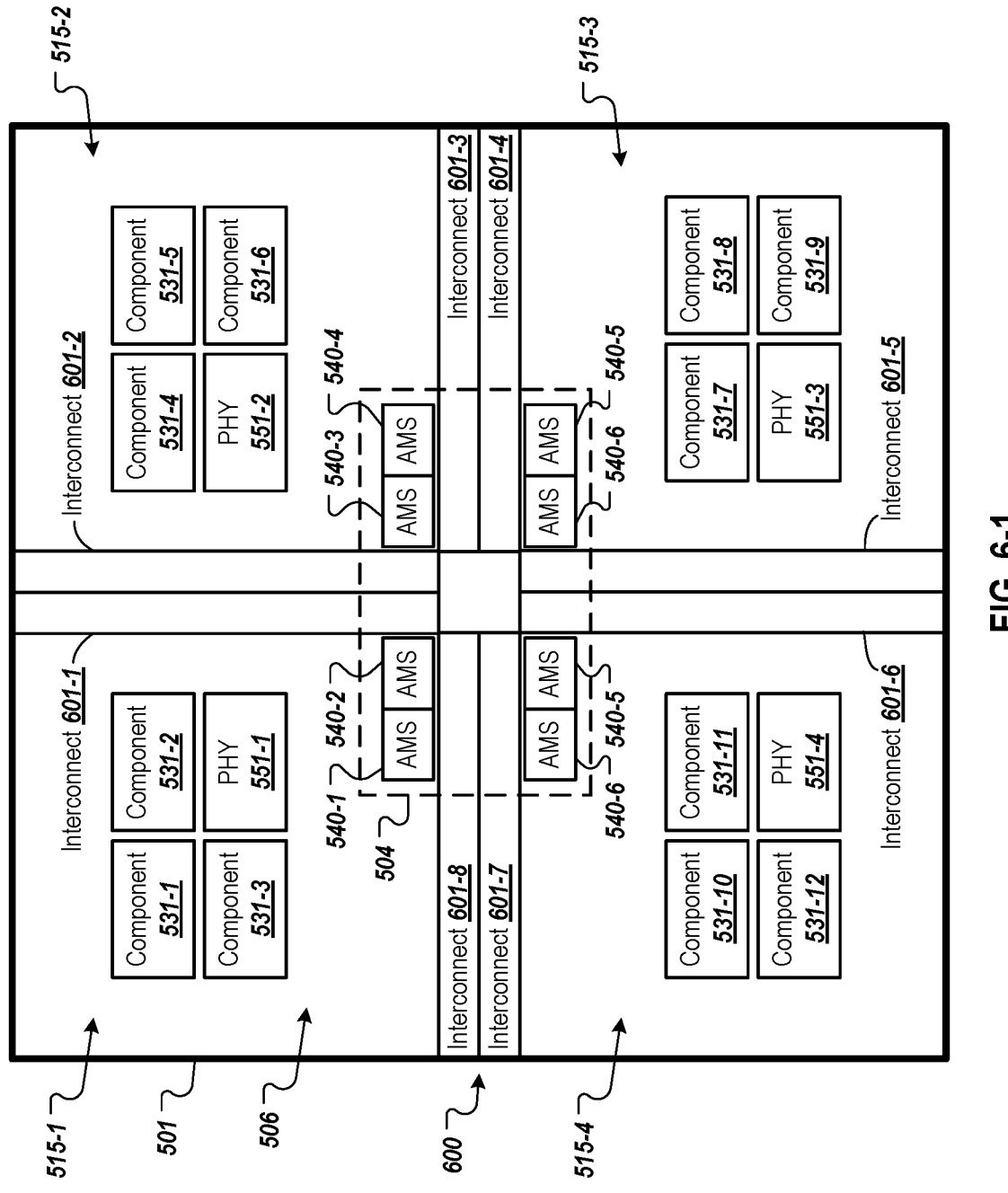
Figures 2, 6:
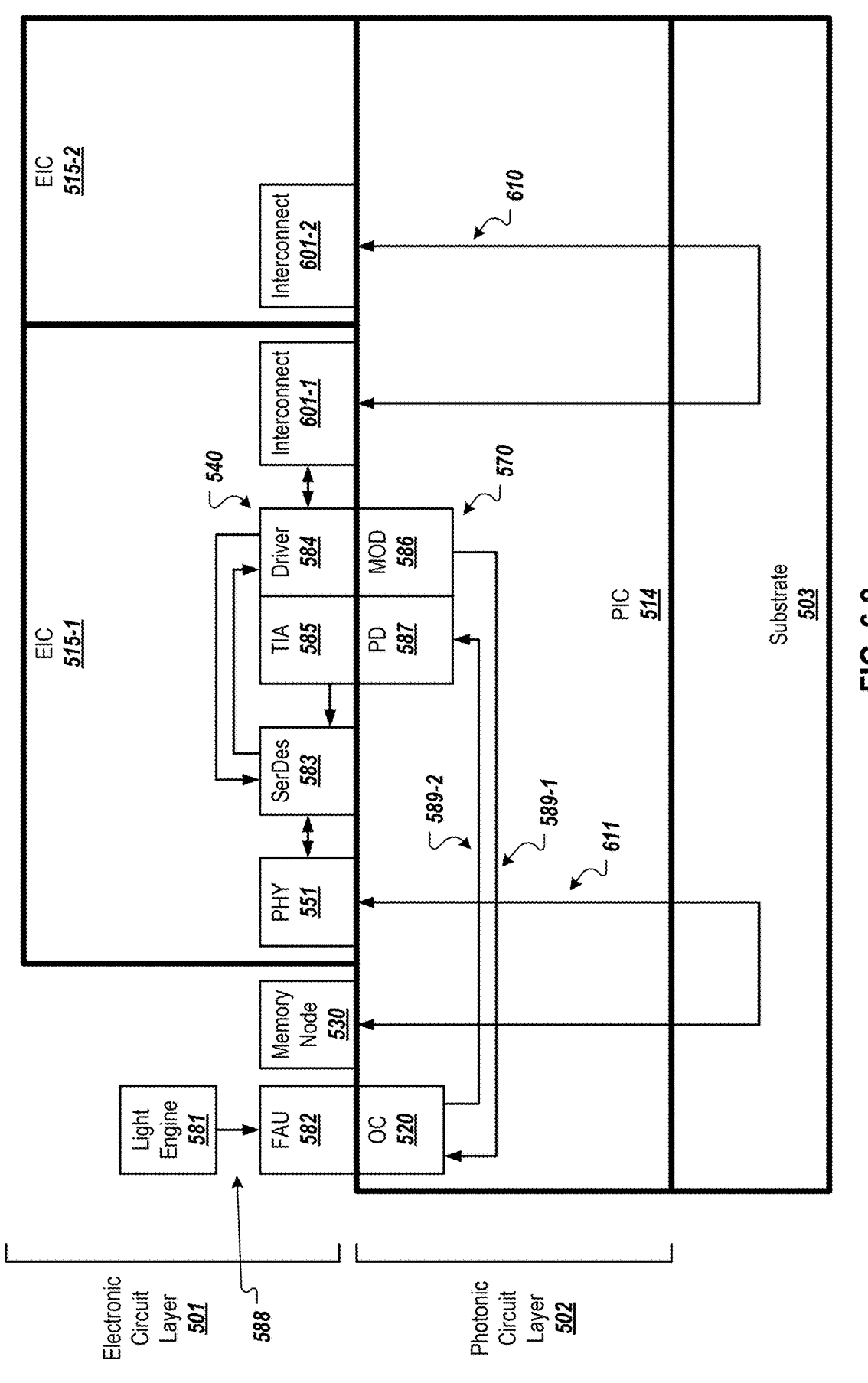
Figures 3, 6:
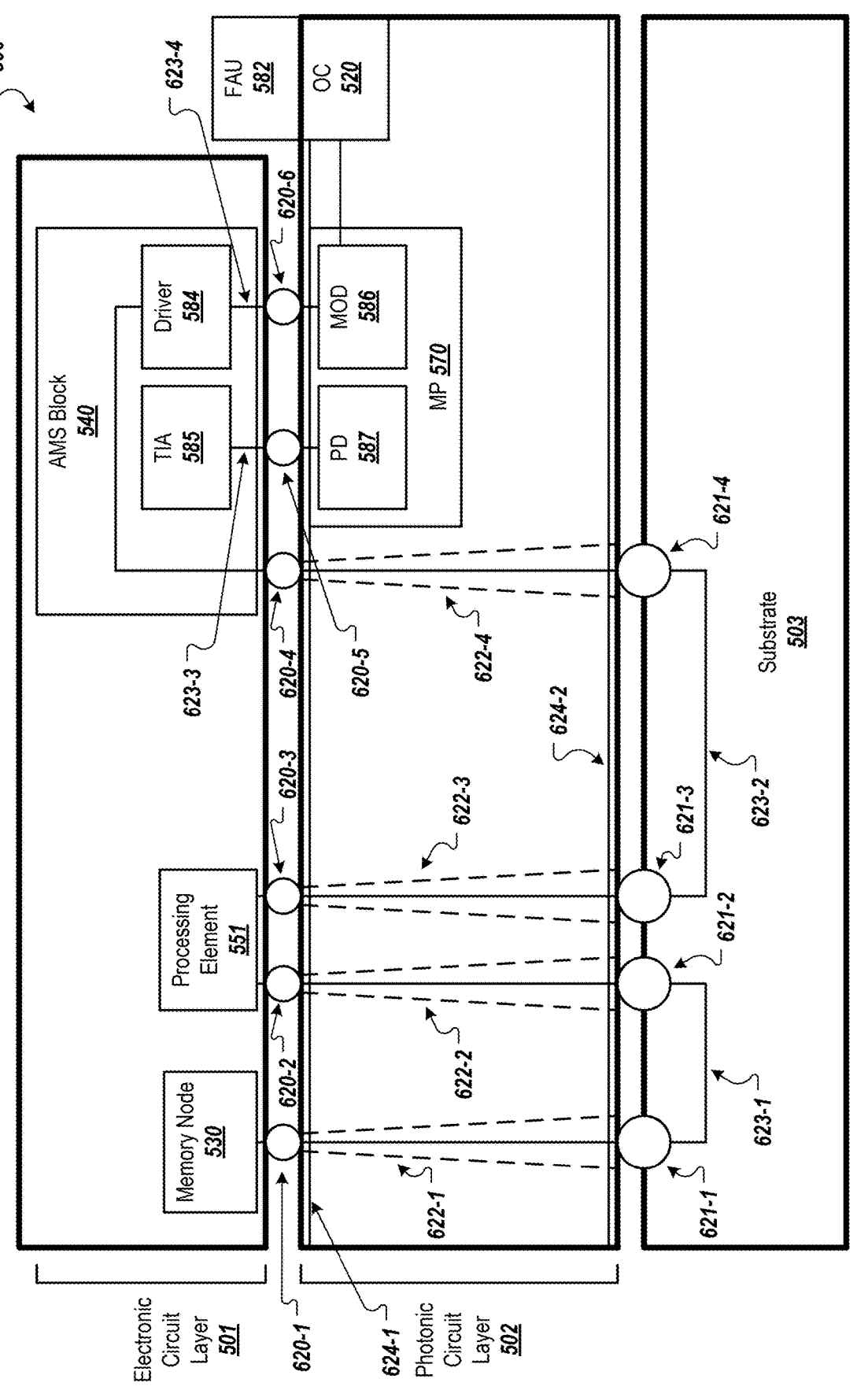
Figures 1, 7:
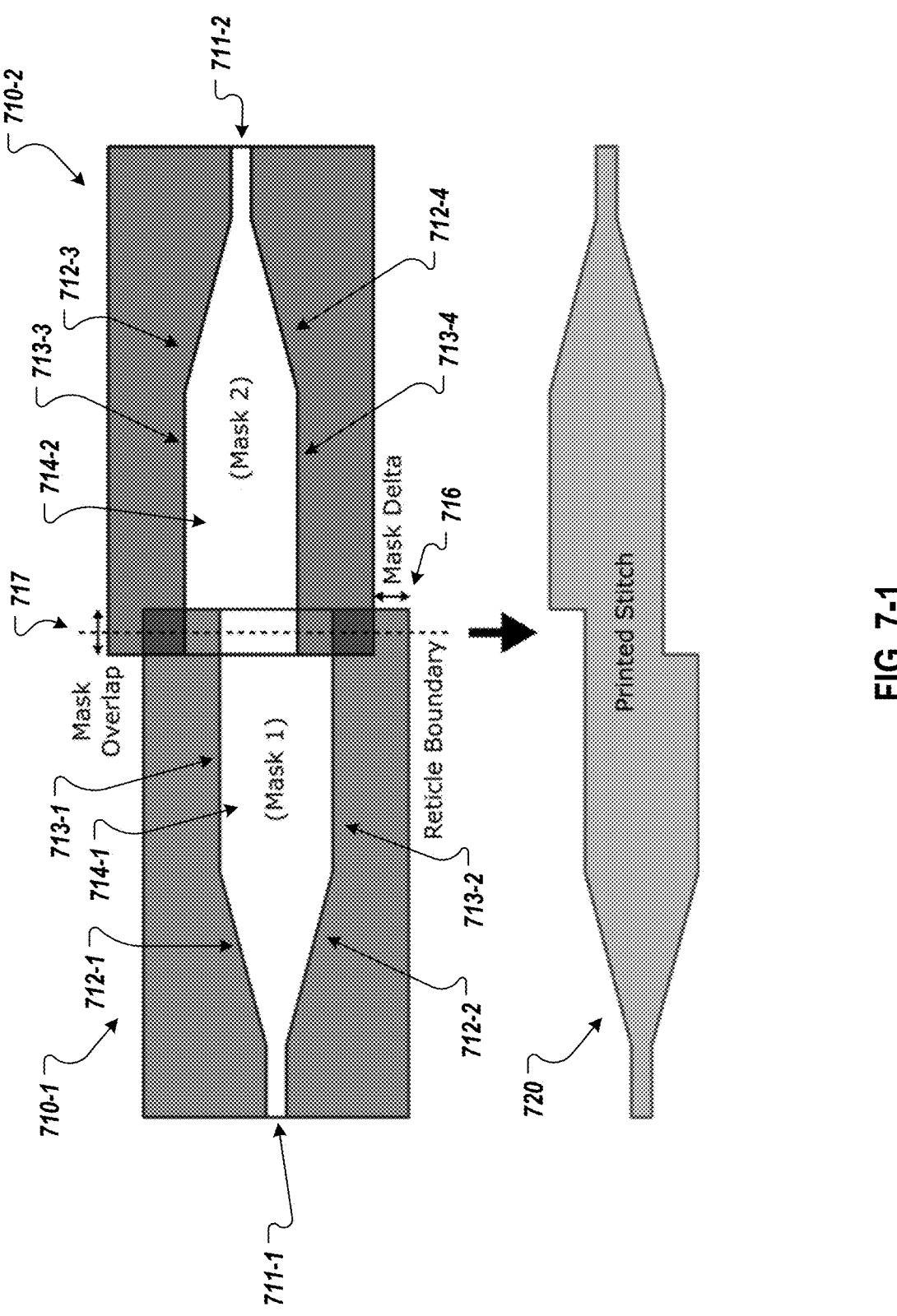
Figures 2, 7:
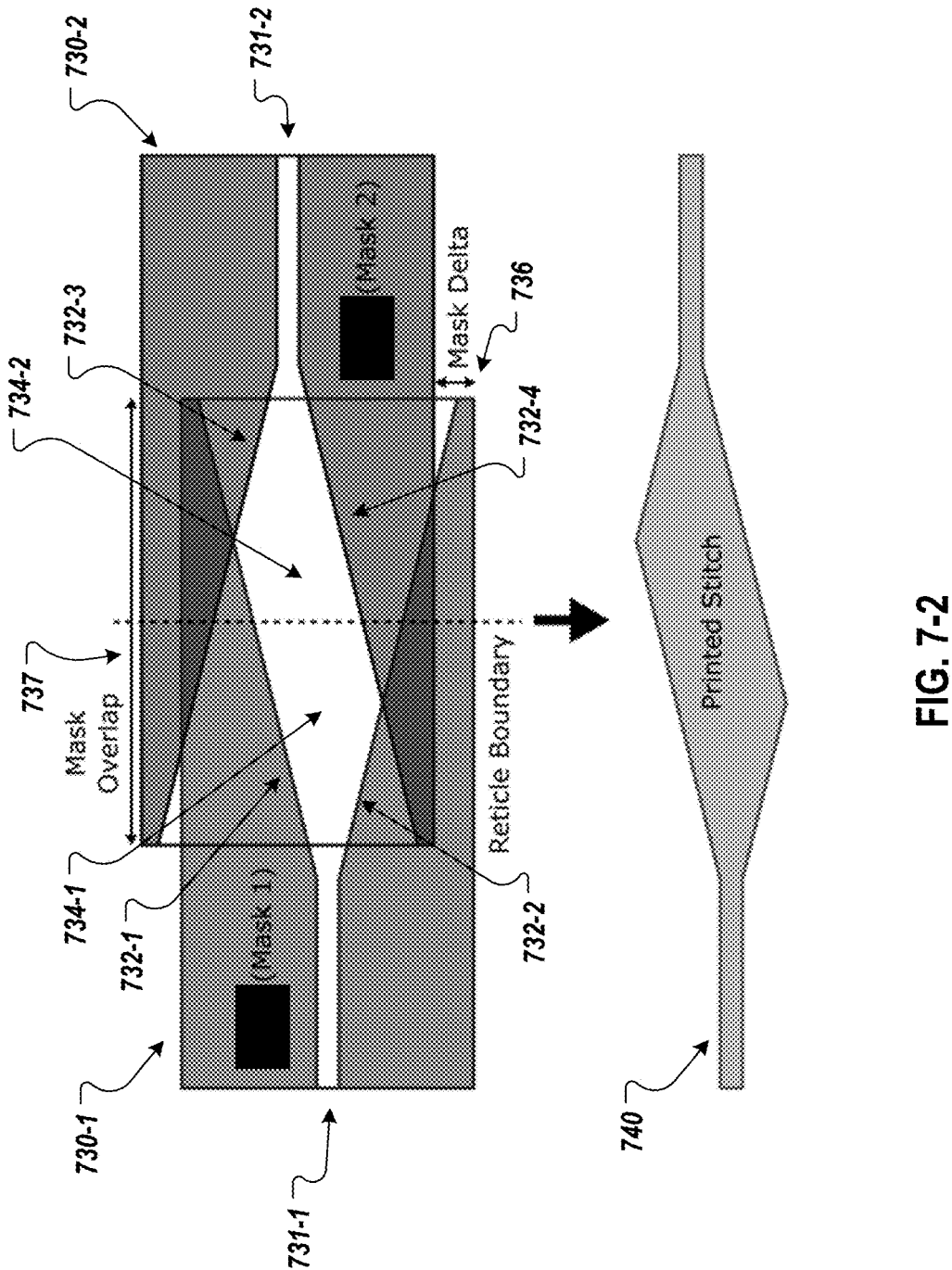
Figure 8:
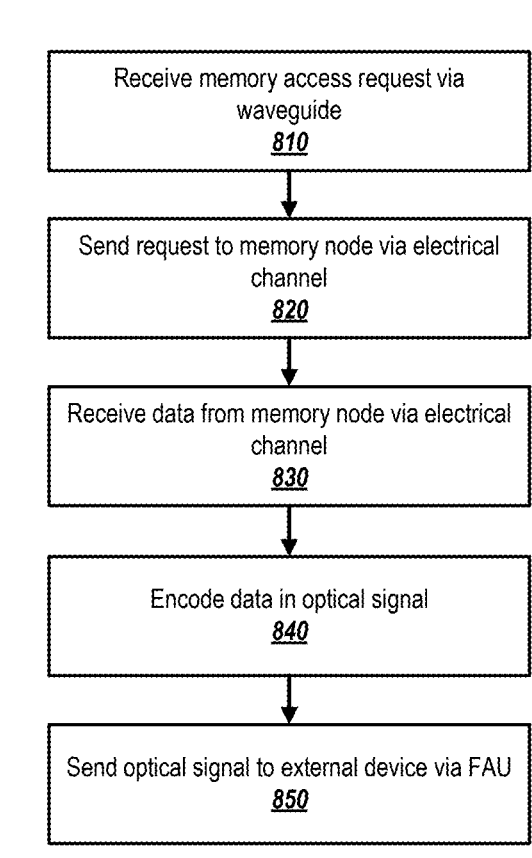
Figure 9:
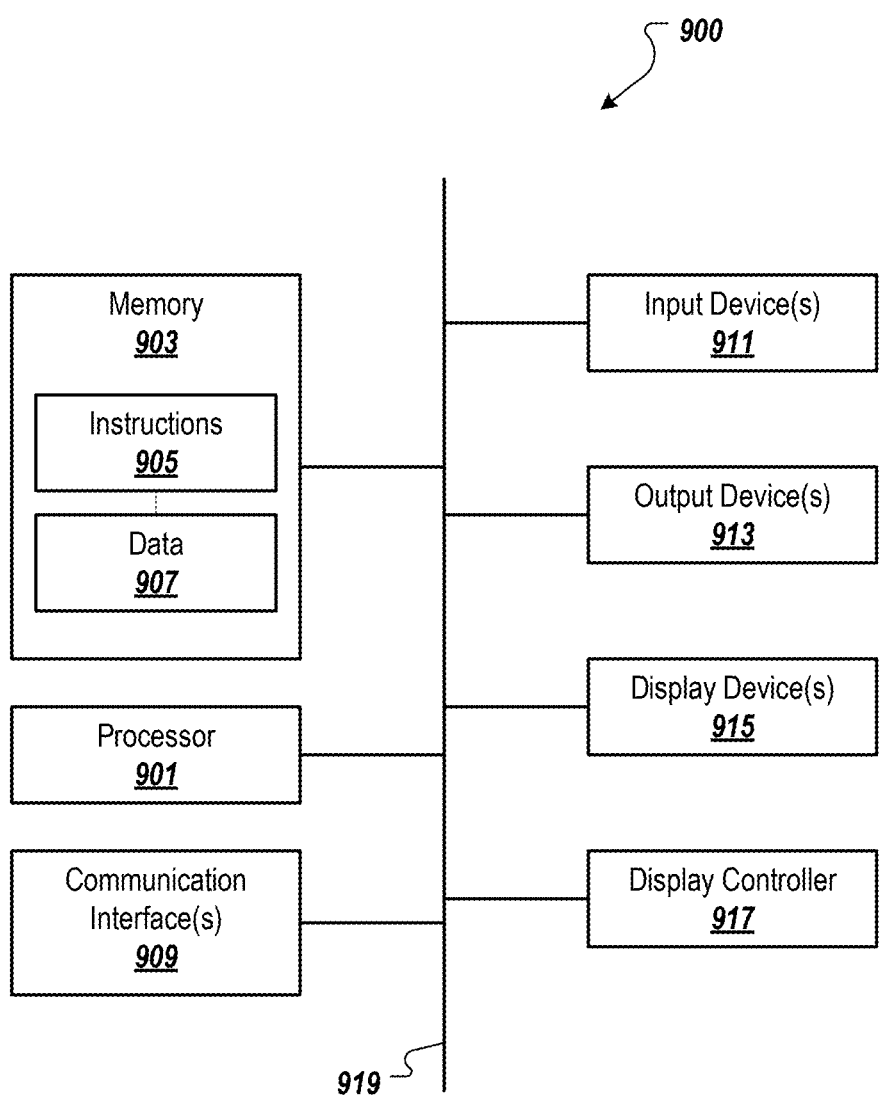

Referring to FIG. 25, the EICs 515 are arranged such that an inner region 504 of the electronic circuit layer 501 is located adjacent to, e.g., above, an inner region 507 of the photonic circuit layer 502 (see FIG. 5-27). The electronic circuit layer 501 also includes an outer region 506 that is formed by the portions of the EICs 515 that are not within the inner region 507. For example, the inner regions 504 and 507 can be defined as described elsewhere herein and the outer region 506 can extend from the perimeter of the inner region 504 to the outer perimeter of the electronic circuit layer 501 defined by the outer perimeters of the EICs 515. As shown in FIG. 5-26 and described below, each EIC 515 can include computing components 531.

Although four EICs 515-1 to 515-4 are shown in this example, devices with three PICS 514-1 and 514-2 can include fewer or more EICs 515 in other examples. Although not shown, the electronic circuit layer 501 can include one or more switching devices, e.g., crossbar switches, to enable electronic signals to be sent between the EICs 515-1 to 515-4 without being converted to optical signals.

In this example, the EICs 515 have sides that extend past the sides of the photonic circuit layer 502. For example, the West (left) side of the EIC 515-1 extends past the West (left) side of the PICs 514-1 and 514-2. To support the EICs 515 in such an arrangement, an underfill material can be arranged between the surfaces of the EICs 515 that extend beyond the PICs 514 and the surfaces of the PICs 514. For example, an underfill material can be disposed between the bottom surface of the EIC 515-1 that extends to the West past the West side of the PICs 514-1 and 514-2 and the top surface of those portions of the PICs 514-1 and 514-2.

The device 500 includes electro-optical transceivers in the EICs 515-1 to 515-4 and the PICs 514-1 and 514-2. For example, first portion (e.g., electrical portion) of each electro-optical transceiver, which can be in the form of an AMS block 540, can be arranged in the EIC 515 while a second portion (e.g., optical portion) of each electro-optical transceiver, which can be in the form of an MP block 540, can be arranged in the PIC 514. The AMS block 540 shown in FIG. 25 can represent one or more AMS blocks 540 as an EIC 515 can include multiple AMS blocks 540, as described herein.

In this example, the PIC 514-1 includes one or more optical couplers 520-1 and the PIC 514-3 includes one or more optical couplers 520-2 with the optical couplers 520-1 And 520-2 being arranged at either end of the photonic circuit layer 502. However, the PIC 514-2 can also include one or more optical couplers 520, e.g., on the surface of the PIC 514-2 opposite the side to which the EICs 515-1 to 515-4 is attached.

In this example, the optical couplers 520-1 and 520-1 are shown as being attached to the same surface of the PICs 514-1 and 514-3 as the EICs 515. In other examples, the optical couplers 520-1 and 520-2 can be coupled to other locations on the surface of the PICs 514-1 and 514-3, e.g., in one or more corners of the PICs 514-1 and 514-3, to the opposite surface of one or more of the PICs 514-1 to 514-3, or edge-coupled to the PIC 514-1 and/or 514-2.

Referring to FIG. 5-26, each EIC 515 can include computing components 531-1 to 531-4 (collectively, computing components 531). The computing components 531 can include, for example, processing elements, memory nodes, memory agents, memory controllers, memory PHYs, cache memory, CML memory, other types of memory devices, and/or networking components, e.g., switching and routing components, electrical interfaces, network adapters, PCI buses and controllers, and/or other types of copper-based connection devices.

The computing components 531 can be arranged throughout each EIC 515, e.g., in the outer region of the electronic circuit layer 501 and/or in the inner region 504. A computing component 531 can be electrically coupled to an AMS block 540 in the same EIC 515 as the computing by way of an electrical channel to enable data communication between the computing component 531 and computing components 531 of other EICs 515 of the circuit 500 and/or external devices that are external to the device 500, as described herein.

Referring to FIG. 5-27, each PIC 514 can include internal waveguides 572 for carrying optical signals between components of the PIC 514 and/or components attached to the PIC 514. In this diagram, each waveguide 572 can represent multiple waveguides (e.g., two unidirectional waveguides) for clarity. For example, the PIC 514-1 includes internal waveguides 572-1 that optically couple the MP block 570-1 to an optical coupler 520-1 and internal waveguides 572-2 that optically couple the MP block 570-2 to an optical coupler 520-1. Similarly, the PIC 514-3 includes internal waveguides 572-5 that optically couple the MP block 570-4 to an optical coupler 520-2 and internal waveguides 572-6 that optically couple the MP block 570-3 to an optical coupler 520-2.

The photonic circuit layer 502 also includes boundary crossing waveguides 572-3 and 572-4 that extend between the PICs 514-1 and 514-3 through the PIC 514-2 using optical connections 593-1 to 593-4 (collectively, optical connections 593). The optical connections 593-1 and 593-2 can enable optical communication between the PICs 514-1 and 514-2 and the optical connections 593-3 and 593-4 can enable optical communication between the PICs 514-2 and 514-3. Thus, the optical connections 593 can enable two-way optical communication between all three of the PICs 514-1 to 514-3. Example optical connections are shown in FIGS. 7-1 and 7-2, and described below.

In particular, the waveguides 572-3 include optical connections 593-1 that enable efficient optical communication between the PIC 514-1 and the PIC 514-2 and optical connections 592-3 that enable efficient optical communication between the PIC 514-2 and the PIC 514-3. Similarly, the waveguides 572-4 include optical connections 593-2 that enable efficient optical communication between the PIC 514-1 and the PIC 514-2 and optical connections 592-4 that enable efficient optical communication between the PIC 514-2 and the PIC 514-3.

For example, a computing component 531-1 of the EIC 515-1 can send data to a computing component 531-4 of the EIC 515-4 via the waveguide 572-3. In particular, the computing component 531-1 can send an electronic signal that encodes the data to an AMS block 540-1 via an electrical channel of the EIC 515-1. The electro-optical transceiver that includes the AMS block 540-1 and the MP block 570-1 can convert the electronic signal to an optical signal and send the optical signal to the electro-optical transceiver that includes the AMS block 540-4 and the MP block 570-4 via the waveguide 572-3. This electro-optical transceiver can convert the optical signal to an electronic signal and send the electronic signal to the computing component 531-4 via an electrical channel of the EIC 515-4.

In another example, a computing component 531-1 of the EIC 515-1 can send data to a computing component 531-3 of the EIC 515-3 via the waveguide 572-3. In particular, the computing component 531-1 can send an electronic signal that encodes the data to an AMS block 540-1 via an electrical channel of the EIC 515-1. The electro-optical transceiver that includes the AMS block 540-1 and the MP block 570-1 can convert the electronic signal to an optical signal and send the optical signal to the electro-optical transceiver that includes the AMS block 540-4 and the MP block 570-4 via the waveguide 572-3. This electro-optical transceiver can send the optical signal to the electro-optical transceiver that includes the AMS block 540-3 and the MP block 570-3. This electro-optical transceiver can convert the optical signal to an electronic signal and send the electronic signal to the computing component 531-3 via an electrical channel of the EIC 515-3.

Using optical connections 593 as shown, the photonic circuit layer 502 can be larger than the size of a reticle used to create each PIC 514. For example, using three PICs 514-1 to 514-3 can allow for a photonic circuit layer 502 that is three times as long as the reticle in one dimension and equal to the size of the reticle in the orthogonal dimension. This can allow additional space on the photonic circuit layer 502 for more EICs 515, optical couplers, or other components and/or improved thermal management.

In this example, there are no electro-optical transceivers in the PIC 514-2. Thus, the PIC 514-2 may only include passthrough waveguides 593 that pass optical signals between the PICS 514-1 and 514-3. However, the PIC 514-2 can be arranged like the PICs 514-1 and 514-3 and include the optical portions of electro-optical transceivers and corresponding internal waveguides that are not used in this example. This can enable the use of the same reticle to fabricate each PIC 514.

In other examples, the PIC 514-2 and the portions of one or more of the EICs 515-1 adjacent to (e.g., above) the PIC 514-2 can include electro-optical transceivers. For example, the electro-optical transceivers can be arranged in the inner regions 504 and 507 (shown with a dashed line for clarity) of the electronic circuit layer 501 and the photonic circuit layer 502, respectively. Electro-optical transceivers can also be arranged in the outer regions 505 and 508 of the electronic circuit layer 501 and the photonic circuit layer 502, respectively. In such examples, the PIC 514-2 would include waveguides 572 that connect to the MP blocks 570 and not just passthrough waveguides.

This arrangement of EICs 515 and PICs 514 along with the optical connections 593 enables the electro-optical transceivers to be arranged at or near the center of the electronic circuit layer 501 to support shorter electrical channels between the electro-optical transceivers and the computing components 531 of the EICs 515 as compared to configurations in which the electro-optical transceivers are arranged along the outer perimeter of the electronic circuit layer 501 similar to that of FIG. 5-28.

In some implementations, the photonic circuit layer 502 can include one or more optical couplers one of the three PICs 514, but not on the other two PICs 514. For example, the photonic circuit layer 502 can include the optical couplers 520-1, but not the optical couplers 520-2. In another example, the photonic circuit layer 502 can include both the optical couplers 520-1 and 520-2, but a light engine 581 (See FIG. 5-8) on only one of the two PICs 514, e.g., on the PIC 514-1. In both of these examples, the photonic circuit layer 502 can include another boundary crossing waveguide 572-6 that optically couples the optical coupler 520-1 to an MP block 570-3 of the PIC 514-3. This waveguide 572-6 includes an optical connection 593-5 at the boundary between the PIC 514-1 and the PIC 514-2 and an optical connection 593-6 at the boundary between the PIC 514-2 and the PIC 514-3. A similar boundary crossing waveguide can optically coupler the optical coupler 502-1 to each other MP block of the PIC 514-3. For example, the PIC 514-1 or the PIC 514-3 can include a splitter (e.g., splitter 368 of FIG. 2-1) for routing optical signals between multiple modulators and the optical coupler 520-1. The boundary crossing waveguide 592-6 enables optical signals to be routed between the optical coupler 520-1 and the MP block(s) 570 of the PIC 514-3 such that the components 531 of the EICs 515-3 and 515-4 can communicate optically with external devices via the optical coupler 520-1 and/or such that one light engine can be used rather than having a light engine on both PICs 514-1 and 514-3.

FIG. 5-28 is a diagram illustrating electronic signal routing distances 598 and 599 of two different devices, a device 594 similar to some of the example devices 500 described above and a device 595 in which AMS block 540 is located along an edge of the electronic circuit layer. Many of the components of the device 500 are omitted to illustrate the distance 598 more clearly. In the device 500, the signal conversion components that convert between electrical and optical signals (e.g., electro-optical transceivers that include AMS blocks 540 and MP blocks 570) are located at or near the center of the device 594. The distance 598 between an AMS block 540 and the memory node 530 farthest from the AMS block 540 is less than half the diagonal length of the electronic circuit layer 501 in each quadrant or EIC 515 of the electronic circuit layer 501. The actual routing of electronic signals between the AMS block 540 and the memory node 530 farthest from the AMS block 540 may not be along the diagonal. Instead, the electrical channels may be routed with perpendicular turns and may travel to up and down along vias.

In contrast, the diagonal distance 599 between the AMS block 540 and the memory node 530 of the device 595 farthest from the AMS block 540 is just less than the diagonal length of the entire device 595 since the conversion components are located in one corner of the device 595. Thus, the electronic signals would have to travel roughly twice the distance in the device 595 for each memory access of that memory node 530. Aggregated over many (e.g., thousands or millions) of memory access, the latency and electrical transmission costs of the arrangement of components in the switch 500 are substantial.

FIG. 5-29 is a diagram illustrating a substrate 590 (e.g., circuit board) that includes a device 500 and memory modules 592-1 to 592-6 (collectively, memory modules 592). The device 500 can be implemented as a network switch, e.g., having the configuration of FIGS. 5-1 to 5-7. Here, the device 500 can be used to transfer data between external devices, e.g., the memory modules 592 and/or the processing elements, e.g., GPUs, CPUs, TPUs, and or NPUs of the switch. In this example, the memory modules 592 are double data rate (DDR) synchronous dynamic random-access memory (SDRAM) modules implemented in dual in-line memory modules (DIMMs). However, other types of memory modules can also be used.

In addition to performing these switching functions, the network switch implemented by the device 500 can include memory for storing data and processing elements for performing computations, e.g., machine learning computations, on the switch. For example, the switch can store data that is used by multiple external processing elements so that the data is close to each processing element. The switch can also store data that is used in the machine learning computations performed by the switch, e.g., weights or other parameters of a machine learning model.

In a particular example, the switch can be configured to perform reduce operations on data, e.g., data that is being transferred between two different external processing elements. For example, a first processing element can be configured to transfer data to a second processing element for further processing. The switch can be configured to receive the transferred data, perform reduce operations on the data, and then transfer the resulting data to the second processing element. This reduces the computational burden placed on high performance processing elements, e.g., machine learning accelerators and increases the speed at which machine learning computations are performed.

In another example, a machine learning model can be stored in DDR memory (e.g., in one of the DIMMs) and cached into the HBM of the switch. If multiple processing elements are executing a machine learning workload and need parameters or embedding tables stored in the HBM of the switch or need to write the results of their work to the HBMs of the switch, the processing elements can initiate load or store operations with the data and send or receive packets optically. For example, they can send the results of their work optically to the center of the circuit layers of the switch where the optical signals are converted to electronic signals and routed to the appropriate HBM of the switch, which can be located along an outer region of the electronic circuit layer of the switch. Similarly, data from the HBM can be routed electrically to the center of the switch where the electronic signals are converted to optical signals and the optical signals are sent to the processing element(s) optically.

FIG. 5-30 is a diagram illustrating an example system 596 in which machine learning computations are performed by a network switch 517 implemented in a device 500. The network switch 517 can be implemented using any of the electronic circuit layers 501 and photonic circuit layers 502 described in this document with the electronic circuit layer 501 including at least one processing element 550 and at least one memory node 530. The system 596 can include any number of external devices 559 that are optically coupled to the network switch 517.

The network switch 517 can be configured to perform network switching functionality, e.g., routing data between the external devices 559 (e.g., devices 559-1 to 559-4) that are external to the device 500, to store data in memory nodes 530-1 to 530-8 (collectively, memory nodes 530), and perform computations, e.g., machine learning computations, based on data stored in the memory nodes 530 and/or data received from external devices 559. For example, the network switch 517 includes one or more processing elements 550 that can be configured to perform the computations and other computing components 531 that include networking components, e.g., routers, that can be configured to route the data between the external devices 559. As described above, the memory nodes 530 can include HBM, e.g., vertically stacked HBM, cache memory, and/or other types of memory. Although eight memory nodes 530 are shown in FIG. 5-30, the switch 517 can include any number of memory nodes 530 and any number of processing elements 550.

The network switch 517 can include any number of AMS blocks 540-1 and 540-2 (collectively, AMS blocks 540), which can be arranged at or near the center of the electronic circuit layer 501, as described elsewhere herein. Although not shown, the photonic circuit layer 502 can include MP blocks 570 corresponding to the AMS blocks 540 and the corresponding MP blocks 570 can be arranged adjacent to, e.g., directly below, the AMS blocks 540. For example, the photonic circuit layer 502 can include an MP block 570 located directly below the AMS block 540-1. Each MP block 570 and corresponding AMS block 540 can form an electro-optical transceiver, as described elsewhere herein.

The network switch 517 includes optical couplers 520-1 to 520-4 (collectively, optical couplers 520) that optically couple the components of the switch 517 to external waveguides 560-1 to 560-4, respectively, via optical interfaces (e.g., FAUs) that are connected to the optical couplers 520. Each external device 559 can also include an optical coupler 520 and optical interface (or other appropriate device) to which an external waveguide is coupled 560. For example, the network switch 517 is optically coupled to the external device 520-1 via the optical coupler 520-1, the waveguide 560-1, the optical coupler 520-5, and corresponding optical interface (not shown).

In operation, the network switch 517 can receive data from one or more of the external devices 559-1 via the external waveguides 560 and store the data in the memory nodes 530 and/or perform computations using the received data. The computations can include machine learning computations, e.g., inferences, training computations, etc. For example, the network switch 517 can be used in distributed training processes that involve computations being performed at multiple devices and the results being aggregated and distributed to the devices, e.g., for additional computations. The network switch 517 can be used to perform the aggregation operations based on data received from the external devices 559 and to broadcast the results of the aggregation operations to the external devices 559.

One example distributed training operation is an AllReduce operation in which multiple devices (or processing elements) share its data (e.g., gradients or parameters) with one or more other devices, the shared data is aggregated, and the aggregated results are shared with the multiple devices. In such operations, the external devices 559 can share their local data with the network switch 517 and the network switch 517 can aggregate the data and send the aggregated results to the external devices 559. In a particular example, AllReduce can be used to update gradients of a machine learning model. Each external device 559 can compute gradients based on its local data and send the gradients to the network switch 517 via the fiber connections provided by the waveguides 560, optical couplers 520, and optical interfaces. The network switch can store the gradients in the memory nodes 530 and/or perform an AllReduce operation to aggregate the gradients received from the external devices 559, e.g., using one or more processing elements 550. In this operation, the gradients can be summed, averaged, or otherwise aggregated and the network switch 517 can send the aggregated gradient to each of the external devices 559. Each external device 559 can update their local models with the aggregated gradients. This can ensure that the versions of the model at each external device 559 is synchronized.

Performing aggregation operations at the network switch 517 can reduce the communication overhead involved in the distributed training process. For example, rather than sending the data to a switch and the switch send the data to another device for aggregation, the network switch 517 can perform the aggregation on switch and send the results to the external devices 559. This can reduce the amount of data sent across a network by half and also reduce the associated latency involved in sending the data between the switch and the aggregation device.

FIG. 6-1 is a diagram illustrating an electronic circuit layer 501 with a switching device 600. In this example, the switching device 600 implements crossbar switch functionality using interconnects, e.g., UCIe interconnects. In particular, the electronic circuit layer 501 includes interconnects 601-1 to 601-8 (collectively, interconnects 601) arranged at the borders between EICs 515-1 to 515-4. The interconnects 601 located at a border between adjacent EICs 515 enable computing components 531 of the EICs 515 to transfer data between each other.

For example, the interconnects 601-1 and 601-2 located at the border between the EICs 515-1 and 515-2 enable the computing components 531-1 to 531-3 to communicate with the computing components 531-4 to 531-6 of the EIC 515-2 electrically without having the electronic signals converted into optical signals. The interconnects 601 located at the borders between each other pair of adjacent EICs 515 enable the same type of electrical communication. The interconnects 601 can provide die-to-die interfaces between adjacent EICs 515, e.g., using multiple electrical channels that electrically couple the adjacent EICs 515.

In general, a UCIe interconnect include a physical layer, a die-to-die layer, and a protocol layer. The physical layer can include the electrical channels that route electronic signals between adjacent EICs 515. The die-to-die layer can manage the routing of signals between the electrical channels and components of the EIC 515 corresponding to the interconnect 601. For example, the die-to-die layer can include software and/or hardware to routing logic and an adapter, multiplexer/demultiplexer, and/or switching mechanism to ensure that electronic signals are routed from a component of the EIC 515 to the appropriate electrical channel and vice versa. The protocol layer can implement the communications protocols of the interconnect. Some example protocols include PCI Express (PCIe) protocol, Compute Express Link (CXL) protocol, Flow Control Unit (FLIT) based protocol, or another appropriate protocol.

The interconnects 601 of an EIC 515 can be electrically coupled to the computing components 531 of the EIC 515 via electrical channels of the EIC 515. For example, the interconnect 601-1 can be connected to each of computing components 531-1 to 531-3 via a respective electrical channel of the EIC 515-1. Similarly, the interconnect 601-8 can be connected to each of computing components 531-1 to 531-3 via a respective electrical channel of the EIC 515-1. Additionally, each computing component 531 of each EIC 515 can be electrically coupled to an AMS block 540 of the EIC 515 using an electrical channel of the EIC 515, as described elsewhere herein. This enables both electrical and optical communications between computing components 531 of different EICs 515 and/or optical communication between the computing components 531 of the device 500 and external devices that are external to the device 500.

In operation, the interconnects 601 can receive electronic signals from the computing components 531, determine where to route the electronic signals (e.g., based on header or other addressing information), and send the electronic signals to the appropriate destination, which may be another computing component 531 of the same EIC 515 or a computing component 531 of a different EIC 515. If the destination computing component 515 is on a different EIC 515, the interconnect 601 can send the data encoded by the electronic signal to the appropriate interconnect 601.

For example, if the computing component 531-1 of the EIC 515-1 is sending data to the computing component 531-7 of the EIC 515-3, the computing component 531-1 can send an electronic signal that encodes the data to either the interconnect 601-1 or the interconnect 601-2 via an electrical channel of the EIC 515-1. For the purpose of this example, assume the data is sent to the interconnect 601-1. The interconnect 601-1 can send the data to the interconnect 601-2 via an electrical channel and the interconnect 601-2 can send the data to the interconnect 601-3 since the data is destined for the EIC 501-3. For example, the interconnect 601-2 can send an electronic signal that encodes the data to the interconnect 601-3, e.g., via an electrical channel, or send the data to the interconnect 601-3 via an electrical channel that electrically couples the interconnects 601-2 and 601-3. The interconnect 601-3 can send an electronic signal that encodes the data to the computing component 531-7 via an electrical channel. If the data was destined for the computing component 531-4, the interconnect 601-2 could have sent the electronic signal that encodes the data to the computing component 531-4 via an electrical channel rather than sending the data to the interconnect 601-3.

As shown in FIG. 6-1, the AMS blocks 540 are located in the inner region 504 of the electrical layer 501. This enables short electrical channels between the AMS blocks 540 and the computing components 531, as described herein.

In this example, the EICs 515-1 to 515-4 includes PHYs 551-1 to 551-4, respectively. The PHYs 551 facilitate communication with memory nodes 530, which can be implemented in the EICs 515 as some of the computing components 515 and/or on a photonic circuit layer 502 to which the EICs 5151 are attached. The PHYs 551 can be omitted in implementations in which the device 500 does not include memory.

FIG. 6-2 is a diagram illustrating an example portion of the electronic circuit layer 501 of FIG. 6-1 and a portion of a photonic circuit layer 502. In particular, this diagram shows a side view of a portion of the EIC 515-1, a portion of the EIC 515-2, and a portion of a PIC 514 to which the EICs 515 are attached. This diagram is similar to the diagram of FIG. 5-8, but includes additional components of the electronic circuit layer 501 of FIG. 6-2, including the interconnects 601-1 and 601-2, electrical channels 610 (although shown as one line, this line can represent multiple electrical channels) that communicatively couple the interconnect 601-2 with the interconnect 601-2, and an electrical channel 611 that communicatively couples the PHY 551-1 to a memory node 530-1 arranged on the PIC 514. The photonic circuit layer 502 can be implemented using one or more PICs 514 or photonic circuit layer portions, as described herein.

In this example, the electrical channels 610 extend from the interconnect 601-2 through the PIC 514 and into the substrate 503. The electrical channels 610 are routed from underneath the EIC 515-1 to underneath the EIC 514-2 in the substrate 503 and extends from the substrate 503 through the PIC 514 to the interconnect 601-2. Vias can be used to route the electrical channels 610 through the PIC 514 and substrate 503, e.g., as shown in FIG. 6-3 and described below.

The electrical channels 610 and corresponding components (e.g., bumps and/or vias) can be considered to be part of the interconnects 601-1 and 601-2. In this diagram, the blocks representing the interconnects 601-1 and 601-2 can include the components that provide the die-to-die layer and/or the protocol layer of the interconnects 601-1 and 601-2.

Similarly, the electrical channel 611 extends from the interconnect PHY 551-1 through the PIC 514 and into the substrate 503. The electrical channel 611 is routed from underneath the EIC 515-1 to underneath the memory node 530-1 or close thereto in the substrate 503 and extends from the substrate 503 through the PIC 514 to the memory node 530-1. Vias can be used to route the bus 511 through the PIC 514 and substrate 503.

The AMS block 540-1 includes a TIA 585-1 that is connected to a photodetector 587-1 of an MP block 570 of the PIC 514 and a driver 584-1 that is connected to a modulator 586-1 of the PIC 514. In some examples, the AMS block 540-1, MP block 586-1, and SerDes 583-1 can be configured as shown in FIG. 5-9.

FIG. 6-3 is a diagram illustrating an example portion of an electronic circuit layer 501, a portion of a photonic circuit layer 502, and a portion of a substrate 503 of a device 500. This diagram illustrates some example connections between the electronic circuit layer 501, the photonic circuit layer 502, and the substrate 503, which can be part of interconnects 601 that facilitate crossbar switch functionality.

In this example, the device 500 includes bumps 620-1 to 620-6 (collectively, bumps 620) between the electronic circuit layer 501 and the photonic circuit layer 502. The device 500 can include any number of bumps 620 to enable electronic communication between components of the electronic circuit layer 501 and components of the photonic circuit layer 502 or through the photonic circuit layer 502. The bumps 620 can include solder or another conductive material (e.g., copper pillars) to electrically couple the electronic circuit layer 501 to the photonic circuit layer 502.

Similarly, the device 500 includes bumps 621-1 to 621-4 (collectively, bumps 621) between the photonic circuit layer 502 and the substrate 503. The device 500 can include any number of bumps 621, which can include solder or another conductive material, electrically couple the photonic circuit layer 502 to the substrate 503, e.g., to enable electronic signal routing through the substrate 503.

The photonic circuit layer 502 includes vias 622-1 to 622-4 (collectively, vias 622). The device 500 can include any number of vias 522, e.g., TSVs, for routing electronic signals between sub-layers of the photonic circuit layer 502, e.g., vertically through the photonic circuit layer 502.

The photonic circuit layer 502 also includes RDLs 624-1 and 624-2 (collectively, RDLs 624) for rerouting electrical connections between the electronic circuit layer 501 and the photonic circuit layer 502 and the between the photonic circuit layer 502 and the substrate 502, respectively. For example, the RDL 624-1 can reroute the electrical connection between the bump 620-1 and the via 622-1, e.g., if these two components are not aligned vertically with one another. Similarly, the RDL 624-1 can reroute the electrical connection between the bump 621-1 and the via 622-1, e.g., if these two components are not aligned vertically with one another. Although not shown in this diagram, the electronic circuit layer 501 and/or the substrate 503 can also include vias 622 and RDLs 624 for electronic signal routing.

The bumps 620, bumps 621, and vias 622 form portions of electrical channels 623-1 to 623-4 (collectively, electrical channels 623) between components of the electronic circuit layer 501 and between components of the electronic circuit layer 501 and components of the photonic circuit layer 501. These electrical channels 623 can be used, e.g., as part of a crossbar switch, to route electronic signals between components of the electronic circuit layer 501 that are arranged in different chips, e.g., different EICs of the electronic circuit layer 501.

The electrical channel 623-1 electrically couples a memory node 530 of the electronic circuit layer with a processing element 551 of the electronic circuit layer 501. This electrical channel 623-1 includes the bump 620-1, the via 622-1, the bumps 621-2 and 621-2, the via 622-2, and the bump 620-1. If the memory node 530 and the processing element 551 are on the same chip, e.g., the same EIC, the memory node 530 and the processing element 551 can be electrically coupled using electrical channels of the electronic circuit layer 501 without being routed through the photonic circuit layer 502 and the substrate 503. If the memory node 530 and the processing element 551 are on different chips, the electrical channel 623-1 can be used to electrically couple the memory node 530 with the processing element 551.

The electrical channel 623-2 electrically couples the processing element 551 with the AMS block 540, e.g., with the driver 584 of the AMS block 540. This electrical channel 623-2 includes the bump 620-3, the via 622-3, and the bumps 621-13 and 621-4, the via 622-4, and the bump 620-4. The electrical channel 623-2 can be used to route electronic signals between the processing element 551 and the AMS block 540, e.g., to enable two-way optical communication between the processing element 551 and an external device that is external to the device 500. For example, this electrical channel 623-2 enables the processing element 551 to communicate optically using an AMS block 540 of a different chip, e.g., in situations in which the chip that includes the processing element 551 does not include an electro-optical transceiver but another chip of the electronic circuit layer 501 does include an electro-optical transceiver.

The electrical channel 623-3 electrically couples the TIA 585 of the AMS block 540 with the photodetector 587 of the MP block 570. This electrical channel 623-3 includes the bump 620-5. Similarly, the electrical channel 623-4 electrically couplers the driver 584 of the AMS block 540 with the modulator 586 of the MP block 570. This electrical channel 623-4 includes the bump 620-6.

Although a few electrical channels 623 are shown in this diagram, the devices 500 described herein can include many electrical channels 623 that are routed through the photonic circuit layer 502 and the substrate 503 in similar manners. For example, each computing component 531 (or a portion of the computing components) of a first EIC of an electronic circuit layer 501 can be electrically coupled to one or more corresponding computing components 531 of one or more second EICs of the electronic circuit layer 501 using these electrical channels 623. Additionally, each computing component 531 (or a portion of the computing components) of an EIC can be electrically coupled to a corresponding AMS block 540 of another EIC of the electronic circuit layer 501 using these electrical channels 623.

The electrical channels 623 can form an interconnect system of a crossbar switch, e.g., of the switching device 600. For example, each pair of interconnects 601 between adjacent EICs 515 can include a set of bumps 620 between each EIC 515 and the photonic circuit layer 502, set of bumps between the photonic circuit layer 502 and the substrate 503, and vias 622 in the photonic circuit layer 502. In a particular example, the interconnects 601-1 and 601-2 of FIG. 6-1 can include a set of bumps 620 between the EIC 515-1 and the photonic circuit layer 502. This interconnect 601-2 can also include vias 622 in the photonic circuit layer 502 and/or bumps 621 between the photonic circuit layer 502 and the substrate 503. This series of electrical channels 623 can form the interconnects 601-1 and 601-2 that enable electrical communication between components (e.g., computing components 531 and AMS blocks 540) of the EIC 515-1 and components (e.g., computing components 531 and AMS blocks 540) of the EIC 515-2.

FIG. 7-1 is a diagram illustrating example reticle masks 710-1 and 710-2 for creating an optical connection and the resulting optical connection 720. In this example, the optical connection 720 is in the form of an optical stitch that can be created at the manufacturing stage using the masks 710-1 and 710-2. The masks 710-1 and 710-2 are used to form optical connections that enable optical signals to pass (or facilitate the passing of optical signals with less loss) from a waveguide portion of one photonic circuit layer or PIC to a corresponding waveguide portion of another photonic circuit layer or PIC.

The masks 710-1 and 710-2 can be portions of reticles that can be used to create a photonic circuit layer portion or a PIC. For example, the mask 710-1 can part of one reticle and the mask 710-2 can be part of another reticle. Each reticle can be used to form a respective PIC or photonic circuit layer portion that are adjacent to each other. By aligning and overlapping the masks 710-1 and 710-2 by a small amount as shown by the mask overlap 717, a waveguide that passes across a border between the PICs or photonic layer portions can include the optical connection 720.

The mask 710-1 includes a waveguide area 711-1, tapers 712-1 and 712-2, and a stitch area 714-1 defined by stitch segments 713-1 and 713-2. The waveguide area 711-1 can extend to another portion of the reticle that forms a waveguide in the resultant photonic circuit layer or PIC. The tapers 712-1 and 712-2 extend at an angle from the waveguide area 711-1 to the stitch segments 713-1 and 713-2 to create a wider stitch area 714-1 that is wider than the waveguide area 711-1. In this example, the tapers 712-1 and 712-2 do not extend to the edge of the mask 710-1. Instead, the mask 710-1 includes stitch segments 713-1 and 713-2 that provide a consistent width from the tapers 712-1 and 712-2 to the edge of the mask 710-1.

Similarly, the mask 710-2 includes a waveguide area 711-2, tapers 712-3 and 712-4, and a stitch area 714-2 defined by stitch segments 713-3 and 713-4. The waveguide area 711-2 can extend to another portion of the reticle that forms a waveguide in the resultant photonic circuit layer or PIC. The tapers 712-3 and 712-4 extend at an angle from the waveguide 711-2 to create a wider stitch area 714-2 that is wider than the waveguide area 711-2. In this example, the tapers 712-3 and 712-4 do not extend to the edge of the mask 710-2. Instead, the mask 710-2 includes stitch segments 713-3 and 713-4 that provide a consistent width from the tapers 712-3 and 712-4 to the edge of the mask 710-2.

The wider stitch areas 714-1 and 714-2 reduce sensitivities to discontinuities between the optical stitches created using the masks 710-1 and 710-2. For example, there may be some misalignment between the stitch areas 714-1 and 714-2 (as shown as the mask delta 716) that results in an optical channel in the resultant optical stitch 740 that is narrower than each stitch area 714-1 and 714-2. By having wider stitch areas 714-1 and 714-2, the resultant optical channel is also wider and provides improved tolerance to misalignments. The wider channel reduces signal losses that would otherwise occur in narrower optical channels.

FIG. 7-2 is a diagram illustrating example reticle masks 730-1 and 730-2 for creating an optical connection and the resulting optical connection 740. In this example, the optical connection 740 is in the form of an optical stitch that can be created at the manufacturing stage using the masks 730-1 and 7310-2. The masks 730-1 and 730-2 can be portions of reticles that can be used to create a photonic circuit layer or a PIC. The masks 730-1 and 730-2 are used to form optical stitches that enable optical signals to pass (or facilitate the passing of optical signals with less loss) from a waveguide of one photonic circuit layer or PIC to a corresponding waveguide portion of another photonic circuit layer or PIC.

The masks 730-1 and 730-2 can be portions of reticles that can be used to create a photonic circuit layer portion or a PIC. For example, the mask 730-1 can part of one reticle and the mask 730-2 can be part of another reticle. Each reticle can be used to form a respective PIC or photonic circuit layer portion that are adjacent to each other. By aligning and overlapping the masks 730-1 and 730-2 by an amount as shown by the mask overlap 737, a waveguide that passes across a border between the PICs or photonic layer portions can include the optical connection 740. This mask overlap 737 may be larger than the mask overlap 717 of FIG. 7-1 to create an effective optical channel in the optical connection 740.

The mask 730-1 includes a waveguide area 731-1, tapers 732-1 and 732-2, and a stitch area 734-1 defined by the tapers 732-1 and 732-2. The waveguide area 731-1 can extend to another portion of the reticle that forms a waveguide in the resultant photonic circuit layer or PIC. The tapers 732-1 and 732-2 extend at an angle from the waveguide area 731-1 to the stitch segments 713-1 and 713-2 to create a wider stitch area 734-1 that is wider than the waveguide area 731-1. In this example, the tapers 732-1 and 732-2 extend to the edge of the mask 710-1.

Similarly, the mask 730-2 includes a waveguide area 731-2, tapers 732-3 and 732-4, and a stitch area 734-2 defined by the tapers 732-3 and 732-4. The waveguide area 731-2 can extend to another portion of the reticle that forms a waveguide in the resultant photonic circuit layer or PIC. The tapers 732-3 and 732-4 extend at an angle from the waveguide area 731-2 to the stitch segments 713-3 and 713-4 to create a wider stitch area 734-2 that is wider than the waveguide area 731-2. In this example, the tapers 732-3 and 732-4 extend to the edge of the mask 710-2.

The configuration of the tapers 732-1 to 732-4 that extend to the edges of the masks 730-1 and 730-2 produce a tamper to angled waveguide to taper combination at the stitch point. In this example, the loss is flat within a certain mask delta 636 which is based on the taper width at the edges of the masks 730-1 and 730-2.

Similar to the masks 710-1 and 710-2, the wider stitch areas 734-1 and 734-2 reduce sensitivities to discontinuities between the optical stitches created using the masks 710-1 and 710-2. For example, there may be some misalignment between the stitch areas 734-1 and 734-2 (as shown as the mask delta 736) that results in an optical channel in the resultant optical stitch 620 that is narrower than each stitch area 734-1 and 734-2. By having wider 734-1 and 734-2, the resultant optical channel is also wider and provides improved tolerance to misalignments. The wider channel reduces signal losses that would otherwise occur in narrower optical channels.

FIG. 8 illustrates a flow diagram for a method 800 for accessing memory of a switch 500. The method 800 can be performed by components of the switch 500.

The switch 500 receives a request to access memory of the switch 500 (810). For example, the switch 500 can receive the request from an external device, such as an external processing element that is external to the switch 500 but coupled to the switch via an external waveguide 560.

The switch 500 sends a request to the memory node 530 via an electrical channel 574 of the electronic circuit layer 501 (820). For example, an AMS block can send the request to the memory node 530 via the electrical channel.

An AMS block 540 of the switch 500 receives the data from the memory node 530 in an electronic signal via an electrical channel 574 of the electronic circuit layer 501 (830).

The AMS block 540 and a corresponding MP block 570 of the photonic circuit layer 502 encode the data of the electronic signal to an optical signal (740). For example, as described above, an optical modulator can be configured to operate on an optical carrier signal to encode data into the optical carrier signal and thereby transmit data optically/photonically.

The switch 500 sends the optical signal that encodes the data to an external device (850). For example, an FAU (or other optical interface) coupled to an optical coupler 520 of the switch 500 can receive the optical signal from the MP block 570 and send the optical signal to the external device via an external waveguide 560.

FIG. 9 illustrates certain components that may be included within a computer system 900. One or more computer systems 900 may be used to implement the various devices, components, and systems described herein.

The computer system 900 includes a processor 901. The processor 901 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a CPU. Although just a single processor 901 is shown in the computer system 900 of FIG. 10, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 are stored in the memory 903. The instructions 905 are executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 900 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 900 is a display device 915. Display devices 915 used with examples disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various examples.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, examples of the disclosure can comprise at least two distinctly different kinds of computer-readable media: non-transitory computer-readable storage media (devices) and transmission media.

Examples of the present disclosure may thus utilize a special purpose or general-purpose computing system including computer hardware, such as, for example, one or more processors and system memory. Examples within the scope of the present disclosure also include physical and other computer-readable media for carrying or storing computer-executable instructions and/or data structures, including applications, tables, data, libraries, or other modules used to execute particular functions or direct selection or execution of other modules. Such computer-readable media can be any available media that can be accessed by a general purpose or special purpose computer system. Computer-readable media that store computer-executable instructions (or software instructions) are physical storage media. Computer-readable media that carry computer-executable instructions are transmission media. Thus, by way of example, and not limitation, examples of the present disclosure can include at least two distinctly different kinds of computer-readable media, namely physical storage media or transmission media. Combinations of physical storage media and transmission media should also be included within the scope of computer-readable media.

Both physical storage media and transmission media may be used temporarily store or carry, software instructions in the form of computer readable program code that allows performance of examples of the present disclosure. Physical storage media may further be used to persistently or permanently store such software instructions. Examples of physical storage media include physical memory (e.g., RAM, ROM, EPROM, EEPROM, etc.), optical disk storage (e.g., CD, DVD, HDDVD, Blu-ray, etc.), storage devices (e.g., magnetic disk storage, tape storage, diskette, etc.), flash or other solid-state storage or memory, or any other non-transmission medium which can be used to store program code in the form of computer-executable instructions or data structures and which can be accessed by a general purpose or special purpose computer, whether such program code is stored as or in software, hardware, firmware, or combinations thereof.

A "network" or "communications network" may generally be defined as one or more data links that enable the transport of electronic data between computer systems and/or modules, engines, and/or other electronic devices. When information is transferred or provided over a communication network or another communications connection (either hardwired, wireless, or a combination of hardwired or wireless) to a computing device, the computing device properly views the connection as a transmission medium. Transmission media can include a communication network and/or data links, carrier waves, wireless signals, and the like, which can be used to carry desired program or template code means or instructions in the form of computer-executable instructions or data structures and which can be accessed by a general purpose or special purpose computer.

Further, upon reaching various computer system components, program code in the form of computer-executable instructions or data structures can be transferred automatically or manually from transmission media to physical storage media (or vice versa). For example, computer-executable instructions or data structures received over a network or data link can be buffered in memory (e.g., RAM) within a network interface module (NIC), and then eventually transferred to computer system RAM and/or to less volatile physical storage media at a computer system. Thus, it should be understood that physical storage media can be included in computer system components that also (or even primarily) utilize transmission media.

As discussed herein in detail, the present disclosure includes a number of practical applications having features described herein that provide benefits and/or solve problems associated with providing a multi-node computing system with sufficient memory, processing, bandwidth, and energy efficiency constraints for effective operation of AI and/or ML models. Some example benefits are discussed herein in connection with various features and functionalities provided by the computing system as described. It will be appreciated that benefits explicitly discussed in connection with one or more examples described herein are provided by way of example and are not intended to be an exhaustive list of all possible benefits of the computing system.

For example, the various network switches and circuit packages described herein and connections thereof may enable the construction of complex topologies of compute and memory nodes that can best serve a specific application. In a simple example, a set of photonic channels connect memory circuit packages with memory nodes (e.g., memory resources) to one or more compute circuit packages with compute nodes. The compute circuit packages and memory circuit packages can be connected and configured in any number of network topologies which may be facilitated through the use of one or more photonic channels include optical fibers. This may provide the benefit of relieving distance constraints between nodes (compute and/or memory) and, for example, the memory circuit packages can physically be placed arbitrarily far from the compute circuit packages (within the optical budget of the photonic channels).

The various network topologies may provide significant speed and energy savings. For example, photonic transport of data is typically more efficient than an equivalent high-bandwidth electrical interconnect in an EIC of the circuit package itself. By implementing one or more photonic channels, the electrical cost of transmitting data may be significantly reduced. Additionally, photonic channels are typically much faster than electrical interconnects, and thus the use of photonic channels permits the grouping and topology configurations of memory and compute circuit packages that best serve the bandwidth and connectivity needs of a given application. Indeed, the architectural split of memory and compute networks allows each to be optimized for the magnitude of data, traffic patterns, and bandwidth of each network applications. A further added benefit is that of being able to control the power density of the system by spacing memory and compute circuit packages to optimize cooling efficiency, as the distances and arrangements are not dictated by electrical interfaces.

In addition, by arranging the components of the EIC and PIC that convert between electrical and optical signals at or near the center of the switch and arranging FAUs along the outer region of the switch, the electrical cost of transmitting data can be further reduced compared to arrangements of conversion components along the outer region of the switch. For example, the longest distance that electronic signals have to travel between the conversion components and computing components of an EIC can be cut in half using the disclosed arrangement.

One or more specific examples of the present disclosure are described herein. These described examples are examples of the presently disclosed techniques. Additionally, in an effort to provide a concise description of these examples, not all features of an actual example may be described in the specification. It should be appreciated that in the development of any such actual implementation, as in any engineering or design project, numerous example-specific decisions will be made to achieve the developers' specific goals, such as compliance with system-related and business-related constraints, which may vary from one example to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one example" or "an example" of the present disclosure are not intended to be interpreted as excluding the existence of additional examples that also incorporate the recited features. For example, any element described in relation to an example herein may be combinable with any element of any other example described herein. Numbers, percentages, ratios, or other values stated herein are intended to include that value, and also other values that are "about" or "approximately" the stated value, as would be appreciated by one of ordinary skill in the art encompassed by examples of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to examples disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the examples that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The following are non-limiting examples of various embodiments of the present disclosure.

A1. A device comprising:
a photonic circuit layer comprising a first surface, a second surface opposite the first surface, and a plurality of photonic circuit portions tiled together to provide the photonic circuit layer, the photonic circuit layer comprising a plurality of electro-optical transceivers, one or more optical couplers, and a plurality of waveguides, wherein the waveguides comprise boundary-crossing waveguides that each extend across a boundary between adjacent photonic circuit portions, wherein each boundary-crossing waveguide comprises an optical connection at the boundary, and the optical connection has a width larger than a width of the waveguide away from the boundary, wherein a first photonic circuit layer portion comprises first and second electro-optical transceivers and first and second waveguides, and wherein the first waveguide connects the first electro-optical transceiver to an optical coupler of the one or more optical couplers and the second waveguide is a boundary-crossing waveguide that connects the second electro-optical transceiver to a corresponding electro-optical transceiver of a second photonic circuit layer portion different from the first photonic circuit layer portion; and
an electronic circuit layer coupled to the first surface of the photonic circuit layer and comprising electrical integrated circuits (EICs), each EIC comprising an electrical portion of at least one of the electro-optical transceivers such that, when the EIC is coupled to the first surface of the photonic circuit layer, the electrical portion and a corresponding optical portion of the at least one electro-optical transceiver of the photonic circuit layer are interconnected by electrical connections.

A2. The device of A1, wherein each photonic circuit portion corresponds to a photonic integrated circuit (PIC).

A3. The device of A1, wherein the photonic circuit layer corresponds to a single PIC.

A4. The device of A1, wherein each photonic circuit portion has a width and length that does not exceed a width and length of a reticle used to manufacture each photonic circuit portion, and wherein the photonic circuit layer has at least one of (i) a length that is greater than a length of the reticle or a (ii) width that is greater than a width of the reticle.

A5. The device of A4, wherein each EIC has a width and length that does not exceed a width and length of the reticle used to manufacture each photonic circuit portion.

A6. The device of any one of A1 to A5, wherein the optical connections comprise optical stiches created during manufacturing of the photonic circuit layer.

A7. The device of any one of A1 to A5, wherein the optical connections are created by aligning adjacent photonic circuit portions.

A8. The device of any one of A1 to A7, wherein at least one waveguide optically couples a first electro-optical transceiver of a first photonic circuit portion of the adjacent photonic circuit portions with a second electro-optical transceiver of a second photonic circuit portion of the adjacent photonic circuit portion such that light can travel between the first and second electro-optical transceivers.

A9. The device of A8, wherein the at least one waveguide optically couples a transmitter portion of the first electro-optical transceiver to a receiver portion of the second electro-optical transceiver.

A10. The device of A9, wherein:
the transmitter portion of the first electro-optical transceiver comprises analog mixed signal (AMS) block comprising an optical driver and a transimpedance amplifier; and
the receiver portion of the second electro-optical transceiver comprises an optical modulator and a photodetector.

A11. The device of A10, wherein:
the optical driver is electrically connected to the optical modulator via an electrical interconnect having a length that is 200 micrometers or less; and
the transimpedance amplifier is electrically connected to the photodetector via an electrical interconnect having a length that is 200 micrometers or less.

A12. The device of any one of A1 to A11, wherein the optical connection comprises:
first tapers in a first portion of at least one waveguide in a first photonic circuit portion of the adjacent photonic circuit portions, wherein the first tapers extend at an angle from a portion of the at least one waveguide located away from the boundary in the first photonic circuit portion towards the boundary; and second tapers in a second portion of the at least one waveguide in a first photonic circuit portion of the adjacent photonic circuit portions and second tapers, wherein the second tapers extend at an angle from a portion of the at least one waveguide located away from the boundary in the second photonic circuit portion towards the boundary.

A13. The device of A12, wherein the optical connection is created using reticle masks comprising:

a first mask comprising a first waveguide portion, a first optical stitch portion, and first tapers that extend from the first waveguide portion to first stitch segments of the first optical stitch portion at respective first angles such that the first optical stitch portion is wider than the first waveguide portion; and a second mask comprising a second waveguide portion, a second optical stich portion, and second tapers that extend from the second waveguide portion to second stitch segments of t at respective second angles such that the second optical stitch portion is wider than the second waveguide portion.

A14. The device of A12, wherein the optical connection is created using reticle masks comprising:

a first mask comprising a first waveguide portion and first tapers that extend from the first waveguide portion at respective first angles; and a second mask comprising a second waveguide portion and second tapers that extend from the first waveguide portion at respective second angles, wherein the first tapers extend past a reticle boundary between the first and second masks and the second tapers extend past the reticle boundary between the first and second masks.

A15. The device of any one of A1 to A14, wherein a first photonic circuit portion of the plurality of photonic circuit portions comprises a first optical coupler configured to connect to an optical interface that can move light into a fiber when exiting the at least one photonic circuit portion or into a waveguide when entering the at least one photonic circuit portion.

A16. The device of A15, wherein one or more waveguides of the plurality of waveguides optically couple the optical coupler to at least one electro-optical transceiver located in the first photonic circuit portion.

A17. The device of A15, wherein the optical coupler is attached to the first surface of the photonic circuit layer.

A18. The device of A15, wherein the optical coupler is attached to the second surface of the photonic circuit layer.

A19. The device of any one of A1 to A18, wherein the device implements a network switch.

A20. The device of A19, wherein at least one EIC of the one or more EICs comprises at least one of (i) memory, (ii) memory controllers, (iii) electrical interfaces, (iv) physical layers, or (v) a copper-based connection device.

A21. The device of A19, wherein at least one EIC of the one or more EICs comprises or more processing elements.

A22. The device of any one of A1 to A21, comprising a switching device that selectively electrically couples a first EIC of the EICs to a second EIC of the EICs.

A23. The device of A22, wherein the switching device comprises a crossbar switch.

A24. The device of any one of A1 to A23, wherein a first photonic circuit layer portion comprises a third second waveguide is a boundary-crossing waveguide that connects the optical coupler of the one or more optical couplers to the second electro-optical transceiver.

A25. The device of any one of A1 to A24, wherein the photonic circuit layer comprises one or more memory nodes.

A26. The device of A25, wherein the one or more memory nodes comprises a plurality of memory nodes arranged along an outer perimeter of the photonic circuit layer that is not covered by the electronic circuit layer.

A27. The device of A25 or A26, wherein the electronic circuit layer comprises at least one memory physical layer (PHY) that interfaces with the one or more memory nodes.

The present disclosure may be embodied in other specific forms without departing from its spirit or characteristics. The described examples are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A device comprising:

a photonic circuit layer comprising a top surface, a bottom surface opposite the top surface, and a plurality of photonic circuit portions tiled together to provide the photonic circuit layer, the photonic circuit layer comprising optical portions of a plurality of electro-optical transceivers, one or more optical couplers, and a plurality of waveguides, wherein the waveguides comprise boundary-crossing waveguides that each extend across a boundary between adjacent photonic circuit portions, wherein each boundary-crossing waveguide comprises an optical connection at the boundary, and the optical connection has a width larger than a width of the waveguide away from the boundary, wherein a first photonic circuit layer portion comprises first and second electro-optical transceivers and first and second waveguides, and wherein the first waveguide connects the first electro-optical transceiver to an optical coupler of the one or more optical couplers and the second waveguide is a boundary-crossing waveguide that connects the second electro-optical transceiver to a corresponding electro-optical transceiver of a second photonic circuit layer portion different from the first photonic circuit layer portion, wherein each photonic circuit layer portion is a photonic integrated circuit (PIC); and an electronic circuit layer coupled to the top surface of the photonic circuit layer and comprising electrical integrated circuits (EICs), each EIC comprising an electrical portion of at least one of the electro-optical transceivers such that, when the EIC is coupled to the top surface of the photonic circuit layer, the electrical portion and a corresponding optical portion of the at least one electro-optical transceiver of the photonic circuit layer are interconnected by electrical connections.

2. The device of claim 1, wherein each photonic circuit portion has a width and length that does not exceed a width and length of a reticle used to manufacture each photonic circuit portion, and wherein the photonic circuit layer has at least one of (i) a length that is greater than a length of the reticle or a (ii) width that is greater than a width of the reticle.

3. The device of claim 2, wherein each EIC has a width and length that does not exceed a width and length of the reticle used to manufacture each photonic circuit portion.

4. The device of claim 1, wherein the optical connections comprise optical stiches created during manufacturing of the photonic circuit layer.

5. The device of claim 1, wherein the optical connections are created by aligning adjacent photonic circuit portions.

6. The device of claim 1, wherein at least one waveguide optically couples a first electro-optical transceiver of a first photonic circuit portion of the adjacent photonic circuit portions with a second electro-optical transceiver of a second photonic circuit portion of the adjacent photonic circuit portion such that light can travel between the first and second electro-optical transceivers.

7. The device of claim 6, wherein the at least one waveguide optically couples a transmitter portion of the first electro-optical transceiver to a receiver portion of the second electro-optical transceiver.

8. The device of claim 7, wherein:
the transmitter portion of the first electro-optical transceiver comprises analog mixed signal (AMS) block comprising an optical driver and a transimpedance amplifier; and
the receiver portion of the second electro-optical transceiver comprises an optical modulator and a photodetector.

9. The device of claim 8, wherein:
the optical driver is electrically connected to the optical modulator via an electrical interconnect having a length that is 200 micrometers or less; and
the transimpedance amplifier is electrically connected to the photodetector via an electrical interconnect having a length that is 200 micrometers or less.

10. The device of claim 1, wherein the optical connection comprises:
first tapers in a first portion of at least one waveguide in a first photonic circuit portion of the adjacent photonic circuit portions, wherein the first tapers extend at an angle from a portion of the at least one waveguide located away from the boundary in the first photonic circuit portion towards the boundary; and
second tapers in a second portion of the at least one waveguide in a first photonic circuit portion of the adjacent photonic circuit portions and second tapers, wherein the second tapers extend at an angle from a portion of the at least one waveguide located away from the boundary in the second photonic circuit portion towards the boundary.

11. The device of claim 10, wherein the optical connection is created using reticle masks comprising:
a first mask comprising a first waveguide portion, a first optical stitch portion, and first tapers that extend from the first waveguide portion to first stitch segments of the first optical stitch portion at respective first angles such that the first optical stitch portion is wider than the first waveguide portion; and
a second mask comprising a second waveguide portion, a second optical stitch portion, and second tapers that extend from the second waveguide portion to second stitch segments of t at respective second angles such that the second optical stitch portion is wider than the second waveguide portion.

12. The device of claim 10, wherein the optical connection is created using reticle masks comprising:
a first mask comprising a first waveguide portion and first tapers that extend from the first waveguide portion at respective first angles; and
a second mask comprising a second waveguide portion and second tapers that extend from the first waveguide portion at respective second angles,
wherein the first tapers extend past a reticle boundary between the first and second masks and the second tapers extend past the reticle boundary between the first and second masks.

13. The device of claim 1, wherein a first photonic circuit portion of the plurality of photonic circuit portions comprises a first optical coupler configured to connect to an optical interface that can move light into a fiber when exiting the first photonic circuit portion or into a waveguide when entering the first photonic circuit portion.

14. The device of claim 13, wherein one or more waveguides of the plurality of waveguides optically couple the optical coupler to at least one electro-optical transceiver located in the first photonic circuit portion.

15. The device of claim 13, wherein the optical coupler is attached to the top surface of the photonic circuit layer.

16. The device of claim 13, wherein the optical coupler is attached to the bottom surface of the photonic circuit layer.

17. The device of claim 1, wherein the device implements a network switch.

18. The device of claim 17, wherein at least one EIC of the one or more EICs comprises at least one of (i) memory, (ii) memory controllers, (iii) electrical interfaces, (iv) physical layers, or (v) a copper-based connection device.

19. The device of claim 17, wherein at least one EIC of the one or more EICs comprises or more processing elements.

20. The device of claim 1, comprising a switching device that selectively electrically couples a first EIC of the EICs to a second EIC of the EICs.

21. The device of claim 20, wherein the switching device comprises a crossbar switch.

22. The device of claim 1, wherein a first photonic circuit layer portion comprises a third second waveguide is a boundary-crossing waveguide that connects the optical coupler of the one or more optical couplers to the second electro-optical transceiver.

23. The device of claim 1, wherein the photonic circuit layer comprises one or more memory nodes.

24. The device of claim 23, wherein the one or more memory nodes comprises a plurality of memory nodes arranged along an outer perimeter of the photonic circuit layer that is not covered by the electronic circuit layer.

25. The device of claim 23, wherein the electronic circuit layer comprises at least one memory physical layer (PHY) that interfaces with the one or more memory nodes.

* * * * *